US010228507B2

(12) United States Patent
Sherman et al.

(10) Patent No.: US 10,228,507 B2
(45) Date of Patent: *Mar. 12, 2019

(54) LIGHT SOURCE AND OPTICAL ARTICLE INCLUDING VISCOELASTIC LIGHTGUIDE DISPOSED ON A SUBSTRATE

(71) Applicant: 3M INNOVATIVE PROPERTIES COMPANY, St. Paul, MN (US)

(72) Inventors: Audrey A. Sherman, Woodbury, MN (US); Michael A. Meis, Stillwater, MN (US); Kevin R. Schaffer, Woodbury, MN (US); Marie A. Boulos, West Saint Paul, MN (US); Soemantri Widagdo, Mendota Heights, MN (US); Thu-Van T. Tran, Maplewood, MN (US); Ellen O. Aeling, Oakdale, MN (US); Patrick J. Yeshe, Woodbury, MN (US); Wendi J. Winkler, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 51 days.

This patent is subject to a terminal disclaimer.

(21) Appl. No.: 15/438,550

(22) Filed: Feb. 21, 2017

(65) Prior Publication Data

US 2017/0227702 A1 Aug. 10, 2017

Related U.S. Application Data

(63) Continuation of application No. 13/003,208, filed as application No. PCT/US2009/046097 on Jun. 3, 2009.

(Continued)

(51) Int. Cl.
*F21V 8/00* (2006.01)
*F21S 43/239* (2018.01)

(Continued)

(52) U.S. Cl.
CPC .......... *G02B 6/0065* (2013.01); *F21S 43/239* (2018.01); *G02B 6/006* (2013.01);

(Continued)

(58) Field of Classification Search
CPC .................................................. G02B 6/0065

(Continued)

(56) References Cited

U.S. PATENT DOCUMENTS 2,440,584 A 4/1948 Heltzer
2,736,721 A 2/1956 Dexter (Continued)

FOREIGN PATENT DOCUMENTS

CA 1038135 9/1978
CA 2284113 4/2000

(Continued)

OTHER PUBLICATIONS

3M Light Management Films Product Bulletin 3635, 2002, pp. 1-5.

(Continued)

*Primary Examiner* — Robert J May
(74) *Attorney, Agent, or Firm* — Michael Stern

(57) ABSTRACT

Disclosed herein is an optical device having a light source and a viscoelastic lightguide. Light from the light source enters the viscoelastic lightguide and is transported within the lightguide by total internal reflection. The viscoelastic lightguide may comprise a pressure sensitive adhesive. The optical device may be used in a variety of constructions wherein the device emits light being transported within the viscoelastic lightguide. Constructions include those used for signs, markings, illumination devices, display devices, keypad assemblies and tail light assemblies for vehicles.

31 Claims, 21 Drawing Sheets

Related U.S. Application Data

(60) Provisional application No. 61/169,973, filed on Apr. 16, 2009, provisional application No. 61/114,865, filed on Nov. 14, 2008, provisional application No. 61/079,639, filed on Jul. 10, 2008.

(51) Int. Cl.
    *G09F 13/04*         (2006.01)
    *H01H 13/83*       (2006.01)

(52) U.S. Cl.
    CPC ......... *G02B 6/0018* (2013.01); *G02B 6/0035* (2013.01); *G02B 6/0045* (2013.01); *G02B 6/0055* (2013.01); *G02B 6/0061* (2013.01); *G09F 13/0409* (2013.01); *H01H 13/83* (2013.01); *H01H 2219/062* (2013.01)

(58) Field of Classification Search
    USPC .................................. 362/555, 551, 616
    See application file for complete search history.

(56) References Cited

U.S. PATENT DOCUMENTS

| | | | |
|---|---|---|---|
| 3,718,712 A | 2/1973 | Tushaus | |
| 4,082,426 A | 4/1978 | Brown | |
| 4,310,509 A | 1/1982 | Berglund et al. | |
| 4,418,110 A | 11/1983 | May | |
| 4,452,845 A | 6/1984 | Lloyd et al. | |
| RE31,886 E | 5/1985 | Hodgson | |
| RE31,887 E | 5/1985 | Hodgson | |
| 4,542,012 A | 9/1985 | Dell | |
| 4,554,324 A | 11/1985 | Husman | |
| 4,584,192 A | 4/1986 | Dell et al. | |
| 4,678,695 A | 7/1987 | Tung et al. | |
| 4,737,559 A | 4/1988 | Kellen | |
| 4,808,471 A | 2/1989 | Grunzinger | |
| 4,874,228 A | 10/1989 | Aho et al. | |
| 4,929,866 A | 5/1990 | Murata et al. | |
| 4,935,665 A | 6/1990 | Murata | |
| 5,054,885 A | 10/1991 | Melby | |
| 5,064,272 A | 11/1991 | Bailey | |
| 5,066,098 A | 11/1991 | Kult | |
| 5,136,483 A | 8/1992 | Schöniger et al. | |
| 5,214,119 A | 5/1993 | Leir | |
| 5,369,155 A | 11/1994 | Asmus | |
| 5,450,235 A | 9/1995 | Smith | |
| 5,461,134 A | 10/1995 | Leir et al. | |
| 5,471,371 A | 11/1995 | Koppolu et al. | |
| 5,506,279 A | 4/1996 | Babu | |
| 5,510,171 A | 4/1996 | Faykish | |
| 5,633,010 A | 5/1997 | Chen | |
| 5,707,130 A | 1/1998 | Zwick et al. | |
| 5,738,642 A | 4/1998 | Heinecke et al. | |
| 5,750,134 A | 5/1998 | Scholz et al. | |
| 5,765,940 A | 6/1998 | Levy et al. | |
| 5,784,197 A | 7/1998 | Frey | |
| 5,803,086 A | 9/1998 | Scholz et al. | |
| 5,825,543 A | 10/1998 | Ouderkirk | |
| 5,828,488 A | 10/1998 | Ouderkirk | |
| 5,867,316 A | 2/1999 | Carlson | |
| 5,882,774 A | 3/1999 | Jonza | |
| 5,905,826 A | 5/1999 | Benson, Jr. | |
| 5,979,450 A | 11/1999 | Baker et al. | |
| 5,985,395 A | 11/1999 | Comstock et al. | |
| 6,033,604 A | 3/2000 | Lundin | |
| 6,036,340 A | 3/2000 | Fohl et al. | |
| 6,049,649 A | 4/2000 | Arai | |
| 6,060,157 A | 5/2000 | LaPerre | |
| 6,083,856 A | 7/2000 | Joseph | |
| 6,095,672 A | 8/2000 | Beninga et al. | |
| 6,096,066 A | 8/2000 | Chen | |
| 6,102,559 A | 8/2000 | Nold | |
| 6,111,696 A | 8/2000 | Allen | |
| 6,166,856 A | 12/2000 | Araki | |
| 6,179,948 B1 | 1/2001 | Merrill | |
| 6,196,704 B1 | 3/2001 | Gauch et al. | |
| 6,216,699 B1 | 4/2001 | Cox et al. | |
| 6,280,480 B1 | 8/2001 | Tuttle et al. | |
| 6,280,822 B1 | 8/2001 | Smith | |
| 6,286,984 B1 | 9/2001 | Berg | |
| 6,288,172 B1 | 9/2001 | Goetz | |
| 6,288,842 B1 | 9/2001 | Florczak | |
| 6,314,226 B1 | 11/2001 | Nath | |
| 6,332,701 B1 | 12/2001 | Yamada et al. | |
| 6,352,359 B1 | 3/2002 | Shie et al. | |
| 6,352,761 B1 | 3/2002 | Hebrink | |
| 6,367,941 B2 | 4/2002 | Lea et al. | |
| 6,367,950 B1 | 4/2002 | Yamada et al. | |
| 6,368,699 B1 | 4/2002 | Gilbert | |
| 6,379,016 B1 | 4/2002 | Boyd et al. | |
| 6,416,201 B1 | 7/2002 | Strand et al. | |
| 6,473,554 B1 | 10/2002 | Pelka et al. | |
| 6,483,976 B2 | 11/2002 | Shie et al. | |
| 6,499,870 B1 | 12/2002 | Zwick et al. | |
| 6,523,976 B1 | 2/2003 | Turnbull et al. | |
| 6,530,683 B1 | 3/2003 | Ohkohdo et al. | |
| 6,568,822 B2 | 5/2003 | Boyd et al. | |
| 6,569,521 B1 | 5/2003 | Sheridan | |
| 6,582,103 B1 | 6/2003 | Popovich et al. | |
| 6,595,671 B2 | 7/2003 | Lefebvre et al. | |
| 6,647,199 B1 | 11/2003 | Pelka et al. | |
| 6,660,805 B1 | 12/2003 | Righettini et al. | |
| 6,663,978 B1 | 12/2003 | Olson | |
| 6,672,746 B2 | 1/2004 | Amano | |
| 6,722,777 B2 | 4/2004 | Erber | |
| 6,773,154 B2 | 8/2004 | Desai | |
| 6,793,372 B2 | 9/2004 | Wehner et al. | |
| 6,796,695 B2 | 9/2004 | Natsume | |
| 6,799,880 B2 | 10/2004 | Gozum | |
| 6,824,299 B2 | 11/2004 | Mohri et al. | |
| 6,827,886 B2 | 12/2004 | Neavin | |
| 6,845,212 B2 | 1/2005 | Gardiner et al. | |
| 6,848,820 B2 | 2/2005 | Natsume | |
| 6,851,839 B2 | 2/2005 | Malone et al. | |
| 6,851,843 B2 | 2/2005 | Müller et al. | |
| 6,855,386 B1 | 2/2005 | Daniels et al. | |
| 6,897,771 B1 | 5/2005 | Lodhie et al. | |
| 6,927,900 B2 | 8/2005 | Liu | |
| 6,939,936 B2 | 9/2005 | Wang et al. | |
| 6,957,903 B2 | 10/2005 | Arakawa et al. | |
| 6,972,813 B1 | 12/2005 | Toyooka | |
| 6,991,695 B2 | 1/2006 | Tait | |
| 6,994,461 B2 | 2/2006 | Lodhie | |
| 7,005,394 B1 | 2/2006 | Ylitalo | |
| 7,018,061 B2 | 3/2006 | Chen | |
| 7,029,152 B1 | 4/2006 | Kuhl | |
| 7,030,203 B2 | 4/2006 | Mosbey et al. | |
| 7,046,318 B2 | 5/2006 | Yu et al. | |
| 7,046,905 B1 | 5/2006 | Gardiner | |
| 7,052,166 B2 | 5/2006 | Tessnow | |
| 7,059,755 B2 | 6/2006 | Yatsuda et al. | |
| 7,072,096 B2 | 7/2006 | Holman et al. | |
| 7,078,093 B2 | 7/2006 | Sheridan | |
| 7,086,765 B2 | 8/2006 | Wehner | |
| 7,090,922 B2 | 8/2006 | Zhou | |
| 7,111,969 B2 | 9/2006 | Bottesch et al. | |
| 7,116,485 B2 | 10/2006 | Po-Hung et al. | |
| 7,128,452 B2 | 10/2006 | Tsai | |
| 7,134,768 B2 | 11/2006 | Suzuki | |
| 7,137,718 B2 | 11/2006 | Egashira | |
| 7,140,741 B2 | 11/2006 | Fleming | |
| 7,152,985 B2 | 12/2006 | Benitez et al. | |
| 7,160,010 B1 | 1/2007 | Chinniah et al. | |
| 7,165,959 B2 | 1/2007 | Humlicek et al. | |
| 7,166,686 B2 | 1/2007 | Olson | |
| 7,182,494 B2 | 2/2007 | Nakayama et al. | |
| 7,204,628 B2 | 4/2007 | Ishida | |
| 7,224,529 B2 | 5/2007 | King et al. | |
| 7,232,247 B2 | 6/2007 | Yatsuda et al. | |
| 7,241,019 B1 | 7/2007 | Tsai et al. | |
| 7,241,036 B2 | 7/2007 | Miyagawa et al. | |
| 7,249,874 B2 | 7/2007 | Kuhl | |
| 7,255,920 B2 | 8/2007 | Everaerts | |

(56) References Cited

U.S. PATENT DOCUMENTS

| | | |
|---|---|---|
| 7,270,455 B2 | 9/2007 | Befelein |
| 7,275,839 B2 | 10/2007 | Coushaine et al. |
| 7,290,906 B2 | 11/2007 | Suzuki et al. |
| 7,295,180 B2 | 11/2007 | Ichikawa et al. |
| 7,315,418 B2 | 1/2008 | DiZio |
| 7,318,663 B2 | 1/2008 | Verbrugh et al. |
| 7,322,725 B2 | 1/2008 | Worakasemsuk et al. |
| 7,326,448 B2 | 2/2008 | Jones et al. |
| 7,336,422 B2 | 2/2008 | Dunn |
| 7,341,364 B2 | 3/2008 | Yamaguchi et al. |
| 7,344,284 B2 | 3/2008 | Lynam et al. |
| 7,347,600 B2 | 3/2008 | Albou |
| 7,347,601 B2 | 3/2008 | Mizushima |
| 7,361,474 B2 | 4/2008 | Siegler |
| 7,364,341 B2 | 4/2008 | Parker |
| 7,402,722 B2 | 7/2008 | Hill et al. |
| 7,453,636 B2 | 11/2008 | Yeo et al. |
| 7,481,563 B2 | 1/2009 | David et al. |
| 7,498,535 B2 | 3/2009 | Blake |
| 7,695,180 B2 | 4/2010 | Schardt et al. |
| 7,995,278 B2 | 8/2011 | Endle |
| 8,362,928 B2 | 1/2013 | Lee et al. |
| 8,416,378 B2 | 4/2013 | Kim |
| 2003/0034445 A1 | 2/2003 | Boyd |
| 2003/0095770 A1 | 5/2003 | Fewkes |
| 2003/0107892 A1 | 6/2003 | Yao |
| 2003/0118807 A1 | 6/2003 | Laney et al. |
| 2003/0211317 A1 | 11/2003 | Sheridan |
| 2003/0228459 A1 | 12/2003 | Mrozinski et al. |
| 2004/0219846 A1 | 11/2004 | Sellis et al. |
| 2005/0052750 A1 | 3/2005 | King |
| 2005/0058821 A1 | 3/2005 | Smith et al. |
| 2005/0070976 A1 | 3/2005 | Samuel |
| 2005/0135117 A1 | 6/2005 | Lamb et al. |
| 2005/0254240 A1 | 11/2005 | Lawrence et al. |
| 2005/0265029 A1 | 12/2005 | Epstein et al. |
| 2005/0276071 A1 | 12/2005 | Sasagawa |
| 2006/0002126 A1 | 1/2006 | Koizumi et al. |
| 2006/0028829 A1 | 2/2006 | Amano et al. |
| 2006/0034094 A1 | 2/2006 | Asada et al. |
| 2006/0035039 A1 | 2/2006 | Ylitalo et al. |
| 2006/0044825 A1 | 3/2006 | Sa |
| 2006/0056166 A1 | 3/2006 | Yeo et al. |
| 2006/0084780 A1 | 4/2006 | Hebrink |
| 2006/0119250 A1 | 6/2006 | Suehiro et al. |
| 2006/0124938 A1 | 6/2006 | Miller et al. |
| 2006/0148915 A1 | 7/2006 | Floyd et al. |
| 2006/0171159 A1 | 8/2006 | Anderlini |
| 2006/0187552 A1 | 8/2006 | Huang |
| 2006/0216523 A1 | 9/2006 | Takaki |
| 2006/0216524 A1 | 9/2006 | Klun |
| 2006/0226561 A1 | 10/2006 | Merrill |
| 2006/0256572 A1 | 11/2006 | Lin |
| 2006/0285348 A1 | 12/2006 | Valcamp et al. |
| 2007/0006493 A1 | 1/2007 | Eberwein |
| 2007/0026167 A1 | 2/2007 | Bourdelais |
| 2007/0031641 A1 | 2/2007 | Frisch |
| 2007/0047080 A1 | 3/2007 | Stover |
| 2007/0081254 A1 | 4/2007 | Endle |
| 2007/0110960 A1 | 5/2007 | Frey |
| 2007/0120137 A1 | 5/2007 | Wilson et al. |
| 2007/0152834 A1 | 7/2007 | Mimura |
| 2007/0191506 A1 | 8/2007 | Lu et al. |
| 2007/0201246 A1 | 8/2007 | Yeo et al. |
| 2007/0209244 A1 | 9/2007 | Prollius |
| 2007/0223252 A1 | 9/2007 | Lee et al. |
| 2007/0242356 A1 | 10/2007 | Thakkar |
| 2007/0243844 A1 | 10/2007 | Cunningham et al. |
| 2007/0267133 A1 | 11/2007 | Matano |
| 2007/0279391 A1 | 12/2007 | Marttila |
| 2007/0279935 A1 | 12/2007 | Gardiner |
| 2007/0292650 A1 | 12/2007 | Suzuki |
| 2008/0049438 A1 | 2/2008 | Bloemen et al. |
| 2008/0049446 A1 | 2/2008 | Harbers et al. |
| 2008/0053800 A1 | 3/2008 | Hoyle |
| 2008/0074901 A1 | 3/2008 | David |
| 2008/0080199 A1 | 4/2008 | Sassoon |
| 2008/0084518 A1 | 4/2008 | Brott et al. |
| 2008/0118862 A1 | 5/2008 | Dunn |
| 2008/0130126 A1 | 6/2008 | Brooks |
| 2008/0232135 A1 | 9/2008 | Kinder |
| 2009/0067151 A1 | 3/2009 | Sahlin |
| 2009/0067156 A1 | 3/2009 | Bonnett et al. |
| 2009/0105437 A1 | 4/2009 | Determan et al. |
| 2009/0154141 A1 | 6/2009 | Hsiao |
| 2009/0229732 A1 | 9/2009 | Determan |
| 2009/0229766 A1 | 9/2009 | Aveldson |
| 2009/0231831 A1 | 9/2009 | Hsiao et al. |
| 2010/0026727 A1 | 2/2010 | Bita et al. |
| 2010/0046918 A1 | 2/2010 | Takao |
| 2010/0046929 A1 | 2/2010 | Takao |
| 2010/0046930 A1 | 2/2010 | Takao |
| 2010/0046931 A1 | 2/2010 | Takao |
| 2010/0048804 A1 | 2/2010 | Determan |
| 2010/0103521 A1 | 4/2010 | Smith |
| 2010/0103528 A1 | 4/2010 | Endle et al. |
| 2010/0103650 A1 | 4/2010 | Herrmann |
| 2010/0141557 A1 | 6/2010 | Gruhlke et al. |
| 2010/0156953 A1 | 6/2010 | Nevitt et al. |
| 2010/0165621 A1 | 7/2010 | Hoffend, Jr. et al. |
| 2010/0165660 A1 | 7/2010 | Weber et al. |
| 2010/0208165 A1* | 8/2010 | Kamada ............... G02B 6/0051 349/64 |
| 2010/0222496 A1 | 9/2010 | Determan |
| 2010/0238686 A1 | 9/2010 | Weber et al. |
| 2010/0265584 A1 | 10/2010 | Coggio et al. |
| 2010/0297406 A1 | 11/2010 | Schaffer |
| 2010/0322591 A1 | 12/2010 | Takao |
| 2011/0001901 A1 | 1/2011 | Solomon et al. |
| 2011/0002593 A1 | 1/2011 | Takao |
| 2011/0002662 A1 | 1/2011 | Takao |
| 2011/0020640 A1 | 1/2011 | Sherman |
| 2011/0039099 A1 | 2/2011 | Sherman et al. |
| 2011/0064916 A1 | 3/2011 | Sherman |
| 2011/0075398 A1 | 3/2011 | Wheatley et al. |
| 2011/0090423 A1 | 4/2011 | Wheatley et al. |
| 2011/0096529 A1 | 4/2011 | Wheatley et al. |
| 2011/0109965 A1 | 5/2011 | Gates |
| 2011/0122494 A1 | 5/2011 | Sherman |
| 2011/0123800 A1 | 5/2011 | Sherman et al. |
| 2011/0126868 A1 | 6/2011 | Determan |
| 2011/0126968 A1 | 6/2011 | Determan et al. |
| 2011/0134623 A1 | 6/2011 | Sherman |
| 2011/0165361 A1 | 7/2011 | Sherman |
| 2011/0170184 A1 | 7/2011 | Wolk |
| 2011/0182076 A1 | 7/2011 | Sherman |
| 2011/0253301 A1 | 10/2011 | Yamanaka |
| 2011/0255165 A1 | 10/2011 | Smith |
| 2011/0255171 A1 | 10/2011 | Endle |
| 2011/0268929 A1 | 11/2011 | Tran |
| 2012/0026431 A1 | 2/2012 | Coggio et al. |
| 2012/0027945 A1 | 2/2012 | Kolb et al. |
| 2012/0038850 A1 | 2/2012 | Hao et al. |
| 2012/0038990 A1 | 2/2012 | Hao et al. |
| 2012/0039089 A1 | 2/2012 | Hao et al. |
| 2012/0100039 A1 | 4/2012 | Appeaning et al. |

FOREIGN PATENT DOCUMENTS

| | | |
|---|---|---|
| CN | 1657816 | 8/2005 |
| CN | 201021777 | 2/2008 |
| DE | 19758551 | 7/1999 |
| DE | 10-2005-037680 | 2/2007 |
| EP | 0 291 206 | 11/1988 |
| EP | 0890503 | 1/1999 |
| EP | 0678703 | 6/1999 |
| EP | 1 103 832 A2 | 5/2001 |
| EP | 1574779 | 9/2005 |
| EP | 1724621 | 11/2006 |
| EP | 1762433 | 3/2007 |
| EP | 1 477 368 | 8/2007 |
| EP | 1857354 | 11/2007 |
| EP | 1892147 | 2/2008 |
| EP | 1332957 | 9/2008 |

(56) References Cited

FOREIGN PATENT DOCUMENTS

| | | |
|---|---|---|
| EP | 2020614 | 2/2009 |
| EP | 2028412 | 2/2009 |
| EP | 1 621 904 B1 | 12/2010 |
| FR | 2872256 | 12/2005 |
| JP | 06349305 | 12/1994 |
| JP | 11085073 A | 3/1999 |
| JP | 2000-040412 | 2/2000 |
| JP | 2000-331508 | 11/2000 |
| JP | 2001-216817 | 8/2001 |
| JP | 2003-091250 A | 3/2003 |
| JP | 2003-149642 A | 5/2003 |
| JP | 2005-078938 | 3/2005 |
| JP | 2005-181484 A | 7/2005 |
| JP | 2005-302951 | 10/2005 |
| JP | 2006-049232 | 2/2006 |
| JP | 2006-059541 | 3/2006 |
| JP | 2006-120521 A | 5/2006 |
| JP | 2006-131084 | 5/2006 |
| JP | 2006-227140 A | 8/2006 |
| JP | 2006-290232 | 10/2006 |
| JP | 2006-318718 | 11/2006 |
| JP | 2007-01522 A | 1/2007 |
| JP | 2007-114271 | 5/2007 |
| JP | 2007-123028 | 5/2007 |
| JP | 2007-207667 | 8/2007 |
| JP | 2007-227222 | 9/2007 |
| JP | 2007-323839 | 12/2007 |
| JP | 2007-324001 | 12/2007 |
| JP | 4023777 | 12/2007 |
| JP | 2008-003243 | 1/2008 |
| JP | 2009244873 A | 10/2009 |
| KR | 2001-0091192 | 10/2001 |
| KR | 10-2007-0079689 A | 8/2007 |
| KR | 2007-0111830 | 11/2007 |
| TW | I281971 | 6/2007 |
| WO | WO 1994-002022 | 2/1994 |
| WO | WO 1995-017303 | 6/1995 |
| WO | WO 1995-017691 | 6/1995 |
| WO | WO 1995-017692 | 6/1995 |
| WO | WO 1995-017699 | 6/1995 |
| WO | WO 1996-019347 | 6/1996 |
| WO | WO 97/00357 A1 | 1/1997 |
| WO | WO 1997-001440 | 1/1997 |
| WO | WO 98-36307 A2 | 8/1998 |
| WO | WO 1999-036248 | 7/1999 |
| WO | WO 1999-036262 | 7/1999 |
| WO | WO 1999-042536 | 8/1999 |
| WO | WO 1999-062822 | 12/1999 |
| WO | WO 2000-056828 | 9/2000 |
| WO | WO 2000-078885 | 12/2000 |
| WO | WO 2001-045980 | 6/2001 |
| WO | WO 2001-071396 | 9/2001 |
| WO | WO 2002-070237 | 9/2002 |
| WO | WO 2003-027568 | 4/2003 |
| WO | WO 2003-037504 | 5/2003 |
| WO | WO 2005-025938 A1 | 3/2005 |
| WO | WO 2005-044470 A1 | 5/2005 |
| WO | WO 2005/066670 A1 | 7/2005 |
| WO | WO 2005/107363 A2 | 11/2005 |
| WO | WO 2006-026743 | 3/2006 |
| WO | WO 2006-098958 | 9/2006 |
| WO | WO 2006-125174 | 11/2006 |
| WO | WO 2007-075518 | 7/2007 |
| WO | WO 2007-092152 | 8/2007 |
| WO | WO 2007-127894 | 11/2007 |
| WO | WO 2007-143383 | 12/2007 |
| WO | WO 2008-016978 | 2/2008 |
| WO | WO 2008-022007 | 2/2008 |
| WO | WO 2008-045200 | 4/2008 |
| WO | WO 2008-045207 | 4/2008 |
| WO | WO 2008-060731 | 5/2008 |
| WO | WO 2008-076612 | 6/2008 |
| WO | WO 2008-106915 | 9/2008 |
| WO | WO 2008-121475 | 10/2008 |
| WO | WO 2008-127738 | 10/2008 |
| WO | WO 2009-011684 | 1/2009 |
| WO | WO 2009-048742 | 4/2009 |
| WO | WO 2009-048743 | 4/2009 |
| WO | WO 2009-054553 | 4/2009 |
| WO | WO 2009-057844 | 5/2009 |
| WO | WO 2009-058513 | 5/2009 |
| WO | WO 2009-061673 | 5/2009 |
| WO | WO 2009-089137 | 7/2009 |
| WO | WO 2009-114683 | 9/2009 |
| WO | WO 2009-131839 | 10/2009 |
| WO | WO 2010-005810 | 1/2010 |
| WO | WO 2010-006102 | 1/2010 |
| WO | WO 2010-017087 | 2/2010 |
| WO | WO 2010-021796 | 2/2010 |
| WO | WO 2010-033571 | 3/2010 |
| WO | WO 2010-048416 | 4/2010 |
| WO | WO 2010-120468 | 10/2010 |
| WO | WO 2010-120864 | 10/2010 |
| WO | WO 2010-132176 | 11/2010 |
| WO | WO 2010-151563 | 12/2010 |
| WO | WO 2011-008441 | 1/2011 |
| WO | WO 2011-022023 | 2/2011 |
| WO | WO 2011-022525 | 2/2011 |
| WO | WO 2011-050228 | 4/2011 |
| WO | WO 2011-050232 | 4/2011 |
| WO | WO 2011-050236 | 4/2011 |
| WO | WO 2011-050254 | 4/2011 |
| WO | WO 2011-053804 | 5/2011 |
| WO | WO 2011-068754 | 6/2011 |
| WO | WO 2011-088161 | 7/2011 |
| WO | WO 2011-088216 | 7/2011 |
| WO | WO 2011-100277 | 8/2011 |
| WO | WO 2012-027377 | 3/2012 |

OTHER PUBLICATIONS

3M Scotchal™ Translucent Graphic Film IJ3630-20 Product Bulletin, Jul. 2005, 1 page.
3M™ Flexible Light Mat Series 3635-1000 Product Bulletin, The Beauty of Thinking Outside the Box, Jul. 2010, pp. 1-6.
ASTM D1003-11, "Standard Test Method for Haze and Luminous Transmittance of Transparent Plastics". 2011, 7 pages.
ASTM D2240-05, "Standard Test Method for Rubber Property—Durometer Hardness", 2005 (Reapproved 2010), 13 pages.
ASTM D4065-06, "Standard Practice for Plastics: Dynamic Mechanical Properties: Determination and Report of Procedures", 2006, 7 pages.
ASTM D412-06, "Standard Test methods for Vulcanized Rubber and Thermoplastic Elastomers Tension", 2006, 14 pages.
ASTM D4440-08, "Standard Test Method for Plastics: Dynamic Mechanical Properties Melt Rheology", 2008, 5 pages.
ASTM D5279-08, "Standard Test Method for Plastics: Dynamic Mechanical Properties: In Torsion", 2008, 4 pages.
Capodagli, "Isothermal viscoelastic properties of PMMA and LDPE over 11 decades of frequency and time: a test of time-temperature superposition", Rheologica Acta, vol. 47, Jun. 13, 2008, pp. 777-786.
"OLED 'light bandage' helps in treatment of skin cancer," *LEDs Magazine*, Nov. 2, 2006, 2 pages.
Falk, et al., "Seeing the Light—Optics in Nature, Photography, Color, Vision, and Holography," Chapter 2: Principles of Geometrical Optics, pp. 53-57.
Muto, Shinzo, et al., "Electrical Control of Laser Bean in Viscoelastic Polymer Thin-Film Waveguide", Electronics and Communications in Japan, Part 2, vol. 73, No. 3, Dec. 31, 1990.
Parke, "Anelasticity and viscoelasticity in glass", British Journal of Applied Physics, vol. 14, Feb. 18, 1963, pp. 243-248.
Satas, "Viscoelastic Properties of Commercial Pressure Sensitive Adhesives", Handbook of Pressure Sensitive Adhesive Technology, Second Edition, 1989, pp. 170-177.
Spartech, Spartech Polycast Acrylic Sheet, General Catalog, (date unknown but believed to be prior to the date of the filing of the present application), pp. 1-11.
"Viscoelasticity", Wikipedia, [retrieved from the Internet on Apr. 11, 2011], URL:http://en.wikipedia.org/wiki/Viscoelasticity, 9 pages. (XP-002632358).

(56) References Cited

OTHER PUBLICATIONS

Williams, "Good News! Polymer OLED Technology Is About to Come to a Sticky End," *Electronics World*, Oct. 2007, p. 40-41.
Written Opinion for PCT/US2009/046097, dated Dec. 30, 2009, 3 pages.
International Search Report for PCT/US2009/052198, dated Dec. 28, 2009, 3 pages.
International Search Report for PCT/US2010/039580, dated Dec. 15, 2010, 3 pages.
U.S. Appl. No. 61/294,600 entitled "Microstructured Low Refractive Index Articles," filed Jan. 13, 2010.
U.S. Appl. No. 61/294,577 entitled "Microstructured Low Refractive Index Article Process," filed Jan. 13, 2010.
U.S. Appl. No. 61/391,766 entitled Illumination Device Having Viscoelastic Lightguide, filed Oct. 11, 2010.
U.S. Appl. No. 61/446,740 entitled Front-Lit Reflective Display Device and Method of Front-Lighting Reflective Display, filed Feb. 25, 2011.
U.S. Appl. No. 61/446,642 entitled Variable Index Light Extraction Layer and Method of Illuminating with Same, filed Feb. 25, 2011.
U.S. Appl. No. 61/446,712 entitled Illumination Article and Device for Front-Lighting Reflective Scattering Element, filed Feb. 25, 2011.
U.S. Appl. No. 61/485,881 entitled Back-lit Transmissive Display Having Variable Index Light Extraction Layer filed May 13, 2011.
U.S. Appl. No. 61/294,689 entitled "Devices and method with Viscoelastic Material," filed Jan. 13, 2010.

\* cited by examiner

LIGHT SOURCE AND OPTICAL ARTICLE INCLUDING VISCOELASTIC LIGHTGUIDE DISPOSED ON A SUBSTRATE

CROSS REFERENCE TO RELATED APPLICATIONS

The application is a continuation of U.S. application Ser. No. 13/003,208, filed on Apr. 4, 2011, which is a national stage filing under 35 U.S.C. 371 of PCT/US2009/046097, filed on Jun. 3, 2009, which claims priority to U.S. Provisional Application No. 61/079,639, filed Jul. 10, 2008, U.S. Provisional Application No. 61/114,865, filed Nov. 14, 2008, and U.S. Provisional Application No. 61/169,973, filed Apr. 16, 2009, the disclosures of which are incorporated by reference in their entirety herein.

FIELD

This disclosure relates to optical articles and devices, particularly lightguides used to facilitate distribution of light in electronic devices. The lightguides are made with viscoelastic materials.

BACKGROUND

Lightguides are used to facilitate distribution of light from a light source over an area much larger than the light source. Lightguides comprise optically transmissive materials and may have different forms such as slab, wedge, and pseudo-wedge forms. Most lightguides are designed to accept light at an edge surface and allow this light to propagate by total internal reflection between a back surface and an output surface, toward an opposing edge surface from which the light enters. Light is emitted uniformly from the output surface using extracting features that are positioned in various types of patterns on the output surface.

SUMMARY

Disclosed herein is an optical device having a light source and a viscoelastic lightguide. Light from the light source enters the viscoelastic lightguide and is transported within the lightguide by total internal reflection. The viscoelastic lightguide may comprise a pressure sensitive adhesive. The optical device may be used in a variety of constructions wherein the device emits light being transported within the viscoelastic lightguide. Constructions include those used for signs, markings, illumination devices, display devices, keypad assemblies and tail light assemblies for vehicles.

These and other aspects of the invention are described in the detailed description below. In no event should the above summary be construed as a limitation on the claimed subject matter which is defined solely by the claims as set forth herein.

BRIEF DESCRIPTIONS OF DRAWINGS

Advantages and features of the invention may be more completely understood by consideration of the following figures in connection with the detailed description provided below. The figures are schematic drawings of various articles and are not necessarily drawn to scale.

FIGS. 3a-b, 4a-b, 5a-5c and 6a-b show schematic cross sections of exemplary viscoelastic lightguides.

FIGS. 7-12 show schematic perspective views of exemplary viscoelastic lightguides.

Figure 13:
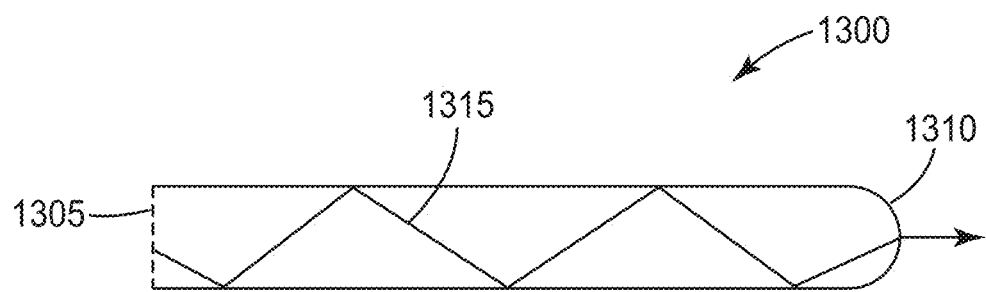

FIG. 13 shows a schematic cross section of an exemplary viscoelastic lightguide.

FIGS. 14 and 15a-l show schematic cross sections of exemplary optical articles.

Figure 16:
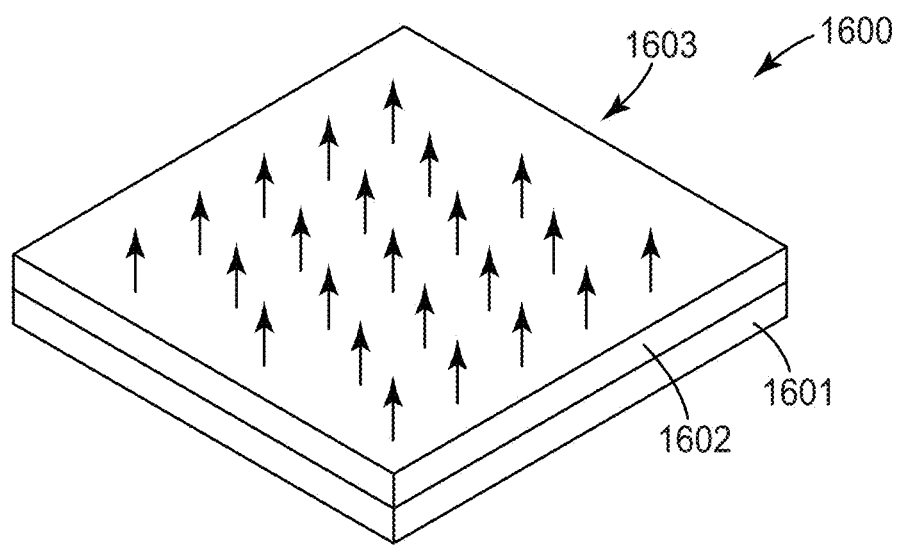
Figure 17:
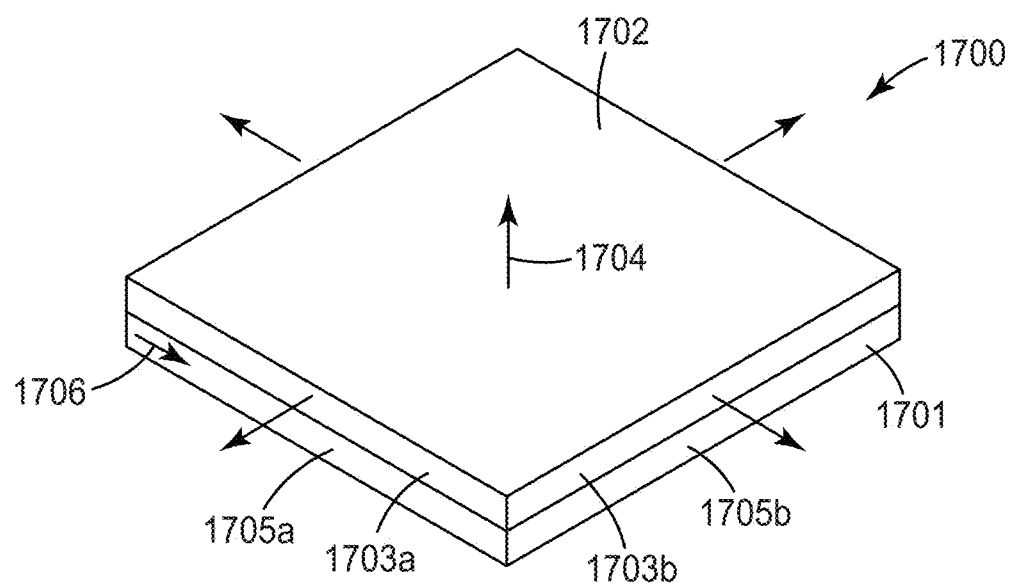

FIGS. 16 and 17 show schematic perspective views of exemplary optical articles.

Figure 18A:
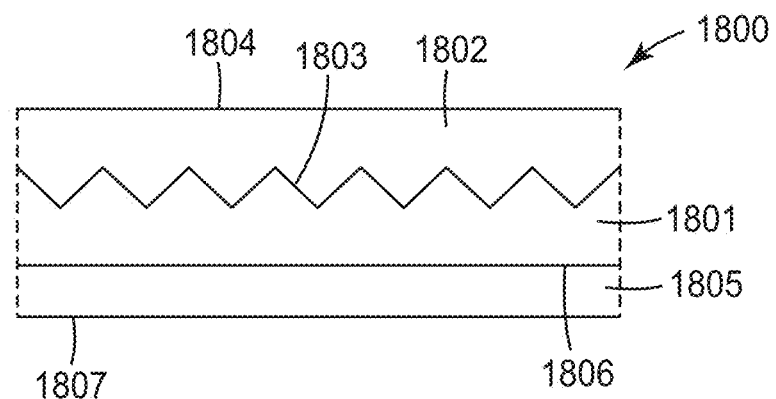
Figure 18B:
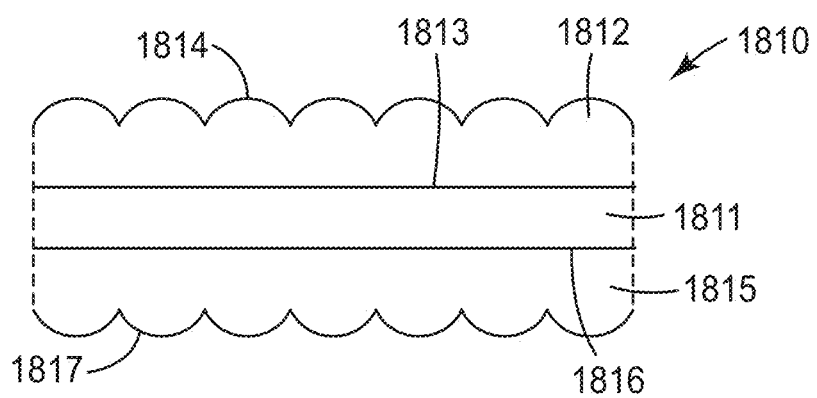

FIGS. 18a-b show schematic cross sections of exemplary optical articles.

FIGS. 19-25 show schematic drawings of exemplary signs and markings comprising exemplary optical articles.

Figure 26A:
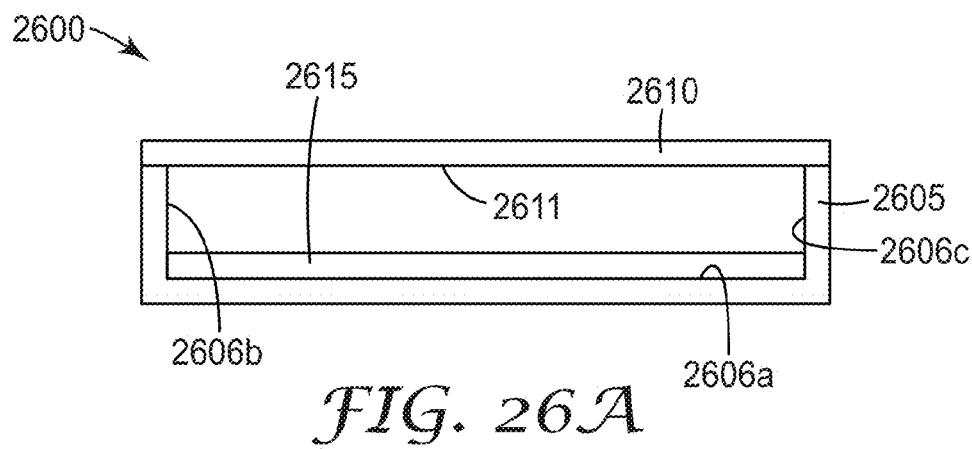
Figure 26B:
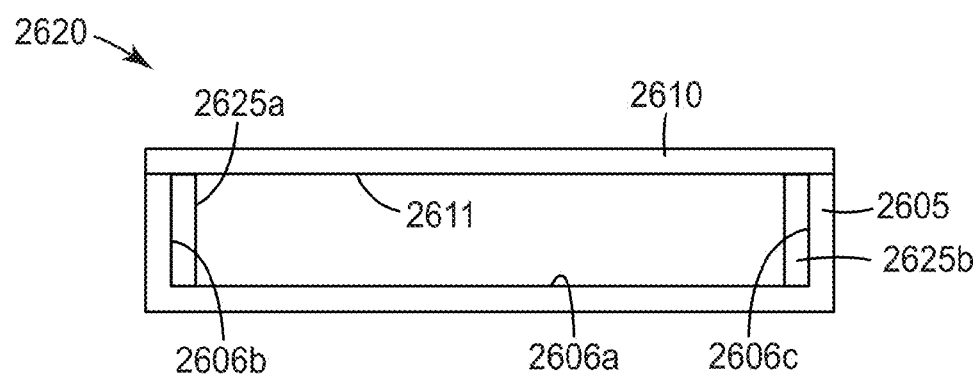
Figure 26C:
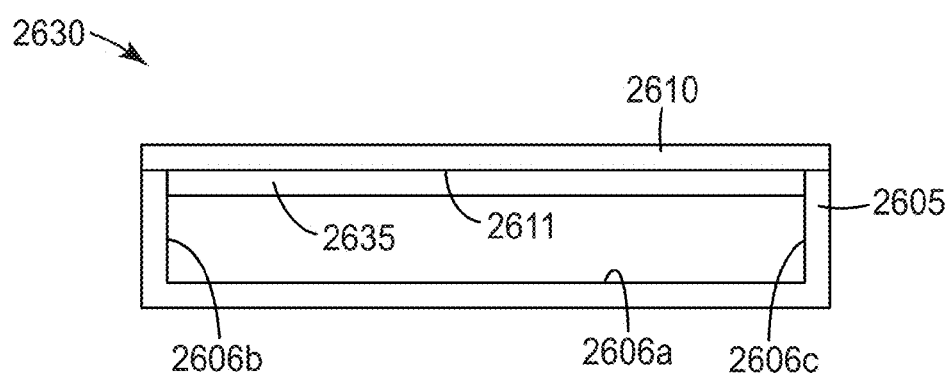

FIGS. 26a-c show schematic cross sections of exemplary illumination devices comprising exemplary optical articles.

Figure 27:
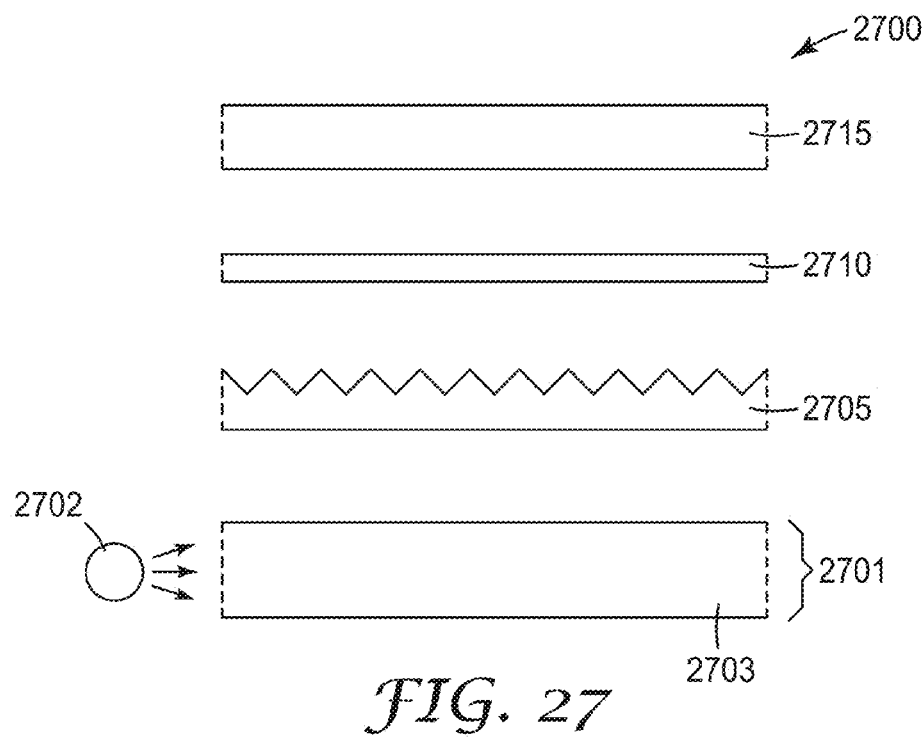

FIG. 27 comprises a display device comprising an exemplary optical article.

Figure 28:
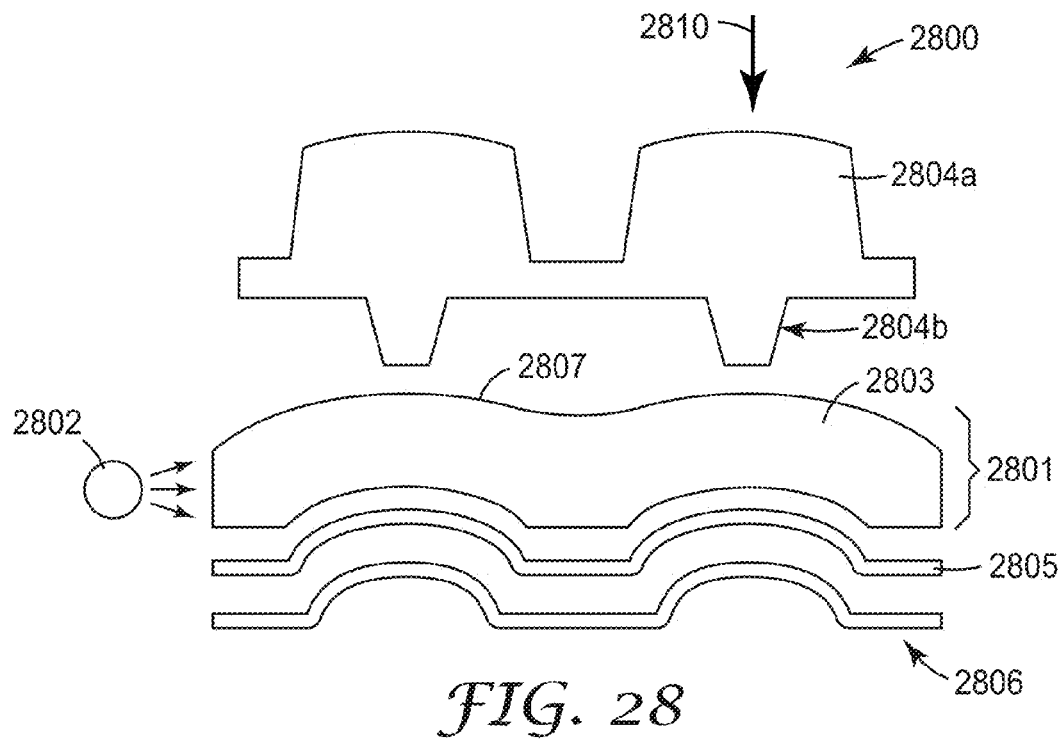

FIG. 28 comprises a keypad assembly comprising an exemplary optical article.

Figure 29:
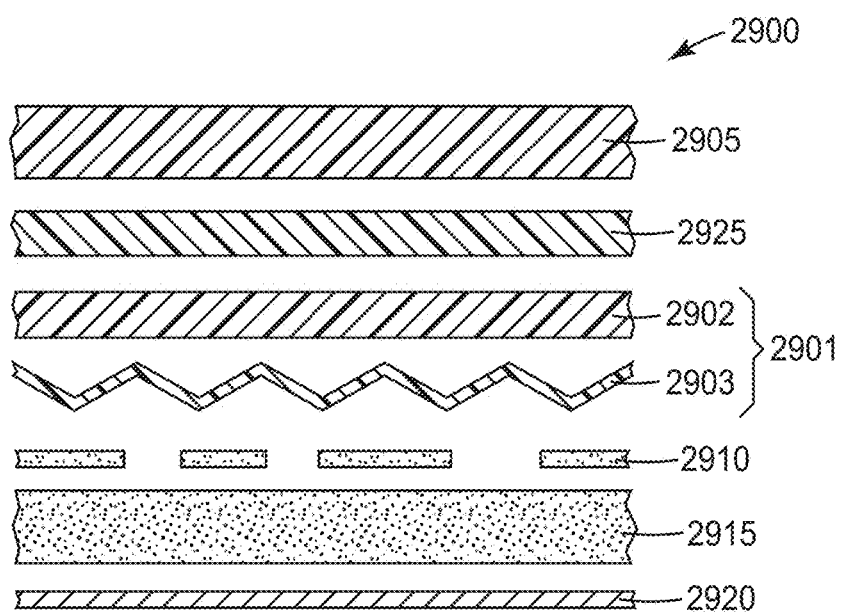

FIG. 29 comprises a multilayer graphic comprising an exemplary optical article.

DETAILED DESCRIPTION

This disclosure relates to U.S. Provisional Application Nos. 61/079,639 filed on Jul. 10, 2008 (64347US002, Sherman et al.); 61/087,387 filed on Aug. 8, 2008 (64691US002, Sherman et al.); 61/114,865 filed on Nov. 14, 2008 (64347US003, Sherman et al.); and 61/114,849 filed on Nov. 14, 2008 (64691US003, Sherman et al.).

The optical device disclosed herein includes a light source that emits light, and the light is managed by a viscoelastic lightguide. The optical device may provide one or more advantages. For example, the viscoelastic lightguide is generally soft and compliant such that the light source may be easily coupled to the lightguide so that light can enter the lightguide. In some embodiments, the viscoelastic lightguide comprises a PSA which is generally tacky at room temperature. The light source may then be coupled to the viscoelastic lightguide such that it is adhered to the lightguide. This may facilitate assembly of the optical device itself or constructions in which the device is used.

Light is typically extracted from the viscoelastic lightguide at one or more desired locations or areas of the lightguide. In some embodiments, an extractor may be used to extract light from the viscoelastic lightguide. Again, due to the soft and compliant properties of the viscoelastic lightguide, the extractor may be easily coupled to the lightguide so that light can enter the lightguide. If the viscoelastic lightguide comprises a PSA, the extractor can be directly adhered to the lightguide without the need for additional materials to bond the two together.

The optical device may be used to provide light anywhere it is desired. The optical articles and optical devices may be designed for interior and/or exterior use. The optical articles and optical devices may be designed for household, commercial and/or industrial use. The optical device may be used and/or provided in a construction so that it is portable, i.e., it is a portable source of light. Lighted tapes, signs, labels, stickers, cut-outs, etc. are examples of portable constructions that may be made using the optical device. The optical device may also be used and/or provided in a more stationary construction such as in an electronic display device.

The optical device may also be used to provide "light on demand", e.g., the light source may be activated only under certain conditions such as when parking a vehicle. The optical device may be used to provide exterior lighting of a vehicle, e.g., for tail lights, replacing tail light cavities and their lighting assemblies and which are very space consuming.

The viscoelastic lightguide can be used in place of a conventional lightguide used to light display devices. For example, the viscoelastic lightguide may be used to replace a solid or hollow lightguide that distributes light from one or more substantially linear or point light sources. The viscoelastic lightguide can be assembled in a display device without the need for additional materials to bond the lightguide to the display device.

The optical device may also be very adaptable, even by a user, so that it can be used in different lighting forms and constructions. For example, the viscoelastic lightguide may be provided in roll or sheet form such that it can be cut into various shapes and sizes. The light source may also be interchangeable with the viscoelastic lightguide, for example, if the light source should become unusable or if a different color of light is desired. Further, if used in a sign construction, graphics can be interchanged, for example, if one would like to update an advertisement.

The optical device may provide many more advantages. The optical device can be used to provide light that is bright, diffuse, uniform and/or concentrated over particular areas. The optical device may provide advantages by being thin, flexible (can be flexed by hand) and/or lightweight, and it may even be conformable to a particular shape and size. The viscoelastic lightguide may be tiled to light large areas which may be made easier if the lightguides can be stuck together. Due to its viscoelastic properties, the viscoelastic lightguide may also dampen stresses experienced by the optical device or construction in which the device is used. The viscoelastic lightguide, when disposed on a substrate, may be removable and/or repositionable over time. The optical device may also provide advantages related to cost, because it can be made from commercially available light sources and viscoelastic materials. Additional advantages are described below.

The optical device disclosed herein comprises a viscoelastic lightguide and a light source. Light is emitted by the light source, enters the viscoelastic lightguide, and propagates, reflects, and/or refracts according to the law of refraction and the principle of total internal reflection. The behavior of light within the viscoelastic lightguide may depend on a variety of factors such as the surface structure of the lightguide, the presence (or absence) of additional substrate(s) in contact with the viscoelastic lightguide, and/or the material compositions of the viscoelastic lightguide and any additional substrate(s) in contact with the viscoelastic lightguide. In addition, the behavior of light within the viscoelastic lightguide may depend on the angular distribution of light that enters the lightguide.

A brief description of the law of refraction and total internal reflection is provided for the convenience of the reader. This brief description forms the basis for understanding the behavior of light with respect to the optical device disclosed herein. For a detailed description of the behavior of light see, for example: "Seeing the Light" by D. S. Falk et al., John Wiley and Sons, Inc., 1986, pp. 53-56.

Figure 1A:
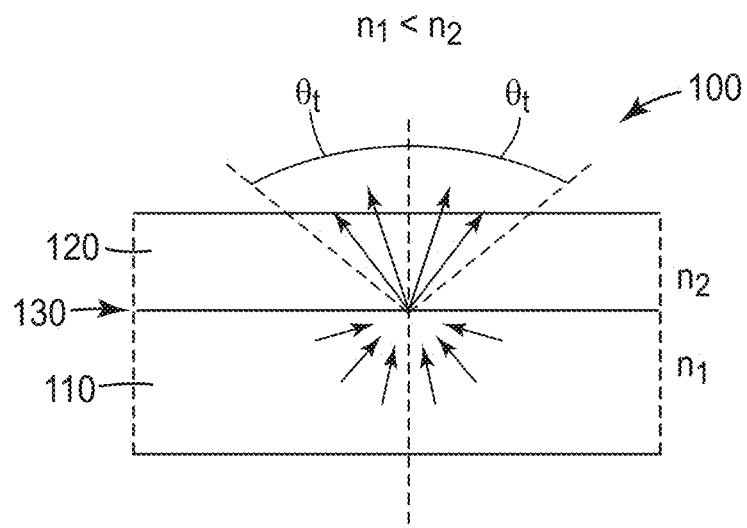
FIGS. 1a and 1b are schematic cross sections of layers illustrating principles of geometric optics.
Figure 1B:
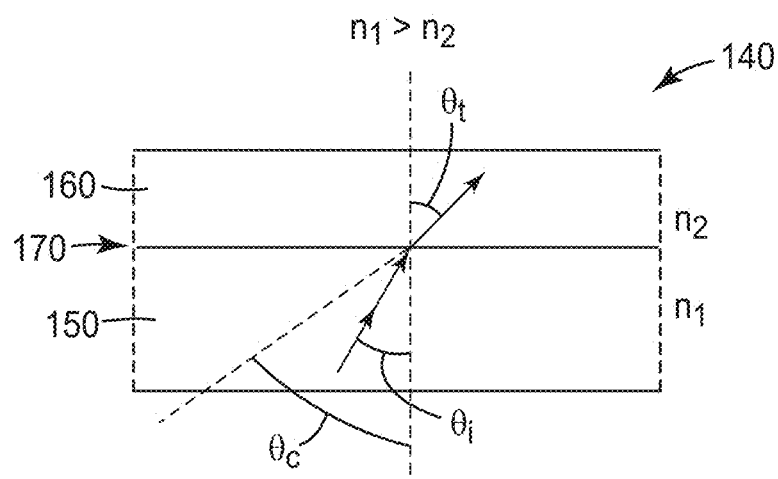

The law of refraction is illustrated in FIGS. 1a and 1b for a given pair of first and second layers. Light (represented by one or more rays for simplicity) propagates within the first layer and strikes the interface between the two layers. The light refracts, at a transmittance angle $\theta_t$, into the second layer according to the law of refraction:

$$\sin \theta_t = (n_1/n_2)(\sin \theta_i)$$

wherein $\theta_i$ is the incident angle, and $n_1$ and $n_2$ are the refractive indices of the first and second layers, respectively.

FIG. 1a shows a pair of layers 100 having first layer 110 and second layer 120 with refractive indices $n_1$ and $n_2$, respectively, such that $n_1 < n_2$. Light propagating within the first layer strikes interface 130 at many different incident angles and refracts into the second layer at angles within the transmittance angles $\theta_t$.

FIG. 1b shows a pair of layers 140 having first layer 150 and second layer 160 with refractive indices $n_1$ and $n_2$, respectively, such that $n_1 > n_2$. Light propagating within the first layer strikes interface 170 at incident angle $\theta_i$ and refracts at transmittance angle $\theta_t$ into the second layer according to the law of refraction. Only light having an incident angle less than or equal to critical angle $\theta_c$ will enter the second layer. All other light incident upon the interface is reflected. The critical angle $\theta_c$ is defined as:

$$\sin \theta_c = n_2/n_1$$

In general, total internal reflection occurs when light having a particular angular component or distribution is incident upon an interface at one or more angles greater than the critical angle $\theta_c$.

Figure 2:
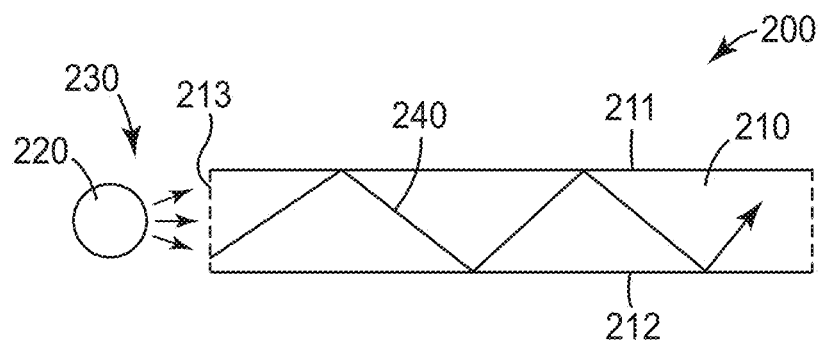
FIG. 2 shows a schematic cross section of an exemplary optical device.

FIG. 2 shows an exemplary optical device 200. Light source 220 is positioned relative to viscoelastic lightguide 210 such that light emitted by the light source enters viscoelastic lightguide 210 and is transported within the layer by total internal reflection. Light emitted by the light source is represented by rays 230 which enter viscoelastic lightguide 210 through input surface 213 adapted to receive light from the light source. Light within the viscoelastic lightguide is represented by single ray 240 which is transported by total internal reflection. At least a portion of the viscoelastic lightguide has an optically smooth surface 211 and/or 212.

An optically smooth surface, as used herein, means that the surface is smooth enough such that light incident upon the surface is not affected undesirably by the surface, e.g., the surface is free of defects having at least one dimension larger than the wavelength of the incident light. The optically smooth surface allows at least some of the light entering the viscoelastic lightguide to be reflected at the surface such that this light continues to propagate within the layer according to the principle of total internal reflection.

In general, light propagating within the viscoelastic lightguide is either reflected or extracted from the lightguide. For reflection of light incident on an optically smooth surface, the observed reflection angle is within about 10° of the calculated reflection angle. Likewise, for refraction of light incident on an optically smooth surface, the observed transmittance angle is within about 10° of the calculated transmittance angle. Total internal reflection occurs if a predetermined amount, or at least within about 10% of a predetermined amount, of light does not escape the viscoelastic lightguide unless it is intentionally extracted from the lightguide.

In general, the surfaces of the viscoelastic lightguide may be unstructured as shown in FIG. 2, or they may have any three-dimensional structure depending on the desired effect. In general, a surface of the viscoelastic lightguide may comprise at least one feature that extends along a portion of the surface and is oriented to extract light from the viscoelastic lightguide. In some embodiments, the at least one feature comprises a plurality of features, the features comprising protrusions, depressions, or a combination thereof. Exemplary features comprise protrusions and/or depressions having lenticular, prismatic, ellipsoidal, conical, parabolic, pyramidal, square, or rectangular shapes, or a combination thereof. Features comprising lenses are particularly useful for directing light to a preferred angular distribution. Exemplary features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. A viscoelastic lightguide may have features that are all the same shape, but the sizes of the shapes may vary in at least one dimension. A viscoelastic lightguide may also have features that are different shapes, and the sizes of these features may or may not vary in any given dimension.

Surface structures of the features may also be varied. Surface structure of a feature generally refers to the substructure of the feature. Exemplary surface structures include optically smooth surfaces, irregular surfaces, patterned surfaces, or a combination thereof. For a viscoelastic lightguide having a plurality of features, each of the features may have the same surface structure. For a viscoelastic lightguide having a plurality of features, some of the features may have the same surface structure. For a viscoelastic lightguide having a plurality of features, each of the features may have a different surface structure. The surface structure of a feature may vary over portions of the feature.

An optically smooth surface of a feature may form part of the optically smooth surface of the viscoelastic lightguide. The optically smooth surfaces of the feature and the viscoelastic lightguide may be continuous or discontinuous with each other. If a plurality of features is used, the surfaces of some extracting features may be completely optically smooth or some may be partially optically smooth. The optically smooth surface may be in contact with an adjacent lightguide or substrate on which the viscoelastic lightguide is disposed.

The number of features, if used, for a given viscoelastic lightguide is at least one. A plurality of features, meaning at least two, may also be used. In general, any number of features may be included, e.g., 0, 1, 2, 3, 4 or 5 features; greater than 1, greater than 10, greater than 20, greater than 30, greater than 40, greater than 50, greater than 100, greater than 200, greater than 500, greater than 1000, or greater than 2000 features; or from about 1 to about 10, from about 1 to about 20, from about 1 to about 30, from about 1 to about 40, from about 1 to about 50, from about 1 to about 100, from about 1 to about 200, from about 1 to about 500, from about 1 to about 1000, or from about 1 to about 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be arranged to obtain a desired optical effect. The features may be arranged to extract light uniformly or as a gradient from the viscoelastic lightguide, to hide discrete light sources, or to reduce Moiré.

The features may be used to control the amount and/or direction of light extracted from the viscoelastic lightguide. This can be carried out generally by varying the shape, size, surface structure, and/or orientation of the features. If a plurality of features is used, then the number and/or arrangement of the features may be varied, as well as the orientation of the features relative to each other.

In general, one may determine theoretically how varying the orientation of each feature can affect the amount and distribution of light that may be extracted from the viscoelastic lightguide. This may be carried out using ray tracing techniques consistent with the law of refraction and the principle of total internal reflection.

The shape of a feature may change the angular component of light which can increase or decrease the amount of light extracted from the viscoelastic lightguide. This may be the case if light propagates by total internal reflection within the viscoelastic lightguide and strikes a surface of a feature at an angle less than, equal to, or greater than the critical angle for the viscoelastic lightguide and air and/or an adjacent substrate(s). The amount of light extracted from the viscoelastic lightguide may increase or decrease accordingly.

The size of a feature may be changed such that more or less light can reflect off a surface of the feature, thus increasing or decreasing the amount of light extracted from the viscoelastic lightguide.

The surface structure of a feature may be used to control the distribution of light that is extracted from the viscoelastic lightguide. Light having a particular angular distribution may strike a feature and be extracted uniformly and/or randomly from the viscoelastic lightguide. Light may also be extracted uniformly and in a pattern, or randomly and in a pattern.

Figure 3A:
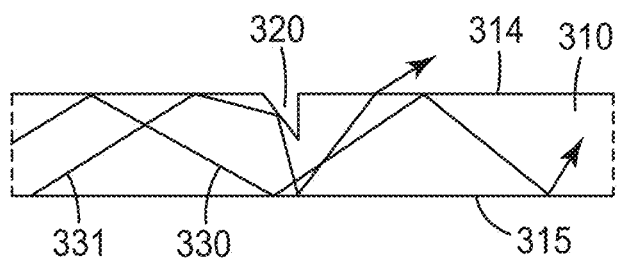
Figure 3B:
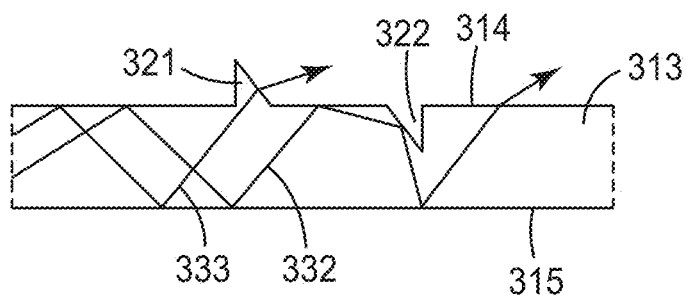

FIG. 3a shows a schematic cross section of exemplary viscoelastic lightguide 310 comprising feature 320. In this example, the feature is a notch-like depression of surface 311. Surfaces 311 and 312 are optically smooth surfaces. The surfaces of feature 320 are optically smooth surfaces. Exemplary behavior of light within viscoelastic lightguide 310 is shown by rays 330 and 331. Light represented by ray 330 propagates by total internal reflection within viscoelastic lightguide 310. Light represented by ray 331 propagates by total internal reflection within viscoelastic lightguide 310 and eventually strikes a surface of feature 320. As a result, the angular component of ray 331 is changed, and light represented by this ray can strike surface 312 at an angle less than the critical angle such that the light is extracted from viscoelastic lightguide 310. Thus, as exemplified in FIG. 3a, the amount of light extracted from the viscoelastic lightguide may be increased. The direction in which light may be extracted from the viscoelastic lightguide may be varied by changing the orientation of feature 320 such that the angle at which ray 331 strikes the feature is increased or decreased but remains less than or equal to the critical angle. FIG. 3b shows a schematic cross section of exemplary viscoelastic lightguide 313 comprising features 321 and 322. In this example, the features are notch-like features with one being a protrusion of surface 314 and the other a depression. Surfaces 314 and 315 are optically smooth surfaces. The surfaces of features 321 and 322 are optically smooth surfaces. Exemplary behavior of light within viscoelastic lightguide 313 is shown by rays 332 and 333. Light represented by ray 332 propagates by total internal reflection within viscoelastic lightguide 313 and eventually strikes a surface of feature 322. As a result, the angular component of ray 332 is changed, and light represented by this ray can strike surface 314 at an angle less than the critical angle such that the light is extracted from viscoelastic lightguide 313. Light represented by ray 333 propagates by total internal reflection within viscoelastic lightguide 313 and eventually strikes a surface of feature 321. As a result, the angular component of ray 333 is changed, and light represented by this ray can strike surface 314 at an angle less than the critical angle such that the light is extracted from viscoelastic lightguide 313. Thus, as exemplified in FIG. 3*b*, the amount of light extracted from the viscoelastic lightguide may be increased, and the direction(s) in which light may be extracted from the viscoelastic lightguide may be varied by changing the orientation of the feature(s).

Figure 4A:
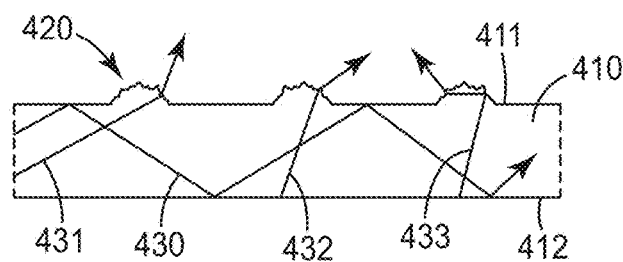

FIG. 4*a* shows a schematic cross section of exemplary viscoelastic lightguide 410 comprising features 420 that protrude from surface 411. Each of the features 420 has an overall hemispherical shape with an irregular surface for diffusing light. Surface 411 is optically smooth and includes the surface around each of the features and is generally continuous. Thus, the surfaces of features 420 are not part of the optically smooth surface 411. Surface 412 is optically smooth. Exemplary behavior of light within viscoelastic lightguide 410 is shown by rays 430-433. Light represented by ray 430 propagates by total internal reflection within viscoelastic lightguide 410. Light represented by rays 431-433, having different angular components, propagates within the viscoelastic lightguide and strikes features 420. Light represented by rays 431 and 432 is extracted from viscoelastic lightguide 410 because both rays strike surfaces of features 420 at angles less than that of the critical angle. Light represented by ray 433, having an angular component different from that of rays 431 and 432, reflects at the surface of feature 420 because the incident angle is greater than the critical angle. The reflected light strikes the surface of the feature again, this time at an angle less than the critical angle, and the light is extracted from viscoelastic lightguide 410.

Figure 4B:
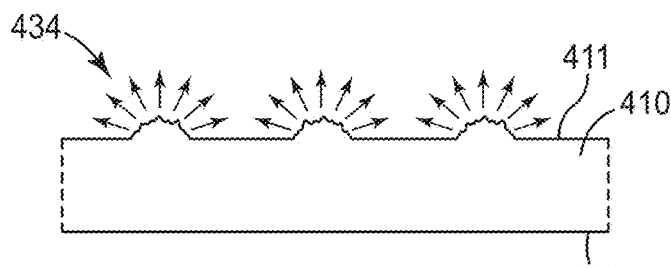

FIG. 4*b* shows the schematic cross section of exemplary viscoelastic lightguide 410. Light (not shown) having a wide angular distribution propagates within viscoelastic lightguide 410 such that it is extracted diffusely from the lightguide as represented by rays 434.

Figure 5A:
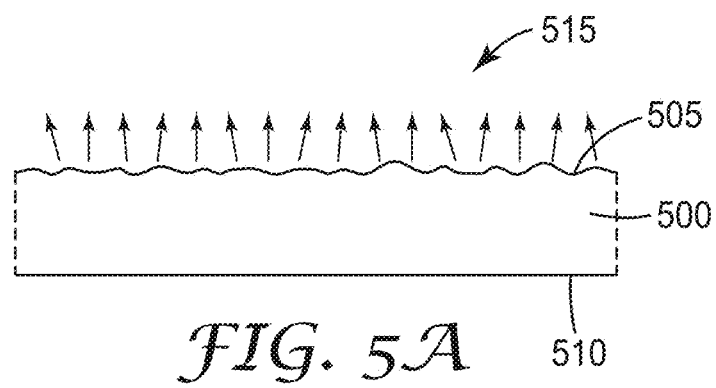
Figure 5B:
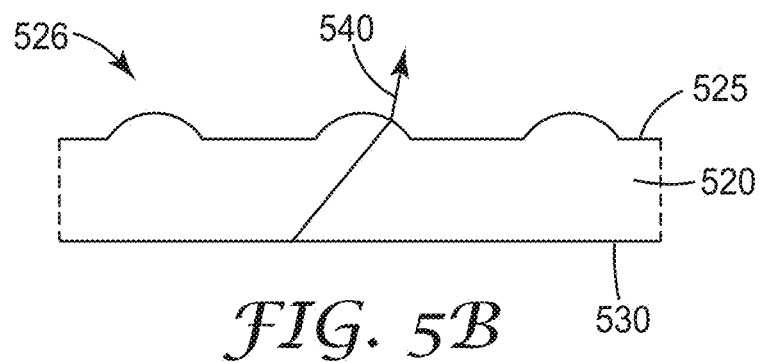
Figure 5C:
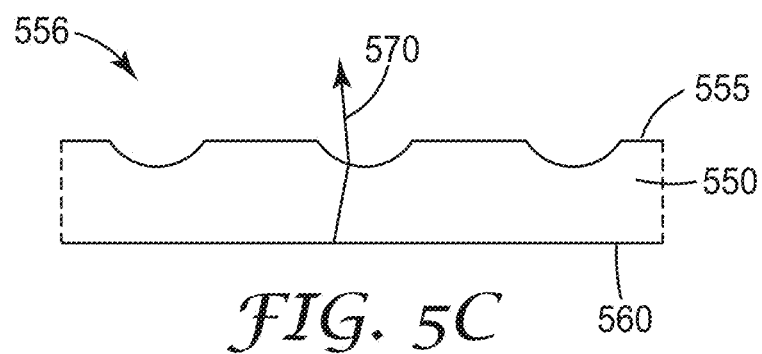

FIGS. 5*a*-5*c* show schematic cross sections of exemplary viscoelastic lightguides that may be used. In FIG. 5*a*, viscoelastic lightguide 500 comprises surface 505 which is irregular such that light represented by rays 515 is diffused upon being extracted from the viscoelastic lightguide. Viscoelastic lightguide 500 also comprises opposing surface 510 which may be an optically smooth surface, a non-optically smooth surface, or a partially optically smooth surface. In FIG. 5*b*, viscoelastic lightguide 520 comprises optically smooth surface 525 which includes the optically smooth surfaces of features 526. The features comprise discreet convex lenticular features such that light represented by ray 540 is extracted from the viscoelastic lightguide at a predetermined direction. Viscoelastic lightguide 520 also comprises opposing surface 530 which may be an optically smooth surface, a non-optically smooth surface, or a partially optically smooth surface. In FIG. 5*c*, viscoelastic lightguide 550 comprises optically smooth surface 555 which includes the optically smooth surfaces of features 556. The features comprise discreet concave lenticular features such that light represented by ray 570 is emitted from the viscoelastic lightguide at a predetermined direction. Viscoelastic lightguide 550 also comprises opposing surface 560 which may be an optically smooth surface, a non-optically smooth surface, or a partially optically smooth surface.

Figure 6A:
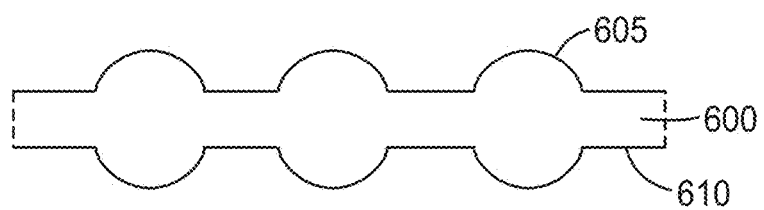
Figure 6B:
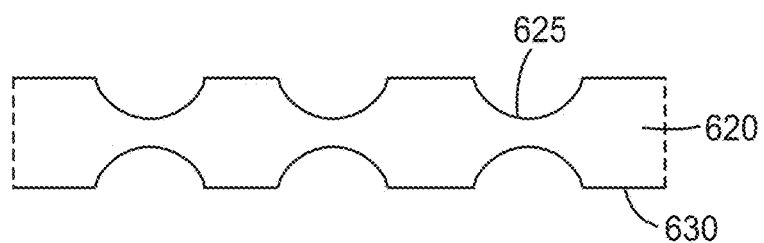

The viscoelastic lightguide may have opposing surfaces that are configured dependently or independently relative to each other. FIG. 6*a* shows a schematic cross section of viscoelastic lightguide 600 comprising optically smooth surfaces 605 and 610, each surface including individual convex lenticular features. The features of each surface can be aligned or nearly aligned with each other, or at least within about 100 um. FIG. 6*b* shows a schematic cross section of viscoelastic lightguide 620 comprising optically smooth surfaces 625 and 630, each surface including individual concave lenticular features. The features of each surface can be aligned or nearly aligned with each other, or at least within about 100 um.

Exemplary features are described in U.S. Pat. No. 6,379,016 B1 (Boyd et al.); U.S. Pat. No. 7,046,905 B1 (Gardiner et al.); US 2003/0034445 A1 (Boyd et al.); US 2007/0047254 A1 (Gardiner et al.); US 2008/232135 A1 (Kinder et al.); and U.S. Ser. No. 12/199,862 (63619US006, Sahlin, et al.).

The amount and direction of light extracted from the viscoelastic lightguide may be controlled, at the very least, by the shape, size, number, arrangement, etc. of the features. In general, the viscoelastic lightguide can be designed such that light may be extracted from the lightguide in at least one predetermined direction, e.g., 1, 2, 3, 4, 5, 6, 7, 8, 9, 10, or more predetermined directions; from 1 to about 3 predetermined directions; from 1 to about 5 predetermined directions; from 1 to about 10 predetermined directions; or from 1 to about 100 predetermined directions. The light extracted in at least one predetermined direction may be extracted in a pattern. The light extracted in at least one predetermined direction may be extracted uniformly (at the same or nearly the same intensity) or non-uniformly from the viscoelastic lightguide. Light may also be extracted in random directions from the viscoelastic lightguide and/or at various random intensities from the lightguide.

Figure 7:
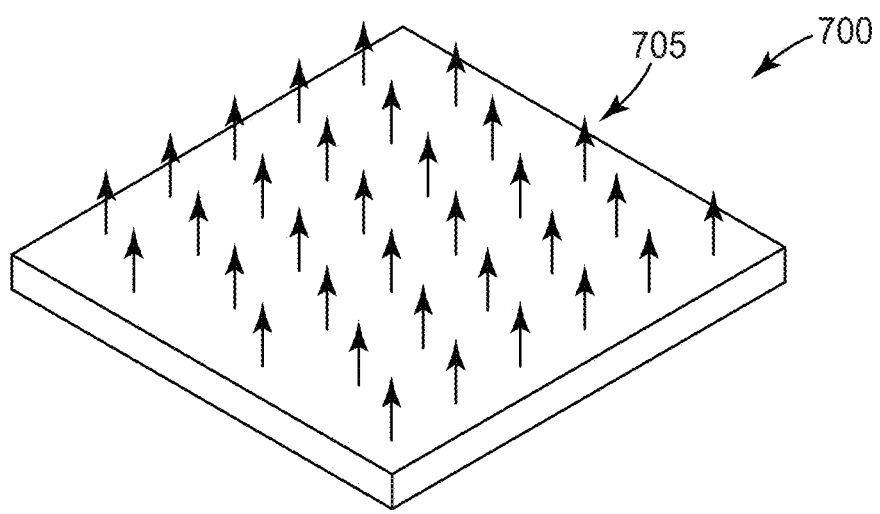
Figure 8:
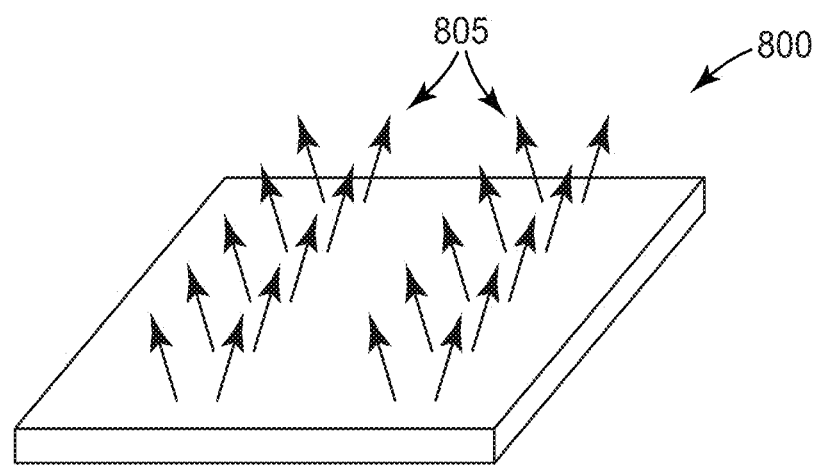
Figure 9:
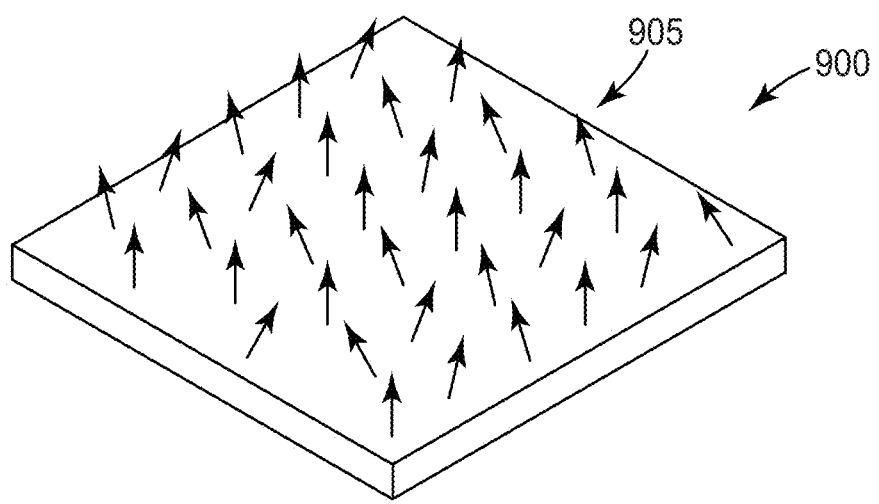

FIGS. 7-11 show perspective views of exemplary viscoelastic lightguides and how light may be extracted therefrom. The viscoelastic lightguides shown in FIGS. 7-11 are depicted generically as sheets having square to rectangular shapes. Many other three-dimensional shapes are contemplated as described below. FIG. 7 shows a perspective view of exemplary viscoelastic lightguide 700 wherein light represented by rays 705 is extracted in a predetermined direction from the lightguide. FIG. 8 shows a perspective view of exemplary viscoelastic lightguide 800 wherein light represented by rays 805 is extracted in two predetermined directions from the lightguide. Light represented by rays 805 is also extracted in a pattern. FIG. 9 shows a perspective view of exemplary viscoelastic lightguide 900 wherein light represented by rays 905 is extracted randomly from the lightguide.

Figure 10:
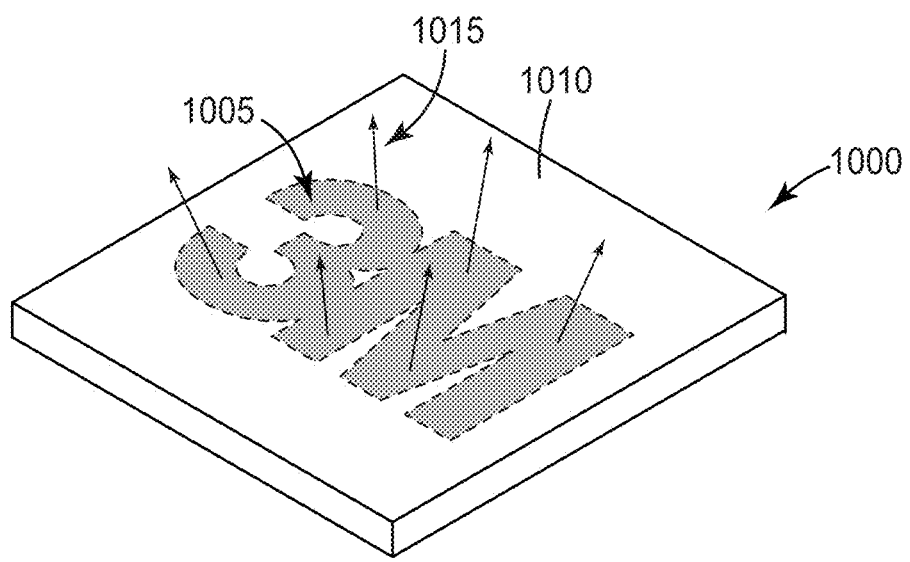

FIG. 10 shows a perspective view of exemplary viscoelastic lightguide 1000. Predetermined shape 1005 is shown by a dotted line and shaded area of surface 1010 of the lightguide. Light represented by rays 1015 is extracted from viscoelastic lightguide 1000 such that the predetermined shape is illuminated. In general, the predetermined shape may comprise one or more discrete areas of the viscoelastic lightguide. Light may be extracted from one or more discrete areas of the viscoelastic lightguide, e.g., 1, 2, 3, 4, 5, 6, 7, 8, 9, 10, or more discrete areas, or from 1 to about 5 discrete areas, from 1 to about 50 discrete areas, or from 1 to about 500 discrete areas.

Figure 11:
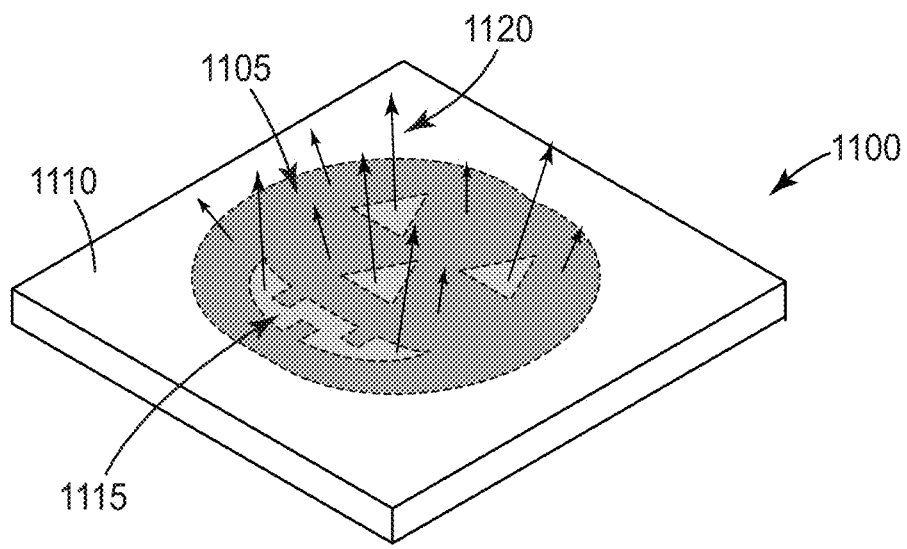

FIG. 11 shows a perspective view of exemplary viscoelastic lightguide 1100. Predetermined shape 1105 is shown by a dotted line and shaded area of surface 1110. Predetermined shapes 1115 within predetermined shape 1105 are shown by dotted lines and lightly shaded areas. Light represented by rays 1120 is extracted at different intensities such that light extracted from predetermined shapes 1115 is extracted at a higher intensity as compared to light extracted from predetermined shape 1105. In this way, predetermined shape 1105 is illuminated and predetermined shapes 1115 are illuminated at higher intensities.

Figure 12:
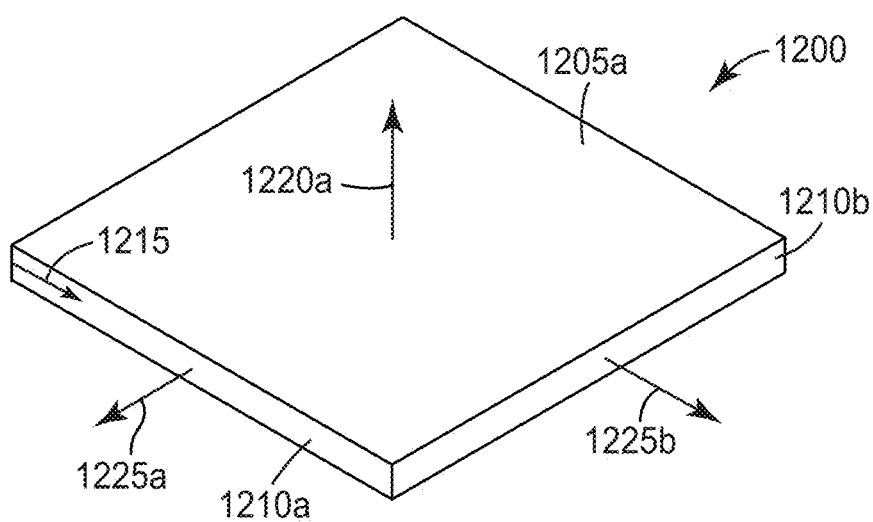

In the examples presented so far, light is shown as being extracted from a surface of the viscoelastic lightguide that is generally perpendicular to the input surface, from opposing surfaces of the lightguide that are generally perpendicular to the input surface, or from a surface that is a major surface of the lightguide. Light may also be extracted from other surfaces of the viscoelastic lightguide. FIG. 12 illustrates how light may be extracted from an exemplary viscoelastic lightguide shaped as a film or sheet. FIG. 12 shows a perspective view of exemplary viscoelastic lightguide 1200 comprising opposing major surfaces 1205a and 1205b (not shown) and edge surfaces 1225a, 1225b, and 1225c (not shown). In general, light may be extracted from one or some combination of surfaces 1205a, 1205b, or 1225a-c. For example, light may be extracted only from major surface 1205a as shown by ray 1220a. For another example, light may be extracted only from edge surface 1225b. Light which enters the viscoelastic lightguide is shown by ray 1215.

FIG. 13 shows a schematic cross section of exemplary viscoelastic lightguide 1300 comprising input edge 1305 and opposing edge surface 1310 having a lenticular surface for directing light in one or more predetermined directions. Light emitted by a light source (not shown) and represented by ray 1315 enters the lightguide (at a first surface) and is transported by total internal reflection within the lightguide until it is extracted from opposing edge surface 1310 (opposing second surface). Light emitted by a light source may also enter the viscoelastic lightguide at a first surface of the lightguide and be extracted at a second surface, wherein the first and second surfaces are from about 45 to about 135° relative to each other.

In some embodiments, a surface of the viscoelastic lightguide is microstructured to form air release channels. As used herein, microstructured refers to a surface having one or more features that are microscopic (from about 1 to about 100 um) in at least one dimension. These channels can facilitate air egress so that few air bubbles remain trapped between a viscoelastic lightguide and a substrate. The microstructured surface with air release channels is may be useful with a viscoelastic lightguide that comprises a PSA. For example, a PSA viscoelastic lightguide may have a composition and/or surface structure the same or nearly the same as Controltac™ products available from 3M™ Company. In this way, a user can dispose the viscoelastic lightguide and substrate in some initial position and slide the two relative to each other such that desired positioning is obtained. The microstructure of the microstructured surface may remain and/or change over time.

The microstructured surface with air release channels may comprise a variety of shapes including hemispheres, prisms (such as square prisms, rectangular prisms, cylindrical prisms and other similar polygonal features), pyramids, ellipses, grooves (e.g., V-grooves), channels, and the like. Grooves and channels may or may not extend to the edge of a predetermined area. Another exemplary microstructured surface is described in US 2007/0292650 A1 (Suzuki) wherein a microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

The viscoelastic lightguide is generally in contact with at least one medium. The medium may comprise air or a substrate, and substrates may be polymeric film, metal, glass, and/or fabric. Particular substrates are described below for a variety of exemplary constructions. For the purpose of convenience, a viscoelastic lightguide in contact with a substrate is described below, but this substrate may comprise any type of medium including air.

The law of refraction and the principle of total internal reflection can be applied as described above to determine the amount of light extracted from the viscoelastic lightguide given a particular substrate directly in contact with the lightguide. For example, given a particular substrate in contact with the viscoelastic lightguide, the amount of light extracted from the lightguide and by the substrate may be less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% relative to the total amount of light that enters the lightguide. For another example, given a particular substrate in contact with the viscoelastic lightguide, the amount of light extracted from the lightguide by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. For yet another example, given a particular substrate in contact with the viscoelastic lightguide, the amount of light extracted from the lightguide may be from about 10 to about 50%, from about 20 to about 50%, from about 30 to about 50%, from about 50 to about 70%, from about 50 to about 80%, or from about 10 to about 90% relative to the total amount of light that enters the lightguide.

The law of refraction and the principle of total internal reflection can be applied as described above to determine the direction of light extracted from the viscoelastic lightguide given a particular substrate in contact with the lightguide. For example, given a particular substrate in contact with the viscoelastic lightguide, the transmittance angle for light extracted from the viscoelastic lightguide by the substrate may be determined for a given incident angle. For example, the transmittance angle for light extracted from the viscoelastic lightguide by the substrate may be from greater than about 5° to less than about 95°, greater than about 5° to less than about 60°, or greater than about 5° to less than about 30°.

The viscoelastic lightguide may have a refractive index greater than that of the substrate. The refractive index of the viscoelastic lightguide may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the substrate.

The viscoelastic lightguide may have a refractive index less than that of the substrate. The refractive index of the viscoelastic lightguide may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the substrate.

The viscoelastic lightguide and the substrate may have the same or nearly the same refractive index such that light can be extracted into the substrate with little or no change to the light. The refractive index difference of the viscoelastic lightguide and the substrate may be from about 0.001 to less than about 0.002.

The refractive index difference of the viscoelastic lightguide and the substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The viscoelastic lightguide may have any bulk three-dimensional shape as is needed for a given application. The viscoelastic lightguide may be in the form of a square or rectangular layer, sheet, film, etc. as shown in FIGS. 7-11. The viscoelastic lightguide may be cut or divided into shapes as described below. The viscoelastic lightguide may also be tapered such that it is thicker at one end as compared to an opposing end; tapered shapes are sometimes referred to as wedges or pseudo-wedges as described in the Boyd et al., Gardiner et al., Kinder et al., and Sahlin et al. references cited above.

The thickness of the viscoelastic lightguide is not particularly limited as long as it can function as desired. The thickness of the viscoelastic lightguide may be selected based on or in conjunction with the light source. For example, design parameters may limit or even require that a particular light source(s) be used, and there may be a minimum amount, or range of amounts, of light that is required to enter the viscoelastic lightguide. Thus, the thickness of the viscoelastic lightguide may be selected so that the required amount of light from a given light source can enter the lightguide. A maximum thickness of the viscoelastic lightguide may be required for use in optical devices designed to be particularly thin. Exemplary thicknesses for the viscoelastic lightguide range from about 0.4 mil to about 1000 mil, from about 1 mil to about 300 mil, from about 1 mil to about 60 mil, or from about 0.5 mil to about 30 mil.

The amount and direction of light extracted from the viscoelastic lightguide may be controlled, at the very least, by the shape, size, number, arrangement, etc. of the features, the refractive indices of the viscoelastic lightguide and any optional substrate(s), the shape and size of the viscoelastic lightguide, and the angular distribution of light that is allowed to enter the viscoelastic lightguide. These variables may be selected such that less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% of light is extracted from the viscoelastic lightguide relative to the total amount of light that enters the lightguide. These variables may be selected such that greater than about 10%, greater than about 20%, greater than about 30%, greater than about 40%, greater than about 50%, greater than about 60%, greater than about 70%, greater than about 80%, or greater than about 90% of light is extracted from the viscoelastic lightguide relative to the total amount of light that enters the lightguide. These variables may be selected such that from about 10 to about 50%, from about 20 to about 50%, from about 30 to about 50%, from about 50 to about 70%, from about 50 to about 80%, or from about 10 to about 90% of light is extracted from the viscoelastic lightguide relative to the total amount of light that enters the lightguide.

The viscoelastic lightguide comprises one or more viscoelastic materials. In general, viscoelastic materials exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a substrate such that the viscoelastic lightguide and the substrate are optically coupled. Light can then be extracted out of the viscoelastic lightguide and into the substrate. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer.

Useful viscoelastic materials may have a storage modulus, G', of less than about 300,000 Pa, measured at 10 rad/sec and a temperature of from about 20 to about 22° C. Useful viscoelastic materials may have a storage modulus, G', of from about 30 to about 300,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C. Useful viscoelastic materials may have a storage modulus, G', of from about 30 to about 30,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C., and a loss tangent (tan d) of from about 0.4 to about 3. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 g/in, from about 300 to about 3000 g/in, or from about 500 to about 3000 g/in. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

In some embodiments, the viscoelastic lightguide is hazy and diffuses light, particularly visible light. A hazy viscoelastic lightguide may have a haze value of greater than about 5%, greater than about 20%, or greater than about 50%. A hazy viscoelastic lightguide may have a haze value of from about 5 to about 90%, from about 5 to about 50%, or from about 20 to about 50%.

In some embodiments, the viscoelastic lightguide may be translucent in that it reflects and transmits light.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the optical device, e.g., the presence or absence of substrates in contact with the lightguide and the particular application in which the device may be used.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs include those based on natural rubbers, synthetic rubbers, styrene block copolymers, (meth)acrylic block copolymers, polyvinyl ethers, polyolefins, and poly (meth)acrylates. As used herein, (meth)acrylic refers to both acrylic and methacrylic species and likewise for (meth) acrylate.

Useful PSAs include (meth)acrylates, rubbers, thermoplastic elastomers, silicones, urethanes, and combinations thereof. In some embodiments, the PSA is based on a (meth)acrylic PSA or at least one poly(meth)acrylate. Herein, (meth)acrylate refers to both acrylate and methacrylate groups. Particularly preferred poly(meth)acrylates are derived from: (A) at least one monoethylenically unsaturated alkyl (meth)acrylate monomer; and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the Tg and cohesive strength of the resultant copolymer. Herein, "copolymer" refers to polymers containing two or more different monomers, including terpolymers, tetrapolymers, etc.

Monomer A, which is a monoethylenically unsaturated alkyl (meth)acrylate, contributes to the flexibility and tack of the copolymer. Preferably, monomer A has a homopolymer Tg of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Benzyl acrylate may also be used. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Preferred monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the Tg and cohesive strength of the copolymer. Preferably, monomer B has a homopolymer Tg of at least about 10° C., for example, from about 10 to about 50° C. More preferably, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy) ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Preferred reinforcing acrylic monomers that can be used as monomer B include acrylic acid and acrylamide. Combinations of various reinforcing monoethylenically unsaturated monomers categorized as a B monomer can be used to make the copolymer.

In some embodiments, the (meth)acrylate copolymer is formulated to have a resultant Tg of less than about 0° C. and more preferably, less than about −10° C. Such (meth) acrylate copolymers preferably include about 60 to about 98% by weight of at least one monomer A and about 2 to about 40% by weight of at least one monomer B, both relative to the total weight of the (meth)acrylate copolymer. Preferably, the (meth)acrylate copolymer has about 85 to about 98% by weight of at least one monomer A and about 2 to about 15% by weight of at least one monomer B, both relative to the total weight of the (meth)acrylate copolymer.

Useful rubber-based PSAs are generally of two classes, natural rubber-based or synthetic rubber-based. Useful natural rubber-based PSAs generally contain masticated natural rubber, for example, from about 20 to about 75% by weight of one or more tackifying resins, from about 25 to about 80% by weight of natural rubber, and typically from about 0.5 to about 2.0% by weight of one or more antioxidants, all relative to the total weight of the masticated rubber. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon.

Antioxidants may be used with natural rubbers in order to retard oxidative attack on the rubber which can result in loss of cohesive strength of the adhesive. Useful antioxidants include but are not limited to amines, such as N—N' di-beta-naphthyl-1,4-phenylenediamine, available as AGERITE Resin D from R.T. Vanderbilt Co., Inc.; phenolics, such as 2,5-di-(t-amyl) hydroquinone, available as SANTOVAR A, available from Monsanto Chemical Co.; tetrakis[methylene 3-(3',5'-di-tert-butyl-4'-hydroxyphenyl) propianate]methane, available as IRGANOX 1010 from Ciba-Geigy Corp.; 2,2'-methylenebis(4-methyl-6-tert butyl phenol), known as Antioxidant 2246; and dithiocarbamates, such as zinc dithiodibutyl carbamate. Curing agents may be used to at least partially vulcanize (crosslink) the PSA.

Useful synthetic rubber-based PSAs include adhesives that are generally rubbery elastomers, which are either self-tacky or non-tacky and require tackifiers. Self-tacky synthetic rubber PSAs include, for example, butyl rubber, a copolymer of isobutylene with less than 3 percent isoprene, polyisobutylene, a homopolymer of isoprene, polybutadiene, or styrene/butadiene rubber. Butyl rubber PSAs often contain an antioxidant such as zinc dibutyl dithiocarbamate. Polyisobutylene PSAs do not usually contain antioxidants. Synthetic rubber PSAs, which generally require tackifiers, are also generally easier to melt process as compared to natural rubber PSAs which typically having very high molecular weights. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich.

Tackifiers that may be used with synthetic rubber PSAs include derivatives of rosins such as FORAL 85, a stabilized rosin ester from Hercules, Inc.; the SNOWTACK series of gum rosins from Tenneco; the AQUATAC series of tall oil rosins from Sylvachem; synthetic hydrocarbon resins such as the PICCOLYTE A series, polyterpenes from Hercules, Inc.; the ESCOREZ 1300 series of C5 aliphatic olefin-derived resins; and the ESCOREZ 2000 Series of C9 aromatic/aliphatic olefin-derived resins. Curing agents may be added to at least partially vulcanize (crosslink) the PSA.

Useful thermoplastic elastomer PSAs include styrene block copolymer PSAs which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer PSAs include linear, radial, star and tapered styrene-isoprene block copolymers such as KRATON D1107P, available from Shell Chemical Co., and EUROPRENE SOL TE 9110, available from EniChem Elastomers Americas, Inc.; linear styrene-(ethylene-butylene) block copolymers such as KRATON G1657, available from Shell Chemical Co.; linear styrene-(ethylene-propylene) block copolymers such as KRATON G1750X, available from Shell Chemical Co.; and linear, radial, and star styrene-butadiene block copolymers such as KRATON D1118X, available from Shell Chemical Co., and EUROPRENE SOL TE 6205, available from EniChem Elastomers Americas, Inc. The polystyrene blocks tend to form domains in the shape of spheroids, cylinders, or plates that causes the block copolymer PSAs to have two phase structures.

Resins that associate with the rubber phase may be used with thermoplastic elastomer PSAs if the elastomer itself is not tacky enough. Examples of rubber phase associating resins include aliphatic olefin-derived resins, such as the ESCOREZ 1300 series and the WINGTACK series, available from Goodyear; rosin esters, such as the FORAL series and the STAYBELITE Ester 10, both available from Hercules, Inc.; hydrogenated hydrocarbons, such as the ESCOREZ 5000 series, available from Exxon; polyterpenes, such as the PICCOLYTE A series; and terpene phenolic resins derived from petroleum or terpentine sources, such as PICCOFYN A100, available from Hercules, Inc.

Resins that associate with the thermoplastic phase may be used with thermoplastic elastomer PSAs if the elastomer is not stiff enough. Thermoplastic phase associating resins include polyaromatics, such as the PICCO 6000 series of aromatic hydrocarbon resins, available from Hercules, Inc.; coumarone-indene resins, such as the CUMAR series, available from Neville; and other high-solubility parameter resins derived from coal tar or petroleum and having softening points above about 85° C., such as the AMOCO 18 series of alphamethyl styrene resins, available from Amoco, PICCOVAR 130 alkyl aromatic polyindene resin, available from Hercules, Inc., and the PICCOTEX series of alphamethyl styrene/vinyl toluene resins, available from Hercules.

Useful silicone PSAs include polydiorganosiloxanes and polydiorganosiloxane polyoxamides. Useful silicone PSAs include silicone-containing resins formed from a hyrosilylation reaction between one or more components having silicon-bonded hydrogen and aliphatic unsaturation. Examples of silicon-bonded hydrogen components include high molecular weight polydimethylsiloxane or polydimethyldiphenylsiloxane, and that contain residual silanol functionality (SiOH) on the ends of the polymer chain. Examples of aliphatic unsaturation components include siloxanes functionalized with two or more (meth)acrylate groups or block copolymers comprising polydiorganosiloxane soft segments and urea terminated hard segments. Hydrosilylation may be carried out using platinum catalysts.

Useful silicone PSAs may comprise a polymer or gum and an optional tackifying resin.

The tackifying resin is generally a three-dimensional silicate structure that is endcapped with trimethylsiloxy groups ($OSiMe_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif.

Manufacture of typical silicone PSAs is described in U.S. Pat. No. 2,736,721 (Dexter). Manufacture of silicone urea block copolymer PSAs is described in U.S. Pat. No. 5,214,119 (Leir, et al).

Useful silicone PSAs may also comprise a polydiorganosiloxane polyoxamide and an optional tackifier as described in U.S. Pat. No. 7,361,474 (Sherman et al.). For example, the polydiorganosiloxane polyoxamide may comprise at least two repeat units of Formula I:

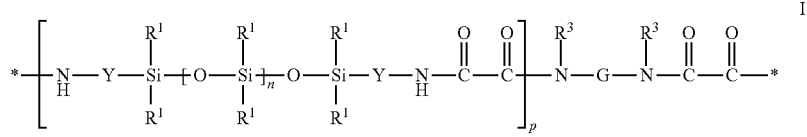

wherein: each $R^1$ is independently an alkyl, haloalkyl, aralkyl, alkenyl, aryl, or aryl substituted with an alkyl, alkoxy, or halo, wherein at least 50 percent of the $R^1$ groups are methyl; each Y is independently an alkylene, aralkylene, or a combination thereof; G is a divalent residue equal to a diamine of formula $R^3HN$-G-$NHR^3$ minus the two —$NHR^3$ groups; $R^3$ is hydrogen or alkyl or $R^3$ taken together with G and with the nitrogen to which they are both attached forms a heterocyclic group; n is independently an integer of 40 to 1500; and p is an integer of 1 to 10; and an asterisk (*) indicates a site of attachment of the repeat unit to another group in the copolymer. The copolymer may have a first repeat unit where p is equal to 1 and a second repeat unit where p is at least 2. G may comprise an alkylene, heteroalkylene, arylene, aralkylene, polydiorganosiloxane, or a combination thereof. The integer n may be an integer of 40 to 500. These polydiorganosiloxane polyoxamides can be used in combination with a tackifier. Useful tackifiers include silicone tackifying resins as described in U.S. Pat. No. 7,090,922 B2 (Zhou et al.). Some of these silicone-containing PSAs may be heat activated.

The PSA may be crosslinked to the extent that the crosslinks do not interfere with desired properties of the viscoelastic lightguide. Generally, the PSA may be crosslinked to the extent that the crosslinks do not interfere with the viscous characteristics of the viscoelastic lightguide. Crosslinking is used to build molecular weight and strength of the PSA. The degree of crosslinking may be selected based upon the application for which the lightguide is intended. Crosslinking agents may be used to form chemical crosslinks, physical crosslinks or a combination thereof. Chemical crosslinks include covalent bonds and ionic bonds. Covalent crosslinks may be formed by incorporating a multi-functional monomer in the polymerization process, followed by curing using, e.g., ultraviolet radiation, heat, ionizing radiation, moisture, or a combination thereof.

Physical crosslinks include noncovalent bonds and are generally thermally reversible. Examples of physical crosslinks include high Tg (i.e., those having a Tg higher than room temperature, preferably higher than 70° C.) polymer segments included, for example, in thermoplastic elastomer block copolymers. Such segments aggregate to form physical crosslinks that dissipate upon heating. If a physically crosslinked PSA is used such as a thermoplastic elastomer, the embossing typically is carried out at temperature below, or even substantially below, the temperature at which the adhesive flows. Hard segments include the styrene macromers of U.S. Pat. No. 4,554,324 (Husman et al.) and/or acid/base interactions (i.e., those involving functional groups within the same polymer or between polymers or between a polymer and an additive) such as polymeric ionic crosslinking as described in WO 99/42536 (Stark et al.).

Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e. g., radiation having a wavelength of from about 250 to about 400 nm), causes the copolymer to crosslink. The crosslinking agent is used in an effective amount, by which is meant an amount that is sufficient to cause crosslinking of the PSA to provide adequate cohesive strength to produce the desired final adhesion properties. Preferably, the crosslinking agent is used in an amount of about 0.1 part to about 10 parts by weight, based on the total weight of monomers.

In some embodiments, the viscoelastic lightguide comprises a PSA formed from a (meth)acrylate block copolymer as described in U.S. Pat. No. 7,255,920 B2 (Everaerts et al.). In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl (meth)acrylate, a heteroalkyl (meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the viscoelastic lightguide comprises a clear acrylic PSA, for example, those available as transfer tapes such as VHB™ Acrylic Tape 4910F from 3M Company and 3M™ Optically Clear Laminating Adhesives (8140 and 8180 series).

In some embodiments, the viscoelastic lightguide comprises a PSA formed from at least one monomer containing a substituted or an unsubstituted aromatic moiety as described in U.S. Pat. No. 6,663,978 B1 (Olson et al.):

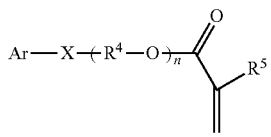

wherein Ar is an aromatic group which is unsubstituted or substituted with a substituent selected from the group consisting of $Br_y$ and $R^6_z$ wherein y represents the number of bromine substituents attached to the aromatic group and is an integer of from 0 to 3, $R^6$ is a straight or branched alkyl of from 2 to 12 carbons, and z represents the number of $R^6$ substituents attached to the aromatic ring and is either 0 or 1 provided that both y and z are not zero; X is either O or S; n is from 0 to 3; $R^4$ is an unsubstituted straight or branched alkyl linking group of from 2 to 12 carbons; and $R^5$ is either H or $CH_3$.

In some embodiments, the viscoelastic lightguide comprises a copolymer as described in U.S. Ser. No. 11/875,194 (63656US002, Determan et al.), comprising (a) monomer units having pendant bephenyl groups and (b) alkyl (meth) acrylate monomer units.

In some embodiments, the viscoelastic lightguide comprises a copolymer as described in U.S. Provisional Application Ser. No. 60/983,735 (63760US002, Determan et al.), comprising (a) monomer units having pendant carbazole groups and (b) alkyl (meth)acrylate monomer units.

In some embodiments, the viscoelastic lightguide comprises an adhesive as described in U.S. Provisional Application Ser. No. 60/986,298 (63108US002, Schaffer et al.), comprising a block copolymer dispersed in an adhesive matrix to form a Lewis acid-base pair. The block copolymer comprises an AB block copolymer, and the A block phase separates to form microdomains within the B block/adhesive matrix. For example, the adhesive matrix may comprise a copolymer of an alkyl (meth)acrylate and a (meth)acrylate having pendant acid functionality, and the block copolymer may comprise a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The viscoelastic lightguide may comprise a stretch releasable PSA. Stretch releasable PSAs are PSAs that can be removed from a substrate if they are stretched at or nearly at a zero degree angle. In some embodiments, the viscoelastic lightguide or a stretch release PSA used in the viscoelastic lightguide has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or U.S. Provisional Application Nos. 61/020,423 (63934US002, Sherman et al.) and 61/036,501 (64151US002, Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

The viscoelastic lightguide may comprise an aerogel. An aerogel is a low-density solid state material derived from gel in which the liquid component of the gel has been replaced with air. Silica, alumina and carbon aerogels are exemplary aerogels that may be used.

The viscoelastic lightguide can optionally include one or more additives such as filler, particles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

The viscoelastic lightguide may be made hazy and/or diffusive by including particles such as nanoparticles (diameter less than about 1 um), microspheres (diameter 1 um or greater), or fibers. Exemplary nanoparticles include $TiO_2$. Haze and diffusive properties can also be incorporated into the viscoelastic lightguide by incorporating bubbles into the lightguide. The bubbles may have a diameter of from about 0.01 to about 1 um. Bubbles may be introduced by adding, e.g., foaming agents. Examples of additional additives that may be added to the viscoelastic lightguide include glass beads, reflective particles, and conductive particles. In some embodiments, the viscoelastic lightguide may comprise a PSA matrix and particles as described in U.S. Provisional Application No. 61/097,685 (64740US002, Sherman et al.), comprising an optically clear PSA and silicon resin particles having a refractive index less than that of the PSA. In some embodiments, the presence of particles, bubbles, air, etc. increases the scatter and uniformity of light.

In some embodiments, the viscoelastic lightguide provides an image as shown in FIGS. 10 and 11. An image may be made by structuring a surface of the lightguide as described above. For example, surface 1010 of FIG. 10 may be structured to provide the image. An image may be made by including or embedding material such as particles in the viscoelastic lightguide. The image may also be made by forming an image on a surface of the lightguide, e.g., on surface 1010. More than one surface of the lightguide may comprise an image. Surfaces of the viscoelastic lightguide may be imaged by printing or marking, e.g., by inkjet printing, laser printing, electrostatic printing and the like. Images may be monochrome such as black and white, or they may be colored. The materials used to form the images may reflect all or some light within a particular range of wavelengths, e.g., in the visible region. The materials used to form the images may function as color filters allowing light within a particular range of wavelengths, e.g., in the visible region, to be transmitted. Exemplary materials include colorants such as pigments and dyes.

In some embodiments, the viscoelastic lightguide provides an image by from holes in the lightguide. Holes may be made, e.g., by drilling through the lightguide.

In general, the viscoelastic lightguide is adapted to receive at least some light emitted by the light source. In some embodiments, a specially designed input surface may not be needed because the light source can be pressed into the viscoelastic lightguide such that optical coupling occurs. In some embodiments, the light source may stick to the viscoelastic lightguide, for example, if the lightguide comprises a PSA. In some embodiments, the light source may be embedded in the viscoelastic lightguide.

In some embodiments, the viscoelastic lightguide comprises an input surface adapted to receive light from the light source. The input surface may have a variety of topographies depending on the optical coupling means and/or the particular light source. The input surface may have an appropriate curvature. The input edge comprising the input surface may have a particular cavity, for example a concave hemispherical cavity, to receive a convex lens of a light source. Alternately, the input surface may have refractive structures such as prisms or lenses to optically couple light from the light source into the viscoelastic lightguide.

In some embodiments, an extractor article disposed between the light source and the input edge may be used to facilitate optical coupling with at least some of the light emitted by the light source. Useful extractor articles may have an appropriate curvature for extracting light from the light source. A coupling material for matching refractive indices of the viscoelastic lightguide and some element of the light source may be used. A crosslinkable material may be used for attaching the viscoelastic lightguide to some part of the light source, and subsequently cured using heat and/or light to form the crosslinked material.

The coupling material may comprise silicone gel. The silicone gel may be crosslinked. The silicone gel may be mixed with a silicone oil. The silicone gel may comprise one or more silicone materials such as, for example, dimethylsilicone, diphenylsilicone, or phenylmethylsilicone. The silicone gel may comprise phenylmethylsilicone moieties that are cross-linked. The silicone gel may comprise phenylmethylsilicone moieties which are cross-linked and phenylmethylsilicone oil. The silicone gel may comprise phenylmethylsilicone moieties which are cross-linked and phenylmethylsilicone oil in a weight ratio from 0.2:1 to 5:1. The silicone gel may comprise crosslinked phenylmethylsilicone. Exemplary use of silicone gels is described in U.S. Pat. No. 7,315,418 (DiZio et al.).

The light source may be optically coupled to the viscoelastic lightguide such that at least some of the light from the light source can enter the lightguide. For example, a light source may be optically coupled to the viscoelastic lightguide such that greater than 1, greater than 10, greater than 20, greater than 30, greater than 40, greater than 50, greater than 90%, or about 100% of light emitted by the light source enters the viscoelastic lightguide. For another example, a light source may be optically coupled to the viscoelastic lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the viscoelastic lightguide. The light source may emit light having a random or a particular angular distribution.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the viscoelastic lightguide. The light source may comprise LEDs arranged on a circuit such that light emitted from the LEDs lights up continuously or uniformly the viscoelastic lightguide throughout a desired area. The light source may comprise LEDs that emit light of different colors such that the colors can mix within the viscoelastic lightguide. In this way, a graphic could be designed to appear differently at different times during its use.

The light source may be powered by any suitable means. The light source may be powered using a battery, a DC power supply, an AC to DC power supply, an AC power supply, or a solar photovoltaic cell.

Figure 14:
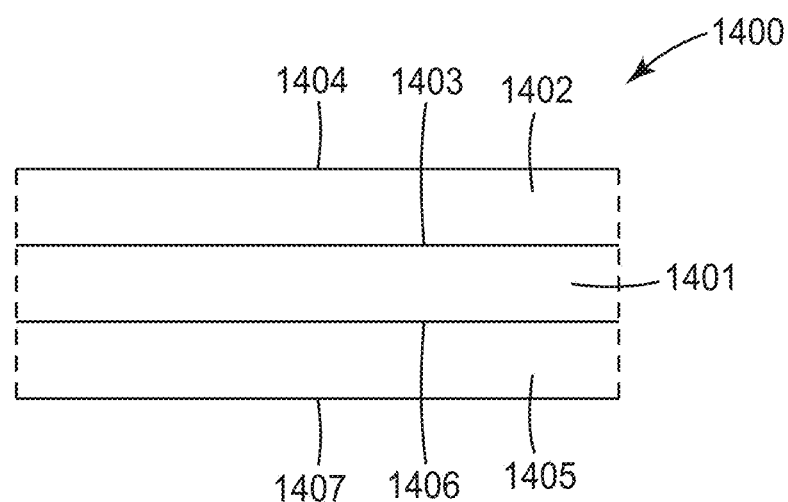

The viscoelastic lightguide can be used in a variety of multilayer constructions depending on the particular application. Some of these embodiments are described below. In general, the viscoelastic lightguide may be disposed on a substrate or between two substrates. Any one of the surfaces described above for the viscoelastic lightguide may be an interface formed between the lightguide and a substrate. For example, FIG. 14 shows a schematic cross section of exemplary optical article 1400 comprising first substrate 1402 disposed on viscoelastic lightguide 1401; first interface 1403 formed between the two may be any one of the surfaces described above for the lightguide. Exemplary optical article 1400 also comprises optional second substrate 1405 disposed on viscoelastic lightguide 1401 opposite first substrate 1402; second interface 1406 formed between the two may be any one of the surfaces described above for the lightguide. Any of the surfaces described above for the viscoelastic lightguide may be used in combination for first interface 1403 and second interface 1406.

Exemplary optical article 1400 also comprises first outer surface 1404 opposite first interface 1403, and second outer surface 1407 opposite second interface 1406. Any one of the surfaces described above for the viscoelastic lightguide may be first and/or second outer surfaces, 1404 and 1407, respectively. In general, any of the surfaces described above for the viscoelastic lightguide may be used in combination for first interface 1403, second interface 1406, first outer surface 1404 and second outer surface 1407.

Figure 15A:
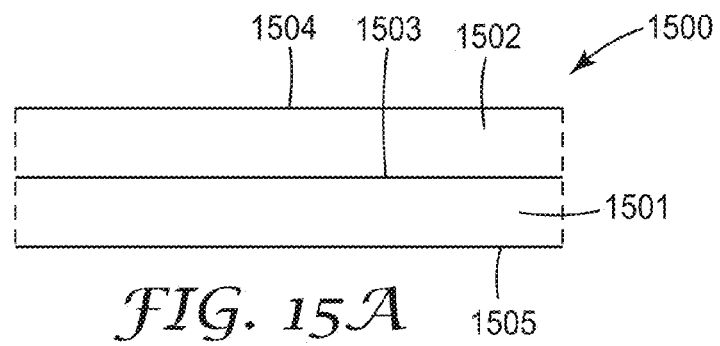

FIG. 15a shows a schematic cross section of exemplary optical article 1500 comprising first substrate 1502 disposed on viscoelastic lightguide 1501 (or vice versa). Any one of the surfaces described above for the viscoelastic lightguide may be first interface 1503 and/or first outer surface 1504. Surface 1505 of the viscoelastic lightguide may have any type of surface described above for the viscoelastic lightguide.

In some embodiments, first interface 1503, first outer surface 1504 and surface 1505 of viscoelastic lightguide 1501 are unstructured as shown in FIG. 15a. First substrate 1502 may have a refractive index less than that of viscoelastic lightguide 1501 such that the first substrate functions as a light containing substrate for light propagating within the lightguide. If the first substrate is a light containing substrate, then the first interface may be optically smooth such that light propagating within viscoelastic lightguide 1501 is transported by total internal reflection. For a light containing substrate in contact with the viscoelastic lightguide, the amount of light extracted from the lightguide and by the substrate may be less than about 0.5%, less than about 1%, less than about 2%, less than about 5%, or less than about 10% relative to the total amount of light that enters the lightguide. In general, at least a portion of surface 1505 is optically smooth such that light propagating within viscoelastic lightguide 1501 is transported by total internal reflection.

In some embodiments, first substrate 1502 may have a refractive index greater than that of viscoelastic lightguide 1501 such that the first substrate may function as a light extracting substrate. For a light extracting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. In some embodiments, first substrate 1502 may have the same or nearly the same refractive index as that of viscoelastic lightguide 1501. In either embodiment, at least portions of first interface 1503 and surface 1505 are optically smooth such that light propagating within viscoelastic lightguide 1501 is transported by total internal reflection.

Figure 15B:
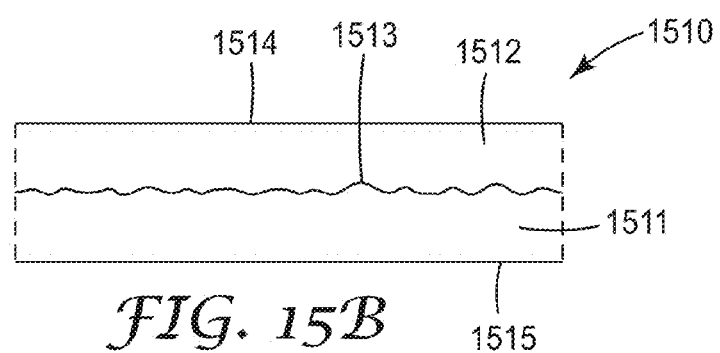

In some embodiments, one surface of the viscoelastic lightguide is structured or the first outer surface is structured; the other two surfaces are not structured. FIG. 15*b* shows a schematic cross section of exemplary optical article 1510 comprising first substrate 1512 disposed on viscoelastic lightguide 1511 (or vice versa). In this example, first interface 1513 is structured irregularly such that the first substrate is able to extract light from the viscoelastic lightguide. First substrate 1512 may have a refractive index greater than, less than, or nearly the same as that of viscoelastic lightguide 1511. The first substrate may function as a light extracting substrate. For a light extracting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. At least portions of first interface 1513 and surface 1515 are optically smooth such that light propagating within the viscoelastic lightguide may be transported by total internal reflection.

In some embodiments, one surface of the viscoelastic lightguide is unstructured or the first outer surface is unstructured; the other two surfaces are structured. For example, the first interface and the first outer surface may be structured, and the other surface of the viscoelastic layer unstructured. The first interface and first outer layer may be structured such that the features of each are configured dependently within about 100 um. The first interface and first outer layer may be structured such that the features of each are configured independently not within about 100 um.

Figure 15C:
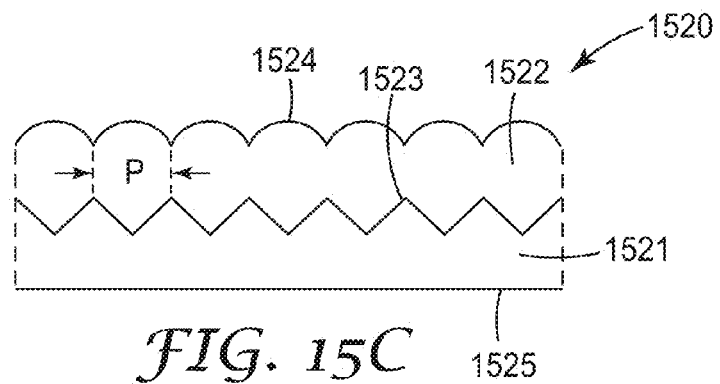

FIG. 15*c* shows a schematic cross section of exemplary optical article 1520 comprising first substrate 1522 disposed on viscoelastic lightguide 1521 (or vice versa). In this example, first interface 1523 is structured with prismatic features such that the first substrate is able to extract light from the viscoelastic lightguide. First outer surface 1524 is structured with lenticular features such that light can be emitted from the first substrate. The lenticular features and the prismatic features are configured dependently such that the period of repetition or pitch P for each pair of features (lenticular and prismatic) is about the same or at least within about 100 um. For each pair of features, the curvature of the lenticular feature may be such that its focal point coincides with the vertex of the prismatic feature. First substrate 1522 may have a refractive index greater than or less than that of viscoelastic lightguide 1521. Useful configurations of lenticular and prismatic features are described in U.S. 2005/0052750 A1 (King et al.) and U.S. 2005/0276071 (Sasagawa et al.). At least a portion of first interface 1523 and a portion of surface 1525 are optically smooth such that light propagating within the viscoelastic lightguide may be transported by total internal reflection.

The first substrate may function as a light extracting and light emitting substrate. For a light extracting and light emitting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide.

For a light extracting and light emitting substrate in contact with the viscoelastic lightguide, the amount of light emitted from the first substrate may be less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% relative to the total amount of light that enters the substrate; the amount of light emitted from the first substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the substrate; or the amount of light emitted from the first substrate may be from about 10 to about 50%, from about 20 to about 50%, from about 30 to about 50%, from about 50 to about 70%, from about 50 to about 80%, or from about 10 to about 90% relative to the total amount of light that enters the substrate. At least portions of first interface 1523 and surface 1525 are optically smooth such that light propagating within viscoelastic lightguide 1521 is transported by total internal reflection.

Figure 15D:
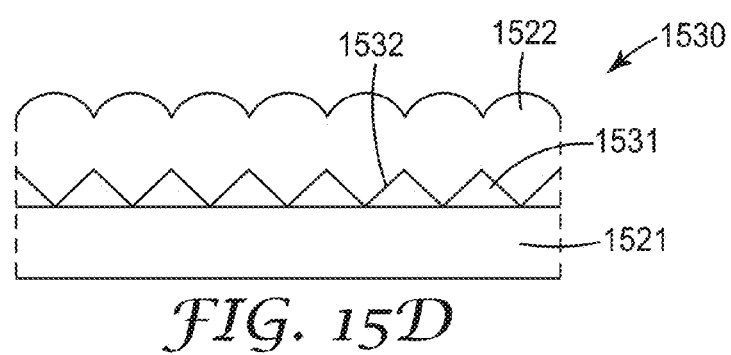

FIG. 15*d* shows a schematic cross section of exemplary optical article 1530 which also comprises first substrate 1522 disposed on viscoelastic lightguide 1521. In this embodiment, tips of the prismatic structures that form surface 1532 of first substrate 1522 are in contact with viscoelastic lightguide 1521 such that the two are optically coupled. Corresponding pockets 1531 are formed between the prismatic features and the lightguide. Surface 1532 may comprise any of those described above for the interfaces and outer surfaces. The refractive index of viscoelastic lightguide 1521 may be greater than that of the pocket material in pockets 1531, but less than that of first substrate 1522. In this case, the refractive index difference between the first substrate and the viscoelastic lightguide may be from about 0.002 to about 1; and the refractive index difference between viscoelastic lightguide 1521 and pocket material in pockets 1531 may be from about 0.002 to about 1.

The pockets may comprise air. The pockets may comprise a soft, compliant material such as any of the viscoelastic materials described above. The pockets may comprise a PSA. The pockets may comprise a silicone PSA. The first substrate may comprise the film described in King et al. and Sasagawa et al.

Figure 15E:
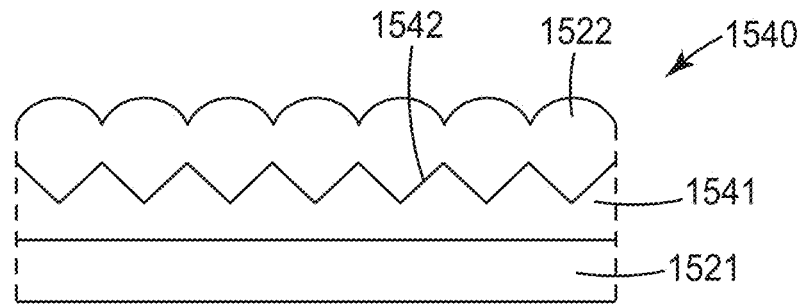

In some embodiments, the first substrate comprises more than one substrate. FIG. 15*e* shows a schematic cross section of optical article 1540 comprising first substrate 1541 disposed on viscoelastic lightguide 1521. Additional first substrate 1522 is disposed on first substrate 1541 opposite the viscoelastic lightguide. The additional substrate is not optically coupled directly with the viscoelastic lightguide, however, it may be optically coupled indirectly, i.e., by extracting light from the first substrate. The refractive index of first substrate 1541 may be greater than that of viscoelastic lightguide 1521, and the refractive index of additional first substrate 1522 may be may be greater than, less than, or about the same as that of the lightguide. The refractive index difference between the first substrate and the viscoelastic lightguide may be from about 0.002 to about 1; and the refractive index difference between the additional first substrate and the lightguide may be from about 0.002 to about 1.

One may determine theoretically how varying the orientation of each feature (or lack thereof) may affect the amount and distribution of light that can be extracted from the viscoelastic lightguide by the first substrate. Further, one may determine theoretically how varying the orientation of each feature (or lack thereof) may affect the amount and distribution of light that can be emitted from the first substrate. In both cases, ray tracing techniques that are consistent with the law of refraction and the principle of total internal reflection as described above may be used.

The first substrate may comprise a light emitting layer as described above. The amount and direction of light emitted from the first substrate may be controlled, at the very least, by the shape, size, number, arrangement, etc. of the features that form the first outer surface. In general, the first substrate can be designed such that light may be emitted from the substrate as described above for the viscoelastic lightguide. For example, light may be emitted from the first substrate in at least one predetermined direction, e.g., 1, 2, 3, 4, 5, 6, 7, 8, 9, 10, or more predetermined directions; from 1 to about 3 predetermined directions; from 1 to about 5 predetermined directions; from 1 to about 10 predetermined directions; or from 1 to about 100 predetermined directions. The light emitted in at least one predetermined direction may be emitted in a pattern. The light emitted in at least one predetermined direction may be emitted uniformly (at the same or nearly the same intensity) or non-uniformly from the first substrate. Light may also be emitted in random directions from the first substrate and/or at various random intensities from the substrate.

Light may be emitted from the first substrate in the same manner as shown in FIGS. 7-11 for the viscoelastic lightguide. For example, FIG. 16 shows a perspective view of exemplary optical article 1600 comprising first substrate 1602 disposed on viscoelastic lightguide 1601. Light represented by rays 1603 is emitted in a predetermined direction from the first substrate. Light may also be emitted in more than one predetermined direction, randomly, in one or more shapes, in discrete areas, at different intensities, etc.

Light may be emitted from any surface of the first substrate. FIG. 17 illustrates how light may be emitted from an exemplary optical article comprising a first substrate and a viscoelastic lightguide, both shown in the shape of a film or sheet. FIG. 17 shows a perspective view of exemplary optical article 1700 comprising a first substrate disposed on viscoelastic lightguide 1701. The first substrate comprises major surface 1702 and edge surfaces 1703a-d (1703c and 1703d not shown). Light may be emitted from any one or some combination of surfaces 1702 and 1703a-d. For example, light may be emitted only from major surface 1702 as shown by ray 1704. For another example, light may be emitted only from edge surface 1703b.

Exemplary optical article 1700 also comprises a major surface of viscoelastic lightguide 1701, the major surface being opposite major surface 1702 of the first substrate. Exemplary optical article 1700 also comprises edge surfaces 1705a-c (1703c not shown). Light may be emitted from the first substrate and/or the viscoelastic lightguide, in any one or some combination of major surfaces and edge surfaces. Light which enters the viscoelastic lightguide is shown by ray 1706.

In some embodiments, a surface of the first substrate is microstructured with air release channels as described above for the viscoelastic lightguide.

The first substrate may have any bulk three-dimensional shape as is needed for a given application. The first substrate may be commensurate in size with the viscoelastic lightguide, or it may be larger, smaller, thicker, thinner, etc. than the viscoelastic lightguide. The first substrate may be in the form of a square or rectangular layer, sheet, film, etc. as shown in FIGS. 16 and 17.

The thickness of the first substrate is not particularly limited as long as it can function as desired. The thickness of the first substrate may be selected such that it can extract and emit light as desired. A maximum thickness of the first substrate may be required for use in particular optical devices designed to be particularly thin. Exemplary thicknesses for the first substrate range from about 0.4 mil to about 1000 mil, from about 1 mil to about 300 mil, from about 1 mil to about 60 mil, or from about 0.5 mil to about 30 mil.

In some embodiments, the first substrate is viscoelastic and comprises any one or more of the viscoelastic materials described above for the viscoelastic lightguide. A viscoelastic first substrate may need to comprise appropriate tensile strength values, viscous characteristics, and properties that facilitate sufficient optical coupling with at least a portion of a viscoelastic lightguide. A viscoelastic first substrate is generally soft, compliant and flexible. A viscoelastic first substrate may have an elastic modulus, viscous modulus, and damping coefficient as described above for the viscoelastic lightguide. In some embodiments, the first substrate comprises a PSA layer as described above for the viscoelastic lightguide. The first substrate may have a particular peel force or at least exhibit a peel force within a particular range as described above for the viscoelastic lightguide.

In some embodiments, the first substrate comprises an optically clear substrate having high light transmittance of from about 80 to about 100%, from about 90 to about 100%, from about 95 to about 100%, or from about 98 to about 100% over at least a portion of the visible light spectrum. In some embodiments, the first substrate has a haze value of less than about 5%, less than about 3%, or less than about 1%. In some embodiments, the first substrate has a haze value of from about 0.01 to less than about 5%, from about 0.01 to less than about 3%, or from about 0.01 to less than about 1%.

In some embodiments, the first substrate comprises an optically clear substrate having high light transmittance and a low haze value. High light transmittance may be from about 90 to about 100%, from about 95 to about 100%, or from about 98 to about 100% over at least a portion of the visible light spectrum, and haze values may be from about 0.01 to less than about 5%, from about 0.01 to less than about 3%, or from about 0.01 to less than about 1%. In some embodiments, the first substrate is hazy and diffuses light, particularly visible light. A hazy first substrate may have a haze value of greater than about 5%, greater than about 20%, or greater than about 50%. A hazy first substrate may have a haze value of from about 5 to about 90%, from about 5 to about 50%, or from about 20 to about 50%.

In some embodiments, the first substrate has low light transmittance, for example, from about 0.1 to about 70%, from about 0.1 to about 50%, or from about 0.1 to about 20%.

In some embodiments, the first substrate may be translucent in that it reflects and transmits light.

The first substrate may have a refractive index in the range of from about 1.3 to about 2.6, 1.4 to about 1.7, or from about 1.5 to about 1.7. The particular refractive index or range of refractive indices selected for the first substrate may depend on the overall design of the optical article or device, e.g., the presence or absence of any additional substrates in contact with the first substrate and the particular application in which the article or device may be used.

In some embodiments, the first substrate comprises one or more viscoelastic materials as described above for the viscoelastic lightguide. In some embodiments, the first substrate comprises a PSA as described above for the viscoelastic lightguide. In some embodiments, the first substrate and the viscoelastic lightguide comprise viscoelastic materials. In some embodiments, the first substrate and the viscoelastic lightguide comprise PSAs.

In some embodiments, the viscoelastic lightguide comprises a clear acrylic PSA, and the first substrate comprises a silicone PSA. The silicone PSA may comprise a stretch releasable PSA as described above. The refractive index of the clear acrylic PSA may be greater than that of the silicone PSA, e.g., the refractive index difference may be from about 0.04 to about 0.09. Exemplary clear acrylic PSAs are available as transfer tapes such as VHB™ Acrylic Tape 4910F from 3M Company and 3M™ Optically Clear Laminating Adhesives (8140 and 8180 series). Silicone PSAs include any of those described above such as the silicone PSAs comprising polydiorganosiloxane polyoxamide.

In some embodiments, the first substrate comprises an adhesive that is useful for adhering the viscoelastic lightguide to an article such as a dashboard of a vehicle or a painted wall. Useful adhesives include optically clear adhesives, optically diffuse adhesives, radiation cured adhesives, thermal cured adhesives, hot melt adhesives, cold seal adhesives, heat activated adhesives, adhesives that cure at room temperature and structural adhesives having an adhesive bond strength of at least about 6 MPa, and the like. Structural adhesives are available as 3M™ SCOTCH-WELD™ Adhesives.

In some embodiments, the first substrate is not viscoelastic.

In some embodiments, the first substrate comprises a polymer. In some embodiments, the first substrate comprises a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, the first substrate comprises a poly(meth)acrylate having a refractive index greater than that of the viscoelastic lightguide.

The first substrate may be a reflector that reflects incident light being transported within the viscoelastic lightguide. In some embodiments, the reflector comprises a specular reflector wherein light propagating within the viscoelastic lightguide is reflected at a surface of the specular reflector according to the law of reflection. The law of reflection states that for light incident upon a surface and reflected by the surface, the reflection angle, $\theta_r$, is the same as or nearly the same as the incident angle, $\theta_i$, wherein both angles are defined relative to a plane of the surface. For a specular reflector, the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region.

Suitable specular reflectors include mirrors such as a plane mirrors comprising a film of reflecting material, typically a metal, coated on glass. Suitable reflectors include mirrors that are multilayer optical films. Useful multilayer optical films comprise films having from about 10 to about 10,000 alternating layers of first and second polymer layers wherein the polymer layers comprise polyesters. Exemplary multilayer optical films are described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262.

Exemplary specular reflectors include those available from 3M™ Company, for example, 3M™ High Intensity Grade Reflective Products such as High Reflective Visible Mirror Film and High Transmission Mirror Film, and Vikuiti™ films such as Vikuiti™ Enhanced Specular Reflector.

In some embodiments, the reflector comprises a diffuse reflector wherein light propagating within the viscoelastic lightguide is reflected and scattered at a surface of the diffuse reflector. For a diffuse reflector, light of a given incident angle reflects with multiple reflection angles wherein at least some of the reflection angles are greater than about 16° of the incident angle. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region.

A diffuse reflector may comprise an irregular surface with respect to the wavelength of light being reflected. Light may be reflected at the surface. The diffuse reflector may comprise a layer of organic, inorganic or hybrid organic/inorganic particles disposed on a substrate. The particles may have a diameter of from greater than about 0.01 to about 100 um, from greater than about 0.05 to about 100 um, or from greater than about 0.05 to about 50 um. The particles may be polymeric particles, glass beads, inorganic particles, metal oxide particles, or hybrid organic/inorganic particles. The particles may be solid, porous or hollow. The particles may comprise microspheres having a polymeric shell with a blowing agent such as isobutene or isopentane inside the shell, for example, microspheres available as EXPANCEL microspheres from Expancel Co. The particles may be dispersed in a polymeric material or binder. Binders include one or more polymers and may be, for example, any of the viscoelastic materials and adhesive materials (cold seal adhesives, etc.) described above. The binder may comprise a PSA. The binder and particles may be coated onto a substrate such that the thickness of the binder is greater than, less than or about the same as the diameter of the particles. The substrate may comprise a polymer, metal, specular reflector, and the like.

For example, the diffuse reflector may comprise a layer of barium sulfate particles loaded in a polyethylene terephalate film. Other constructions that provide a reflective surface are described in U.S. Pat. No. 7,481,563 (David et al.).

In some embodiments, the binder is light transmissive such that at least some of the light incident upon the layer enters the layer and becomes diffused. This diffused light is reflected upon being incident on a substrate that is a reflector. The diffusive material may comprise particles dispersed in a binder as described above. The refractive indices of the particles and binder may be different. For example, the refractive indices of the particles and binder may differ from about 0.002 to about 1, or from about 0.01 to about 0.5. This type of diffuse reflector may be from about 85 to about 100% reflective, from about 90 to about 100%, or from about 95 to about 100%, across a particular region of the electromagnetic spectrum, for example, the visible region. Exemplary light diffusing materials are described in U.S. Pat. No. 6,288,172 B1 (Goetz et al.). For example, the particles may comprise hollow glass spheres having a mean diameter of about 18 um (SPHERICEL Grade 60P18 from Potters Industries Inc.), and the binder may comprise a PSA such as a silicone PSA.

In some embodiments, the first substrate comprises a multilayer optical film. Multilayer optical films that are mirrors are described above. Other types of multilayer optical films may also be used, for example, the multilayer optical film may be a reflective film, a polarizer film, a reflective polarizer film, a diffuse blend reflective polarizer film, a diffuser film, a brightness enhancing film, a turning film, a mirror film, or a combination thereof. Exemplary multilayer optical films include 3M™ Vikuiti™ films available from 3M™ Company. Exemplary multilayer optical films are described in the references cited above for multilayer optical films that are mirrors.

In some embodiments, the first substrate comprises a polymeric film, metal, glass, ceramic, paper, fabric, or a combination thereof. In some embodiments, the first substrate comprises metal such as aluminum. In some embodiments, the first substrate comprises glass which generally comprises a hard, brittle, amorphous solid, including, soda-lime glass, borosilicate glass, acrylic glass, sugar glass, and the like. In some embodiments, the first substrate comprises a ceramic comprising some amount of crystalline structure and made, for example, from inorganic non-metallic materials. In some embodiments, the first substrate comprises paper, for example, paper made from cellulose pulp. In some embodiments, the first substrate comprises fabric, for example, leather, woven fabrics, non-woven fabrics.

In some embodiments, the first substrate comprises a release liner. Release liners typically have a low adhesion surface for contact with an adhesive layer. Release liners may comprise paper such as Kraft paper, or polymeric films such as poly(vinyl chloride), polyester, polyolefin, cellulose acetate, ethylene vinyl acetate, polyurethane, and the like. The release liner may be coated with a layer of a release agent such as a silicone-containing material or a fluorocarbon-containing material. The release liner may comprise paper or a polymeric film coated with polyethylene which is coated with a silicone-containing material. Exemplary release liners include liners commercially available from CP Films Inc. under the trade designations "T-30" and "T-10" that have a silicone release coating on polyethylene terephalate film.

Exemplary release liners include structured release liners. Exemplary release liners include any of those referred to as microstructured release liners. Microstructured release liners are used to impart a microstructure on the surface of an adhesive layer. The microstructured surface can aid air egress between the adhesive layer and the adjacent layer. In general, it is desirable that the microstructure disappear over time to prevent interference with optical properties. Microstructures are generally three-dimensional structures that are microscopic in at least two dimensions (i.e., the topical and/or cross-sectional view is microscopic). The term "microscopic" as used herein refers to dimensions that are difficult to resolve by the human eye without aid of a microscope.

The microstructures may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In some cases, it may be desirable to include topographical features that promote air egress at the bonding interface when the article is laminated to a substrate. In this regard, V-grooves and channels that can extend to the edge of the article are particularly useful. The particular dimensions and patterns characterizing the microstructures are selected based upon the specific application for which the article is intended. Another example of useful microstructures are described in US 2007/0292650 A1 (Suzuki) wherein the microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

In some embodiments, optical articles comprising a viscoelastic lightguide and a first substrate may provide an image. A variety of different constructions of the viscoelastic lightguide and the first substrate may be made to provide an image. An image may be made by structuring a surface of the first substrate as described above. For example, first substrate 1602 of FIG. 16 may be structured to provide the image.

Figure 15F:
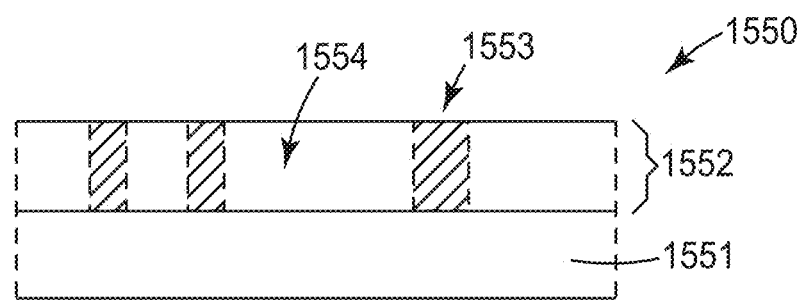

An image may be made by including or embedding different materials such as particles in regions of the first substrate wherein the regions are arranged to form an image. FIG. 15f shows a schematic cross section of exemplary optical article 1550 that may be used to provide an image. Exemplary optical article 1550 comprises first substrate 1552 disposed on viscoelastic lightguide 1551. The first substrate comprises two different materials used to form regions 1553 and 1554 which are arranged to form the image. Light propagating within the viscoelastic lightguide behaves differently upon striking the interface between the first substrate and the lightguide, depending on whether the interface is formed between the lightguide and region 1553 or 1554. For example, light incident upon an interface with region 1553 may be reflected, and light incident upon an interface with region 1554 may be extracted. For another example, light incident upon an interface with region 1553 may be reflected, and light incident upon an interface with region 1554 may be extracted selectively for light within a particular range of wavelengths.

Figure 15G:
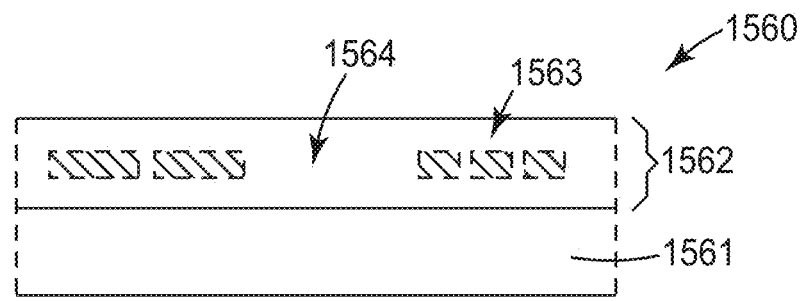

FIG. 15g shows a schematic cross section of exemplary optical article 1560 that may be used to provide images. Exemplary optical article 1560 comprises first substrate

1562 disposed on viscoelastic lightguide 1561. The first substrate comprises an image formed by regions of imaging materials 1563 suspended in bulk material 1564. Light propagating within the viscoelastic lightguide may be extracted by bulk material 1564. Regions 1563 may reflect light or transmit light within a particular range of wavelengths depending on the particular imaging materials. Colorants such as pigments and dyes may be used as the imaging materials.

Figure 15H:
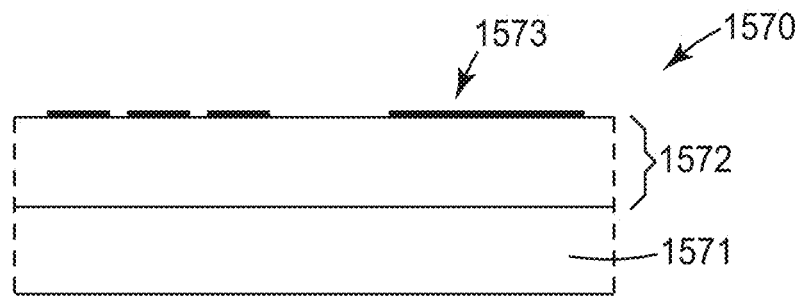
Figure 15I:
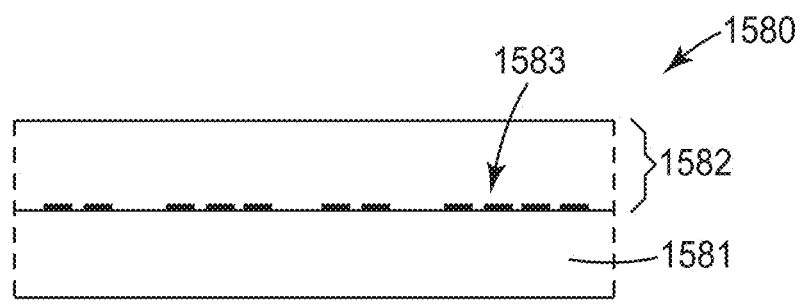

An image may be made by depositing material on a surface of the first substrate wherein the material is arranged to form the image. FIG. 15*h* shows a schematic cross section of exemplary optical article 1570 that may be used to provide an image. Exemplary optical article 1570 comprises first substrate 1572 disposed on viscoelastic lightguide 1571. Material 1573 is deposited onto the first substrate such that an image is formed by reflection of light within the first substrate and/or transmission of light within a particular range of wavelengths.

An image may be made by depositing material between the first substrate and the viscoelastic lightguide wherein the material is arranged to form the image. Exemplary optical article 1580 comprises first substrate 1582 disposed on viscoelastic lightguide 1581. Material 1583 is deposited between the lightguide and the first substrate such that an image is formed by reflection of light within viscoelastic lightguide 1581 and/or extraction of light into first substrate 1582 wherein the extracted light may be within a particular range of wavelengths.

For any one of the optical articles shown in FIG. 15*f-i*, imaging materials may be deposited by printing or marking, e.g., by inkjet printing, laser printing, electrostatic printing and the like. Images may be monochrome such as black and white images, or they may be colored images. Images may comprise one or more colors throughout, e.g., a uniform layer of color. Images that provide a general or custom surface may be used. For example, an image may be designed such that the optical article appears as plastic, metal or wood grain; fabric, leather, non-woven, etc. The image may also comprise white dots which may be disposed on a surface or interface. The white dots may be arranged as described for extraction features of conventional solid lightguides, e.g., as described in Kinder et al. Useful imaging materials include those that reflect all or some light within a particular range of wavelengths. Useful imaging materials include those that transmit all or some light within a particular range of wavelengths. Exemplary imaging materials include colorants such as pigments and dyes. Imaging materials may also comprise photonic crystals.

Any one of first substrates 1552, 1562, 1572 and 1582 may comprise a polymeric film. Any one of the polymeric films may be translucent. Any one of these first substrates may be an adhesive wherein useful adhesives include optically clear adhesives, optically diffuse adhesives, radiation cured adhesives, hot melt adhesives, cold seal adhesives, heat activated adhesives, and structural adhesives having an adhesive bond strength of at least about 6 MPa, and the like.

Any one of the optical articles shown in FIGS. 15*f-i* may comprise a clear acrylic PSA as the viscoelastic lightguide. Any one of the optical articles shown in FIGS. 15*f-i* may comprise a clear acrylic PSA as the viscoelastic lightguide and a polymeric film as the first substrate. Any one of the optical articles shown in FIGS. 15*f-i* may comprise a clear acrylic PSA as the viscoelastic lightguide and a translucent polymeric film as the first substrate. Any one of the optical articles shown in FIGS. 15*f-i* may comprise a clear acrylic PSA as the viscoelastic lightguide and an adhesive layer as the first substrate.

Any one of the optical articles shown in FIGS. 15*f-i* may comprise a second substrate disposed on the viscoelastic lightguide opposite the first substrate. The second substrate may comprise a reflector. For example, any one of the optical articles shown in FIGS. 15*f-i* may comprise a clear acrylic PSA as the viscoelastic lightguide, a translucent polymeric film as the first substrate, and a second substrate comprising a reflector. Any of the diffuse and specular reflectors described above may be used.

Figure 15J:
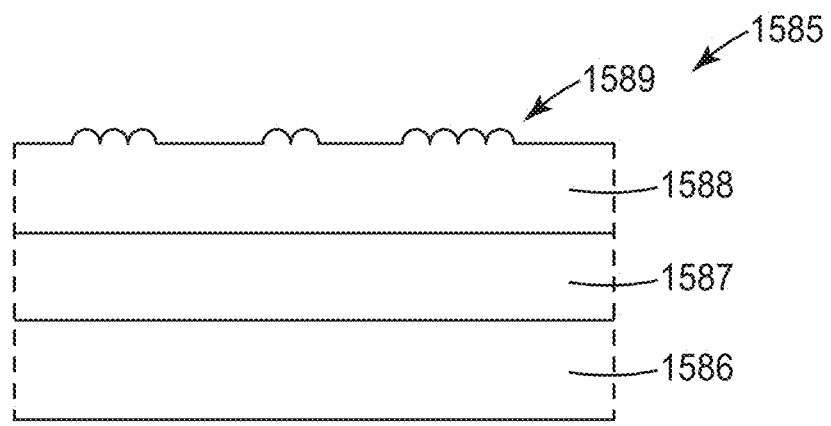
Figure 15K:
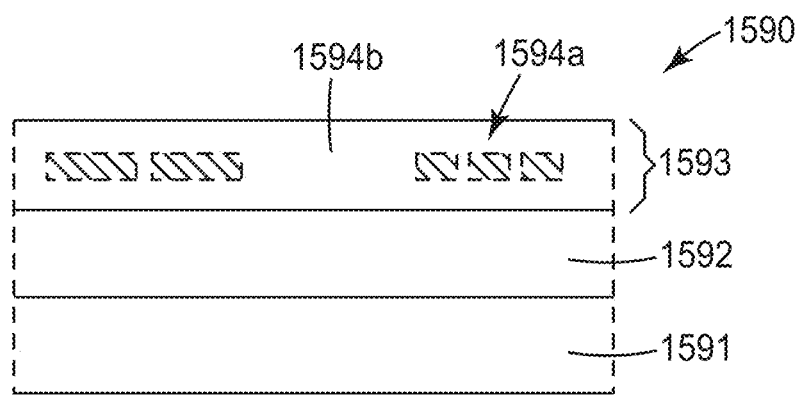
Figure 15L:
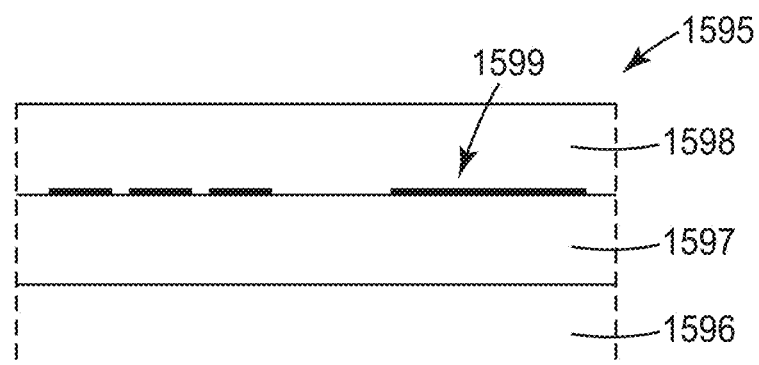

Constructions that may be used to provide an image are also shown in FIGS. 15*j-l*. FIG. 15*j* shows a schematic cross section of exemplary optical article 1585 comprising first substrate 1587 disposed between viscoelastic lightguide 1586 and additional substrate 1588. Surface 1589 of additional substrate 1588 is structured to form an image. FIG. 15*k* shows a schematic cross section of exemplary optical article 1590 comprising first substrate 1592 disposed between viscoelastic lightguide 1591 and additional substrate 1593. Additional substrate 1593 comprises an overlay, the overlay comprising regions of imaging materials 1594*a* suspended in bulk material 1594*b*. FIG. 15*l* shows a schematic cross section of exemplary optical article 1595 comprising first substrate 1597 disposed between viscoelastic lightguide 1596 and additional substrate 1598. Material 1599 is deposited between first substrate 1597 and additional substrate 1598 such that an image is formed by reflection of light within the first substrate and/or transmission of light within a particular range of wavelengths.

Any one of additional substrates 1588, 1593 and 1598 may comprise a polymeric film. Any one of the polymeric films may be translucent. Any one of the first substrates 1587, 1592 and 1597 may be viscoelastic. Any one of the first substrates may comprise a PSA. Any one of the first substrates may comprise a silicone PSA. The first substrates may comprise an adhesive wherein useful adhesives include optically clear adhesives, optically diffuse adhesives, radiation cured adhesives, hot melt adhesives, cold seal adhesives, heat activated adhesives, and structural adhesives having an adhesive bond strength of at least about 6 MPa, and the like.

Any one of the optical articles shown in FIGS. 15*j-l* may comprise a polymeric film as the additional layer and an adhesive that is the first substrate. Any one of the optical articles shown in FIGS. 15*j-l* may comprise a translucent polymeric film as the additional layer and an adhesive that is the first substrate. For example, any one of the optical articles shown in FIGS. 15*j-l* may comprise a clear acrylic PSA as the viscoelastic lightguide, a silicone PSA as the first substrate, and a polymeric imaged film as the additional layer. For another example, any one of the optical articles shown in FIGS. 15*j-l* may comprise a clear acrylic PSA as the viscoelastic lightguide, a silicone PSA as the first substrate, and a translucent polymeric imaged film as the additional layer.

Any one of the optical articles shown in FIGS. 15*f-i* may comprise a second substrate disposed on the viscoelastic lightguide opposite the first substrate. The second substrate may comprise a reflector. For example, any one of the optical articles shown in FIGS. 15*f-i* may comprise a clear acrylic PSA as the viscoelastic lightguide, a silicone PSA as the first substrate, a translucent polymeric film as the additional substrate, and a second substrate comprising a reflector. Any of the diffuse and specular reflectors described above may be used.

Multilayer constructions comprising the viscoelastic lightguide disposed between two substrates are described below. FIG. 14 shows a schematic cross section of exemplary optical article 1400 comprising viscoelastic layer 1401 disposed between first substrate 1402 and second substrate 1405. First substrate 1402 forms first interface 1403 with the viscoelastic layer and first outer surface 1404 is disposed opposite the interface. Second substrate 1405 forms second interface 1406 and second outer surface 1407 is disposed opposite the interface.

This multiple layer construction can manage light in many ways according to structure, refractive index, and material composition of the first substrate, second substrate and viscoelastic lightguide. In general, one may determine theoretically how varying parameters of optical article 1400 can affect the way by which light is managed by the article. This may be carried out using ray tracing techniques consistent with the law of refraction and the principle of total internal reflection.

The first and second substrates may comprise the same substrate such that the same surfaces of the substrates are positioned the same way with respect to the viscoelastic lightguide. The first and second substrates may comprise the same substrate such that the same surfaces of the substrates are positioned differently with respect to the viscoelastic lightguide. The first and second substrates may comprise different substrates.

The first and second substrates may be any combination of first substrates described above. The first and second substrates may be some combination of light containing, light extracting and light emitting substrates. Each of the first and second substrates may be some combination of light containing, light extracting and light emitting substrates. The first substrate may be a light containing substrate, and the second a light extracting substrate. The first substrate may be a light containing substrate, and the second a light extracting and light emitting layer. The first and second substrates may extract and/or emit light as described above for the first substrate of two layer constructions.

Parameters that may be varied include the structure of the first and second interfaces and the structure of the first and second outer surfaces. In general, at least portions of the first and second interfaces are optically smooth such that light propagating within the viscoelastic lightguide may be transported by total internal reflection. In some embodiments, the first and second interfaces and the first and second outer surfaces are unstructured as shown in FIG. 14. In some embodiments, any one of the first and second interfaces and the first and second outer surfaces is structured as described above for the viscoelastic lightguide and the first substrate. In some embodiments, any two of the first and second interfaces and the first and second outer surfaces are structured as described above for the viscoelastic lightguide and the first substrate. For example, the first and second interfaces may be structured with prismatic features for extracting light from the first and second substrates, respectively. In some embodiments, any three of the first and second interfaces and the first and second outer surfaces are structured as described above for the viscoelastic lightguide and the first substrate. In some embodiments, all four of the first and second interfaces and the first and second outer surfaces are structured as described above for the viscoelastic lightguide and the first substrate.

In general, optical article 1400 may comprise any of the structured interfaces and structured surfaces described above for the viscoelastic lightguide and the first substrate, i.e., the first and second interfaces and the first and second outer surfaces may comprise any of the structured interfaces and surfaces described above for the viscoelastic lightguide and the first substrate. FIGS. 18*a* and 18*b* show exemplary combinations of structured surfaces for three layer optical articles. FIG. 18*a* shows a schematic cross section of exemplary optical article 1800 comprising viscoelastic lightguide 1801 disposed between first substrate 1802 and second substrate 1805. First interface 1803 comprises prismatic features, as described above, for extracting light from the viscoelastic lightguide. First outer surface 1804 and second outer surface 1807 comprises unstructured surfaces, and second interface 1806 comprises an unstructured interface. FIG. 18*b* shows a schematic cross section of exemplary optical article 1810 comprising viscoelastic lightguide 1811 disposed between first substrate 1812 and second substrate 1815. First interface 1813 and second interface 1816 comprise unstructured surfaces, and first surface 1814 and second surface 1817 comprises lenticular surfaces, as described above, for emitting light from the first and second substrates, respectively.

In some embodiments, first and second interfaces may be structured so that light can be extracted on both sides by the first and second substrates. In some embodiments, first and second interfaces may be structured so that light can be extracted on both sides by the first and second substrates, and first and second outer surfaces may be structured so that light can be emitted from the first and second substrates.

Parameters that may also be varied include the refractive indices of the first substrate, second substrate and the viscoelastic lightguide. The first and second substrates may have refractive indices less than that of the viscoelastic lightguide. The first and second substrates may have refractive indices less than that of the viscoelastic lightguide, and the refractive indices of the first and second substrates are the same or nearly the same. The first and second substrates may have refractive indices less than that of the viscoelastic lightguide, and the refractive indices of the first and second substrates may be different. The first and second substrates may have refractive indices less than that of the viscoelastic lightguide, and the refractive index of the first substrate may be greater than that of the second.

The first and second substrates may have refractive indices greater than that of the viscoelastic lightguide. The first and second substrates may have refractive indices greater than that of the viscoelastic lightguide, and the refractive indices of the first and second substrates are the same or nearly the same. The first and second substrates may have refractive indices greater than that of the viscoelastic lightguide, and the refractive indices of the first and second substrates may be different. The first and second substrates may have refractive indices greater than that of the viscoelastic lightguide, and the refractive index of the first substrate may be greater than that of the second.

The first substrate may have a refractive index less than that of the viscoelastic lightguide, and the second substrate greater than that of the lightguide.

The refractive index difference of the viscoelastic lightguide and the first substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5. The refractive index difference of the viscoelastic lightguide and the second substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

Parameters that may also be varied include the compositions of the first substrate, second substrate and the viscoelastic lightguide. The first substrate, second substrate and viscoelastic lightguide may comprise the same composition. The first and second substrate compositions may be different from that of the viscoelastic lightguide. The first and second substrate compositions may be the same, and different from that of the viscoelastic lightguide. The first substrate and viscoelastic layer may comprise the same composition, and different from that of the second substrate. The first substrate, second substrate and viscoelastic lightguide may comprise different compositions.

The first and second substrates may comprise first and second viscoelastic layers, respectively. The first substrate may comprise a viscoelastic layer, and the second substrate does not. The first and second substrates may not comprise viscoelastic layers.

The first and second substrates may comprise first and second PSAs, respectively. The first substrate may comprise a PSA, and the second substrate does not. The first and second substrates may not comprise PSAs.

The first and second substrates may comprise first and second reflectors, respectively. The first substrate may comprise a reflector, and the second substrate does not. The first and second substrates may not comprise reflectors.

The first and second substrates may comprise first and second multilayer optical films, respectively. The first substrate may comprise a multilayer, and the second substrate does not. The first and second substrates may not comprise multilayer optical films.

The first and second substrates may comprise optically clear substrates that may be the same or different. Each substrate has high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%.

In some embodiments, the first substrate comprises a viscoelastic substrate, and the second substrate comprises a light emitting substrate. The light emitting substrate may comprise a polymeric film having a refractive index greater than that of the viscoelastic lightguide. The light emitting substrate may comprise a structured surface that is a second outer surface such that light can be emitted from the light emitting substrate.

In some embodiments, the first substrate comprises a viscoelastic layer and is a light emitting layer, and the second substrate does not comprise a viscoelastic layer.

In some embodiments, the first and second substrates comprise release liners. The first substrate may comprise a release liner, and the second substrate does not. The first and second subsubstrates may not comprise release liners.

The first substrate may comprise a viscoelastic layer, and the second substrate may comprise an adhesive layer that is not a PSA (it may be hot melt, cold seal, etc. as described above). The first substrate may comprise a PSA, and the second substrate may comprise an adhesive layer that is not a PSA (it may be hot melt, cold seal, etc. as described above). In either case, an additional substrate may be disposed on the first substrate opposite the viscoelastic lightguide. The additional substrate may provide an image as described above. The additional substrate may be translucent.

The first and second substrates may comprise silicone PSAs, and the viscoelastic layer may comprise a (meth)acrylic PSA. The first and second substrates may have refractive indices less than that of the viscoelastic lightguide. The silicone PSAs may be stretch releasable. This optical article may be disposed between first and second glasses which may or may not be the same glass. The first glass is disposed on the first substrate opposite the viscoelastic lightguide, and the second glass on the second substrate opposite the viscoelastic lightguide.

The first substrate may comprise a silicone PSA, and the viscoelastic lightguide may comprise a (meth)acrylic PSA. The first substrate may have a refractive index less than that of the viscoelastic lightguide. The silicone PSA may be stretch releasable. The second substrate may comprise a diffuse reflector comprising a layer of particles and polymer. The particles may comprise glass microspheres and the polymer may comprise an adhesive, or the particles may comprise glass microspheres and the polymer may comprise a (meth)acrylic PSA. An additional substrate may be disposed on the first substrate opposite the viscoelastic lightguide. The additional substrate may provide an image as described above. The additional substrate may be a polymeric film such as a translucent polymeric film. A reflector may be disposed on the diffuse reflector opposite the viscoelastic lightguide.

The first substrate may comprise a polymeric film having a refractive index greater than that of the viscoelastic lightguide, the second substrate may comprise a reflector. The polymeric film may provide an image as described above. The polymeric film may be translucent. An additional substrate may be disposed on the first substrate opposite the viscoelastic lightguide. The additional substrate may comprise a polymeric film.

The first substrate may comprise a polymeric film having a refractive index greater than that of the viscoelastic lightguide, the second substrate may have a refractive index less than that of the lightguide. The polymeric film may provide an image as described above. The polymeric film may be translucent. The second substrate may comprise a viscoelastic substrate. The second substrate may comprise a PSA.

The first substrate may comprise a silicone PSA, the second substrate may comprise a reflector, and the viscoelastic layer may comprise a (meth)acrylic PSA.

The first substrate may comprise a (meth)acrylic light extracting and light emitting substrate, for example, as described in King et al. and Sasagawa et al, the first substrate disposed on the viscoelastic lightguide with the tips of the prismatic structures in contact with the lightguide such that the two are optically coupled. The second substrate comprises a reflector. The viscoelastic lightguide comprises a (meth)acrylic PSA. Any areas of the first substrate may be filled with a pocket material as described above. For example, the pocket material may comprise a silicone PSA having a refractive index less than that of the first substrate and the viscoelastic lightguide.

The first substrate may comprise a silicone PSA having a refractive index less than that of the viscoelastic lightguide. An additional substrate may be disposed on the silicone PSA opposite the viscoelastic lightguide; the additional substrate comprising a (meth)acrylic light extracting and light emitting substrate, for example, as described in King et al. and Sasagawa et al. In this case, the tips of the prismatic structures are not in contact with the lightguide. The second substrate comprises a reflector. The viscoelastic lightguide comprises a (meth)acrylic PSA.

The first and second substrates may comprise (meth)acrylic light extracting and light emitting substrates, for example, as described in King et al. and Sasagawa et al, the substrates disposed on the viscoelastic lightguide with the tips of the prismatic structures in contact with the lightguide such that the two substrates are optically coupled to the lightguide. The viscoelastic lightguide comprises a (meth)acrylic PSA. Any gaps between the substrates and the viscoelastic lightguide are filled with a silicone PSA having a refractive index less than that of the (meth)acrylic substrates and the viscoelastic lightguide.

The first and second substrates may comprise a silicone PSA. A first additional substrate may disposed on the first substrate opposite the viscoelastic layer, and a second additional substrate on the second substrate opposite the viscoelastic layer. The first and second additional substrates may comprise (meth)acrylic films, for example, as described in King et al. and Sasagawa et al. The viscoelastic lightguide comprises a (meth)acrylic PSA.

The first and second substrates may comprise first and second glasses, respectively, which may or may not be the same glass.

In some embodiments, the first substrate comprises a viscoelastic layer, and the second substrate comprises a reflector. The first substrate may comprise a PSA, and the second substrate may comprise a specular reflector. In either case, the first substrate may have a refractive index greater than or less than that of the viscoelastic lightguide. In some embodiments, the first substrate comprises a light transmissive substrate that is not a viscoelastic layer, and the second substrate comprises a reflector. The first substrate may comprise a polymeric film.

In general, the optical articles described above may have substrates that are interchangeable. For example, a first substrate may comprise an imaged layer that may be exchanged with a different imaged layer. For another example, an additional layer disposed on a first substrate may be exchanged with a different additional layer.

In general, an adhesive layer may be disposed on a surface of any of the optical articles described herein. Suitable adhesives include PSAs, optically clear PSAs, optically diffuse PSAs such as those described above, radiation cured adhesives, hot melt adhesives, cold seal adhesives, heat activated adhesives, structural adhesives having an adhesive bond strength of at least about 6 MPa, and the like.

In general, a release liner may be disposed on the surface of any of the substrates such as the first substrate, second substrate, and/or any additional substrates. Suitable release liners are described above.

In some embodiments, the viscoelastic lightguide may comprise two layers wherein one of the layers comprises particles as described above. In some embodiments, the viscoelastic lightguide may comprise three layers: a first viscoelastic lightguide, a second viscoelastic lightguide disposed on the first viscoelastic lightguide, a polymeric film disposed on the second viscoelastic lightguide opposite the first viscoelastic lightguide, and a third viscoelastic lightguide disposed on the first viscoelastic lightguide opposite the second viscoelastic lightguide. The polymeric film may be designed to emit light.

The viscoelastic lightguides may comprise the same polymer, or they may comprise different polymers. The viscoelastic lightguides may have refractive index differences of from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The viscoelastic lightguide may be made using any method or process commonly used for making viscoelastic articles. Typical processes comprise those that are continuous processes such as continuous cast and cure, extrusion, microreplication, and embossing methods. Various types of radiation may be used for processes in which a material needs to be cured, e.g., crosslinked. Various types of chemistries, including those that do not require radiation, may be used for materials that need to be cured. If the viscoelastic lightguide is made from a curable material, then the material may be cured before, after or during contact with the light source. If the viscoelastic lightguide is made from a cured material, then the material may be cured before, after or during contact with first and/or second substrates. If a first or second substrate is made from a curable material, then the material may be cured before, after or during contact with the viscoelastic lightguide. If any one or more of the viscoelastic lightguide, first substrate and second substrate is made from a cured material, then the material may be cured using the light source either before, during or after they are optically coupled to the lightguide.

Conventional molding processes may also be used. Molds may be made by micro-machining and polishing of a mold material to create the desired features, structured surfaces, etc. Mold materials include polymeric, glass and metal materials. The molds may need to be suitable for making optically smooth surfaces of the viscoelastic lightguide. The optically smooth surface of the viscoelastic lightguide, if made from curable materials, may be formed by simply allowing the material to cure in air or other atmosphere such that the material levels itself. Laser ablation may be used to structure a surface of the viscoelastic lightguide and molds.

Optical articles comprising the viscoelastic lightguide and a substrate may be made in a number of ways. In some embodiments, the lightguide and substrate may be made separately, contacted and pressed together using finger pressure, a hand roller, an embosser or a laminator.

In some embodiments, the substrate may be formed on the viscoelastic lightguide by coating a substrate material on the lightguide. The substrate material may then be treated to form the substrate. For example, the substrate material may be extruded onto the viscoelastic lightguide in the form of a layer and cooled to solidify the material to form the substrate. Alternatively, the substrate material may be curable and treated by heating and/or applying radiation to form the substrate. The substrate material may include solvent and the substrate is formed by removing the solvent.

In some embodiments, the viscoelastic lightguide may be formed on the substrate by coating a viscoelastic material on the substrate. The viscoelastic material may then be treated to form the viscoelastic lightguide. For example, the viscoelastic material may be extruded onto the substrate in the form of a layer and cooled to solidify the material to form the lightguide. Alternatively, the viscoelastic material may be curable and treated by heating and/or applying radiation to form the lightguide. The viscoelastic material may include solvent and the lightguide is formed by removing the solvent.

In cases where the substrate material or the viscoelastic material is curable, an optical article having a partially cured substrate or lightguide, respectively, may be made. In cases where the substrate material or the viscoelastic material is curable, chemically curing materials may be used such that the material is crosslinked. In cases where the substrate material or the viscoelastic material is curable, the material may be cured before, after and/or during contact with another material or the light source.

In cases where the substrate material or the viscoelastic material is curable using light, the light source may be optically coupled to the material and curing carried out by injecting light from the light source.

A substrate may be used to structure a surface of the viscoelastic lightguide, e.g., the viscoelastic lightguide may not be structured by itself, rather, it becomes structured when contacted with a structured surface of a substrate. It is also possible for the viscoelastic lightguide to have a structured surface such that it deforms a surface of a substrate to create the interface.

The optical articles and optical devices disclosed herein may be provided in any number of ways. The optical articles and optical devices may be provided as sheets or strips laid flat, or they can be rolled up to form a roll. The optical articles and optical devices may be packaged as single items, or in multiples, in sets, etc. The optical articles and light sources may be provided in an assembled form, i.e., as an optical device. The optical articles and light sources may be provided as kits wherein the two are separate from each other and assembled at some point by the user. The optical articles and light sources may also be provided separately such that they can be mixed and matched according to the needs of the user. The optical articles and optical devices may be temporarily or permanently assembled to light up.

The optical articles disclosed herein may be altered depending on a particular use. For example, the optical articles can be cut or divided by any suitable means, e.g., using a scissors or a die cutting method. A particularly useful die cutting method is described in U.S. Provisional Ser. No. 61/046,813 (64033US002, Sherman et al.). The optical articles and devices may be cut or divided into different shapes such as alphabetic letters; numbers; geometric shapes such as squares, rectangles, triangles, stars and the like.

Figure 19:
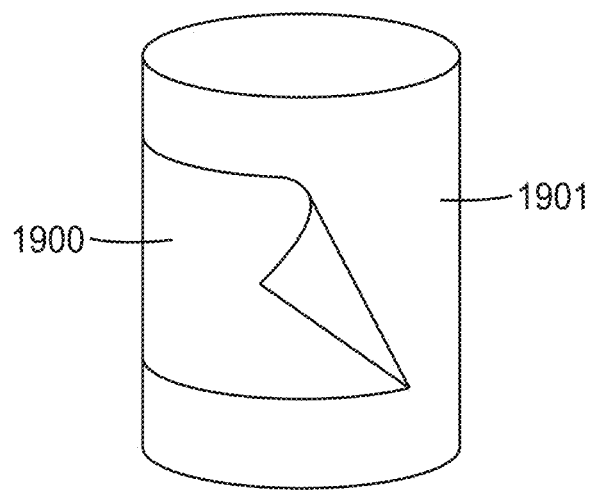

The optical articles and optical devices may be used for signage such as for graphic arts applications. The optical articles and optical devices may be used on or in windows, walls, wallpaper, wall hangings, pictures, posters, billboards, pillars, doors, floormats, vehicles, or anywhere signage is used. Signage may be single-sided or double-sided as shown in FIGS. 15c and 18b, respectively. FIG. 19 shows a schematic drawing of exemplary optical article or optical device 1900 in contact with an article having curved surface 1901.

Figure 20:
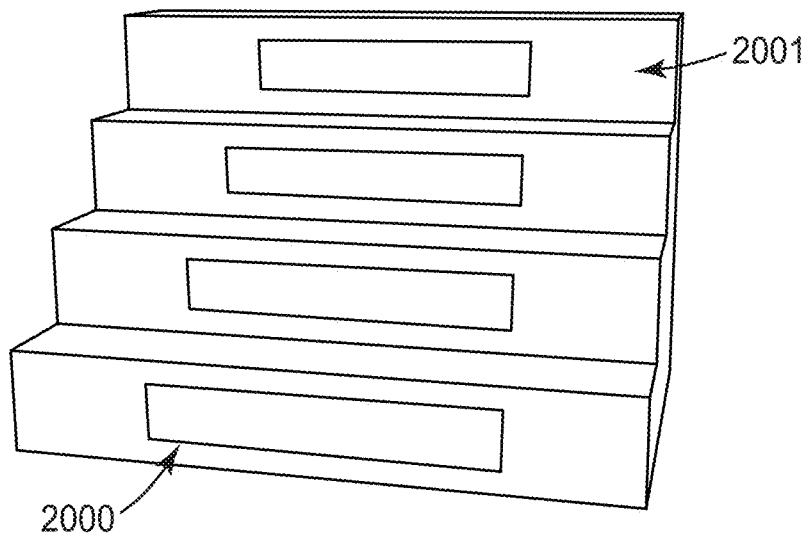

The optical articles and devices may be used for safety purposes wherever light is desired. For example, the optical articles and devices may be used to illuminate one or more steps of a ladder, steps of a stairway, aisles such as in airplanes and movie theatres, walkways, egress, handrails, work zone identification signs and markings. FIG. 20 shows a schematic drawing of exemplary optical article or optical device 2000 in contact with stairs 2001 of a stairway.

The optical articles and optical devices may be used in a variety of items such as reading lights; party and holiday decorations such as hats, ornaments, string lighting, balloons, gift bags, greeting cards, wrapping paper; desk and computer accessories such as desk mats, mousepads, notepad holders, writing instruments; sporting items such as fishing lures; craft items such as knitting needles; personal items such as toothbrushes; household and office items such as clock faces, wall plates for light switches, hooks, tools.

Figure 21:
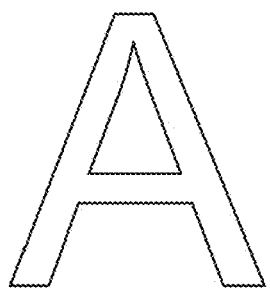

FIG. 21 shows a schematic drawing of an exemplary cut-out article in which the optical article or optical device (not shown) is incorporated.

Figure 22:
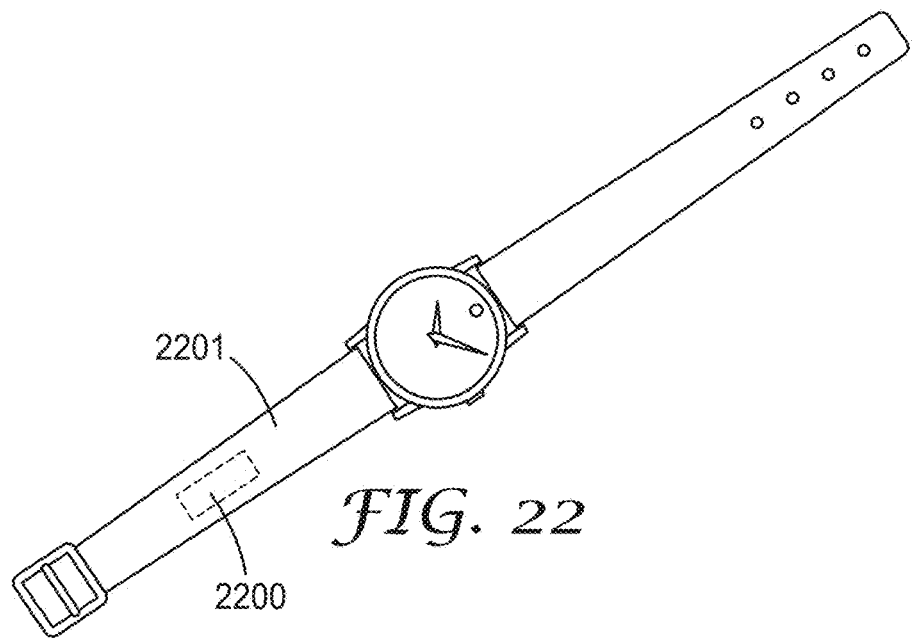

The optical articles and optical devices may be used on clothing and clothing accessories for decorative and/or safety purposes. For example, the optical articles and optical devices may be used on outerwear for cyclists, or on clothing or headgear for miners. For another example, the optical articles and optical devices may be used on or in straps and wristbands of watches, or on or in watch faces. FIG. 22 shows a schematic drawing of exemplary optical article or optical device 2200 incorporated into or on wristband 2201 of a watch.

Figure 23:
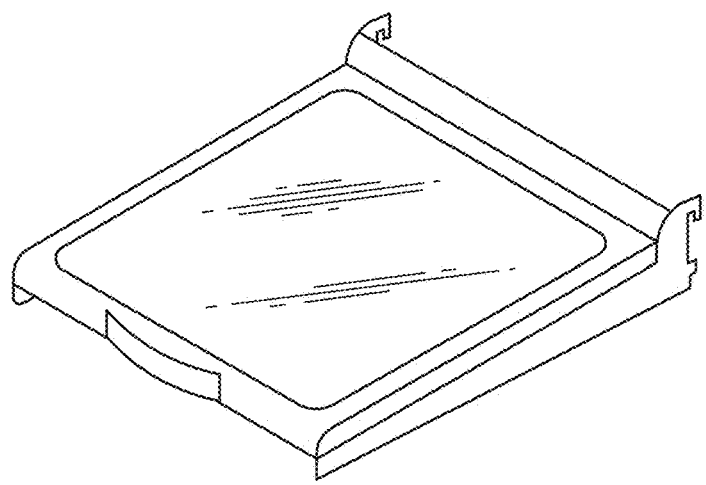

The optical articles and optical devices may be used anywhere light is needed or desired. The optical articles and optical devices may be disposed on a top surface of a shelf such that light from the article or device, respectively, is emitted in an upward direction. Likewise, the optical articles and optical devices may be disposed on a bottom surface of a shelf such that light from the article or device, respectively, is emitted in a downward direction. The optical articles and optical devices may also be disposed on or within a shelf having a light transmissive portion. The articles and devices may be arranged such that light is emitted from the light transmissive portion. FIG. 23 shows a schematic drawing of an exemplary refrigerator shelf in which the optical article or optical device (not shown) is incorporated such that light is emitted in upward and/or downward directions.

The optical articles and devices may be used as flashlights. For example, optical articles and optical devices may be disposed on the outside or inside of a battery cover plate or other part of an electronic handheld device. The optical articles and optical devices may or may not be hardwired to the electronic device's battery but could have its own power source. The electronic device's battery cover may or may not be removable from the rest of the device comprising the display.

The optical articles and optical devices may be used for vehicles such as automobiles, marine vehicles, buses, trucks, railcars, trailers, aircraft, and aerospace vehicles. The optical articles and devices may be used on almost any surface of a vehicle including the exterior, interior, or any in-between surface. For example, the optical articles and devices may be used to light up door handles on the exterior and/or interior of a vehicle. The optical articles and devices may be used to illuminate trunk compartments, for example, they may be positioned on the underside of the trunk lid or inside the compartment. The optical articles and devices may be used on bumpers, spoilers, floor boards, windows, on or as tail lights, sill plate lights, puddle lights, emergency flashers, center high mounted stop lights, or side lights and markers. The optical articles and devices may be used to illuminate the inside of engine compartments, for example, they may be positioned on the underside of the hood, inside the compartment, or on an engine part.

Figure 24:
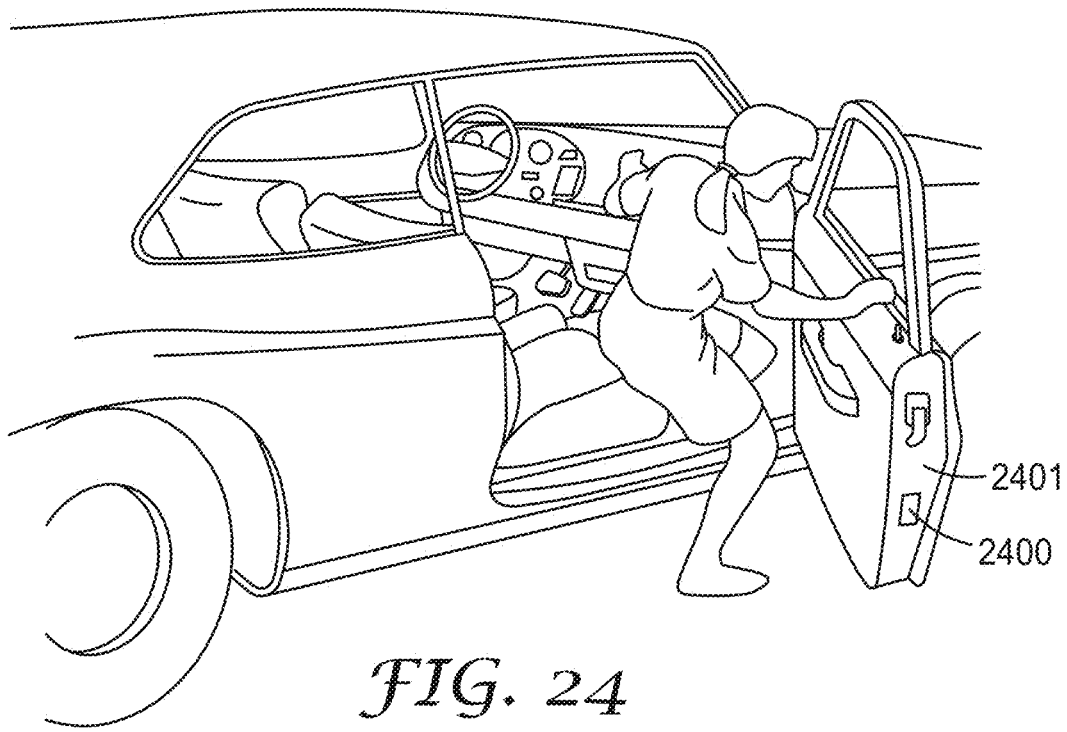

The optical articles and devices may also be used on the edge surfaces of vehicular doors between the exterior and interior panels of the doors. These optical articles and devices may be used to provide a variety of information for the user, manufacturer, etc. The optical articles and devices may be used to illuminate the instrument panel of a vehicle where lighted areas are typically displayed. The optical articles and devices may be used on other interior items such as cupholders, consoles, handles, seats, doors, dashboards, headrests, steering wheels, wheels, portable lights, compasses, and the like. The optical articles and devices may be used on back or pass areas for reading light or to provide ambient lighting for inside a vehicle. FIG. 24 shows an exemplary automobile and exemplary optical article or optical device 2400. The optical article or device is disposed on edge surface 2401 of the passenger door.

Figure 25:
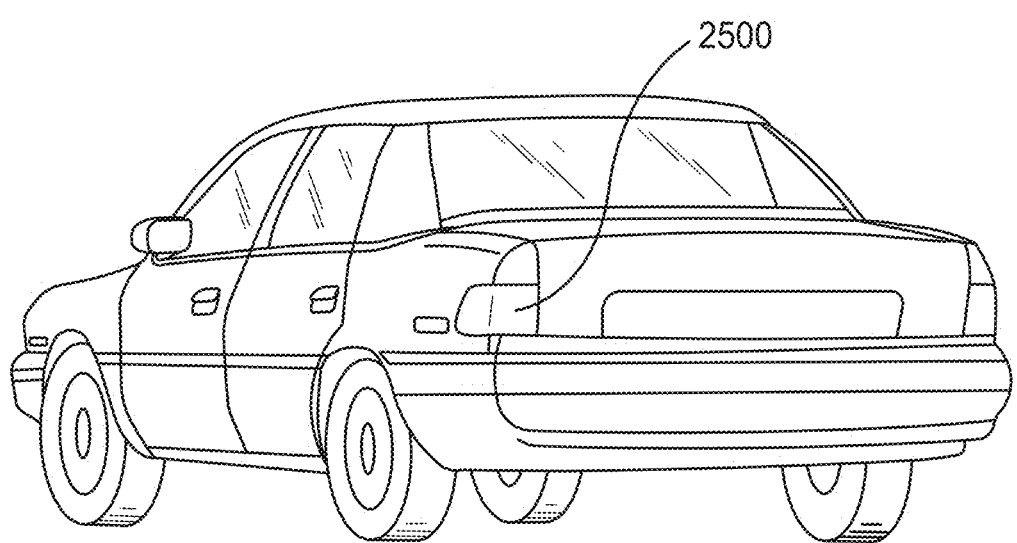

The optical articles and optical devices may be used in the manufacture of an item or as a replacement part of an item. For example, the optical articles and optical devices may be sold to an automobile manufacturer or automobile repair shop for assembly or repair of some specific part of an automobile. FIG. 25 shows an exemplary automobile having tail light 2500. An optical article or optical device (not shown) is disposed behind the outside layer of the tail light which is typically red, yellow or clear plastic. The tail light may comprise a cavity with a light bulb or LED as a light source. An optical article or device may be used in the cavity as a replacement for the light source. Alternatively, the tail light may not comprise a cavity or at least comprise a much smaller cavity than is used in today's automobiles. An optical article or optical device may be disposed behind or within the outside layer of the tail light such that the overall size of the tail light is reduced.

The optical articles and optical devices may be used for traffic safety such as for traffic signs, street signs, highway dividers and barriers, toll booths, pavement markings, and work zone identification signs and markings. The optical articles and devices may be used on license plates for decoration, to provide information such as vehicle registration, etc. The optical articles and devices may also be used to provide light near license plates such that the license plates are lit up from the side, top, etc.

The optical articles and optical devices may be used with illumination devices comprising hollow light recycling cavities sometimes referred to as backlight assemblies. Backlight assemblies may be used for signage or general lighting. Exemplary backlight assemblies are disclosed in WO 2006/125174 (Hoffman et al.) and US 2008/0074901 (David et al.). The optical articles and optical devices disclosed herein may be used to replace the light sources described in these references.

FIG. 26a shows a schematic cross section of an exemplary backlight assembly 2600. The backlight assembly comprises housing 2605 having a plurality of internal surfaces 2606a-c and two opposing side surfaces 2607a and b (not shown) substantially parallel to the plane of the cross section. At least one of these internal surfaces 2606a-c and 2607a and b is reflective. Backlight assembly 2600 also comprises light emitting film 2610. Housing 2605 and light emitting film 2610 form an enclosed backlight. Light emitting film 2610 may comprise any material that transmits light from inside the enclosed backlight to outside illumination device 2600. Light emitting film 2610 may comprise a polymeric film which may be diffusive and/or translucent. The light emitting film may also provide an image as described above. For example Housing 2605 may comprise metal and/or polymer. Reflective internal surfaces may comprise any of the reflectors and reflective surfaces described above.

Backlight assembly 2600 comprises at least one optical article as disclosed herein. The optical article may be disposed on at least one of internal surfaces 2606a-c, 2607a-b, and 2611 which is the internal surface of light emitting film 2610. FIG. 26a shows optical article 2615 disposed on internal surface 2606a. The optical article may comprise a viscoelastic lightguide disposed on a polymeric substrate. If the viscoelastic lightguide is a pressure sensitive adhesive, it may be directly adhered to internal surface 2606a. One or more light sources is disposed such that light emitted by the one or more light sources can enter the viscoelastic lightguide of optical article 2615. For example, a light source may be disposed along the edge of the optical article that is adjacent internal surface 2606b.

FIG. 26b shows a schematic cross section of an exemplary backlight assembly 2620. The enclosed backlight is formed as described above for FIG. 26a, except that optical articles 2625a and 2625b are disposed on opposing internal surfaces 2606b and c.

FIG. 26c shows a schematic cross section of an exemplary backlight assembly 2630. The enclosed backlight is formed as described above for FIG. 26a, except that optical article 2635 is disposed on internal surface 2611 of light emitting film 2610. Optical article 2635 may comprise a viscoelastic lightguide and light may be emitted from either face of the lightguide, i.e., into the cavity of the assembly or into the light emitting film.

For embodiments shown in FIGS. 26a-c, the optical articles comprising the viscoelastic lightguide may emit light from one or more surfaces. For example, the optical articles may emit light from one or both faces.

Additional films, layers, etc. may be disposed on either side of light emitting film 2610. For example, a three-quarter mirror comprising a multilayer optical film may be disposed on surface 2611. Multilayer optical films are described in references cited above. Retrore The optical articles and optical devices may be used on or in display devices such as cell phones, personal digital devices, MP3 players, digital picture frames, monitors, laptop computers, projectors such as mini-projectors, global positioning displays, televisions, etc. The optical articles may be used in place of conventional lightguides used to backlight a display panel of the display device. For example, the viscoelastic lightguide may be used to replace a solid or hollow lightguide that distributes light from one or more substantially linear or point light sources. The display device can be assembled without the need for adhesives to bond display components to the viscoelastic lightguide. Exemplary display devices include those having LCD and plasma display panels. Exemplary display devices are described in US 2008/232135 A1 (Kinder et al.) and U.S. Pat. No. 6,111,696 (Allen et al.)

FIG. 27 shows a schematic cross section of exemplary display device 2700. Optical device 2701 comprises light source 2702 and viscoelastic lightguide 2703. The display device also comprises polarizer 2710 disposed between LCD panel 2715 and viscoelastic lightguide 2703. Exemplary polarizers and LCD panels are described in Allen et al.

The optical articles and devices may be used for lighting buttons and keypads in various electronic devices including the display devices described above. In this case, the optical articles and devices are used in place of a conventional lightguide as described in U.S. Pat. No. 7,498,535 (Hoyle); U.S. 2007/0279391 A1 (Marttila, et al.), U.S. 2008/0053800 A1 (Hoyle), and U.S. Ser. No. 12/199,862 (63619US006, Sahlin, et al.).

FIG. 28 shows a schematic cross section of exemplary keypad assembly 2800. Optical device 2801 comprises light source 2802 and viscoelastic lightguide 2803. Optical assembly 2800 also comprises a plurality of keys with each key 2804a comprising a corresponding protrusion 2804b. Also shown are domesheet 2805 and conductive popples 2806. When a user depresses key 2804a in a downward direction as shown by arrow 2810, protrusion 2804b contacts viscoelastic lightguide 2803 which then contacts domesheet 2805. Domesheet 2805 is pressed down on popple 2806 such that at least a portion of the popple is pushed inside out. The popple then contacts surrounding electrical contacts (not shown) such that light is emitted from the lightguide to light up the corresponding key.

In some embodiments, top surface 2807 of viscoelastic lightguide 2803 is substantially not in contact with anything but the surrounding air. In some embodiments, a substrate is disposed on top surface 2807. The substrate may comprise any of those described herein. The substrate may be designed to extract light from viscoelastic lightguide 2803 when the surrounding air is displaced at the surface of the substrate. The substrate may comprise a polymeric film having a refractive index less than that of viscoelastic lightguide 2803. The substrate may comprise a viscoelastic layer having a refractive index less than that of viscoelastic lightguide 2803. The substrate may comprise a pressure sensitive adhesive layer having a refractive index less than that of viscoelastic lightguide 2803.

FIG. 29 shows a schematic cross section of exemplary signage. Viscoelastic lightguide 2901 is disposed on multi-layer optical film 2902 that is a mirror film. Extractor layer 2903 is disposed on viscoelastic lightguide 2901 opposite the mirror film. The extractor layer comprises a polymeric film capable of extracting light from the viscoelastic layer. For example, the extractor layer may have a refractive index greater than that of the viscoelastic layer. A pattern of white dots (not shown) may be a part of extractor layer 2903 such that light is emitted uniformly from the layer. Diffuse layer 2904 is disposed on extractor layer 2903 and graphic film 2905 is disposed on top of the diffuse layer. An air gap may be disposed between the extractor layer and the diffuse layer although this is not shown in FIG. 29.

The optical articles and optical devices disclosed herein may be incorporated into security films or laminates. These security laminates are used to protect documents or packages to ensure that underlying items are not altered. Security laminates may be used to make driver licenses, passports, tamper proof seals and the like. Exemplary security film constructions are described in U.S. Pat. No. 5,510,171 (Faykish); U.S. Pat. No. 6,288,842 (Florczak et al.); and U.S. Ser. No. 12/257,223 (64812US002, Endle et al.).

The optical articles and optical devices may be used in the construction of an illuminated license plate. Useful optical articles include the front lit and back lit optical articles described in U.S. 2007/0006493 (Eberwein); U.S. 2007/0031641 A1 (Frisch et al.); U.S. 20070209244 (Prollius et al.); WO 2008/076612 A1 (Eberwein); WO 2008/121475 A1 (Frisch); WO 2008/016978 (Wollner et al.) and WO 2007/92152 A2 (Eberwein).

The optical articles and devices described herein may be used for creating three-dimensional (3D) images in displays, buttons, keypads and the like. For example, 3D automotive displays and security laminates may be made. The optical articles and devices may be used with microlens sheeting in which a composite image floats above or below the sheeting, or both. For example, the optical articles and devices may be used with microlens sheetings described in U.S. Pat. No. 7,336,422 B2 (Dunn et al.), U.S. 2008/0130126 A1 (Brooks et al.), U.S. 2007/0081254 A1 (Endle et al.), U.S. 2007/0279391 A1 (Martina et al.), and U.S. Application Ser. No. 61/078,971 filed on Jul. 8, 2008 (64316US002, Gates et al.), U.S. Pat. No. 6,288,842 (Florczak et al.); and U.S. Ser. No. 12/257,223 (64812US002, Endle et al.).

The optical articles and devices may comprise an electrical circuit. For example, the first substrate may comprise an electrical circuit. The first substrate may also comprise a reflector which comprises an electrical circuit. The first substrate may also comprise a mirror which comprises an electrical circuit. The light source may be in electrical communication with the electrical circuit. The light source may comprise an array of multiple light sources. The viscoelastic lightguide can be formed onto the electrical circuit such that the light sources inject light into the viscoelastic lightguide throughtout the entire area of the layer.
US 2008/0062688 (Aeling et al.);

The optical articles and devices may be used in sensing/detecting devices wherein a sensor is disposed to receive light emitted from the viscoelastic lightguide. Also disclosed is a sensing/detecting device in which the light source is replaced with a sensor/detector. The sensor/detector can be a photodetector, a silicon photodiode, an IR detector, a solar cell, or an optoelectronic device, or some combination thereof.

The optical articles and devices may be incorporated into a therapeutic device. For example, the optical articles and devices disclosed herein may be used in conformal patches for providing light therapy to tissue. Exemplary conformal patches are described in U.S. Pat. No. 6,096,066 (Chen et al.). Additional therapeutic devices are described in U.S. 2005/0070976 A1 (Samuel et al.); *Electronics World*, October 2007; and *LEDs Magazine*, November 2006.

The terms "in contact" and "disposed on" are used generally to describe that two items are adjacent one another such that the whole item can function as desired. This may mean that additional materials can be present between the adjacent items, as long as the item can function as desired.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| PDMS Diamine | α,ω-bis(aminopropyl) polydimethylsiloxane having a molecular weight of about 33,000 g/mole and prepared as described in Example 2 of U.S. Pat. No. 5,461,134 |
| MQ Resin | a 60% solids solution of MQ silicone resin in toluene, commercially available from GE Silicones; Waterford, NY under the trade designation "SR-545" |
| Polyamine | an organic diamine, commercially available from DuPont, Wilmington, DE under the trade designation "DYTEK A" |
| H12MDI | methylenedicyclohexylene-4,4'-diisocyanate, commercially available from Bayer, Pittsburgh, PA under the trade designation "DESMODUR W" |

Example A

Example 1

A silicone urea PSA with an elastomer was prepared by placing 14.86 parts PDMS Diamine-1 in a glass reactor with 0.05 parts Polyamine-1, 39.00 parts toluene and 21.00 parts 2-propanol. To this solution was added 0.23 parts H12MDI. The mixture was stirred at room temperature for two hours and became viscous. To this was added 25.00 parts of MQ Resin-1. The resulting silicone urea PSA contained a molar ratio of PDMS Diamine-1/Polyamine-1/H12MDI of 1/1/2 and was formulated with 50 weight % MQ Resin-1.

The silicone urea PSA was coated on a PET release liner (LOPAREX 5100 from Loparex LLC) to form a PSA layer having a dry thickness of about 25 um. The refractive index of the silicone urea PSA layer was about 1.40.

A laminate was prepared using a tape (VHB™ Acrylic Tape 4910F from 3M Company) comprising a clear acrylic PSA (nominal thickness 1 mm) disposed on a liner (0.13 mm). The refractive index of the acrylic PSA layer was 1.473 as measured using an Abbe refractometer. The silicone urea PSA layer was laminated to the acrylic PSA layer using a hand roller. The tape liner was removed and a second silicone urea PSA layer was laminated to the newly exposed side of the acrylic PSA layer. The PET release liners on the silicone urea PSA layers were removed. Laminates were made using a single layer of tape and up to 15 layers of tape, disposed between the silicone urea PSA layers.

An LED light source was pressed into the edge of the acrylic PSA layer of a 4×4 in. sample of the laminate such that the LED was approximately perpendicular to the width of the laminate and parallel to the length. The LED was activated. Light propagated through the acrylic PSA layer and was observed to exit the layer by holding a piece of paper along the edge opposite the edge where the LED was in contact with the layer. Light did not appear to exit the laminate in any other direction.

Example 2a

A laminate was prepared as described for Example 1 except that one of the silicone urea PSA layers was replaced with a multilayer polymeric mirror film (Vikuiti™ ESR from 3M Co.). An LED light source was pressed into the edge of the acrylic PSA layer of a 4×4 in. sample of the laminate such that the LED was approximately perpendicular to the width of the laminate and parallel to the length. The LED was activated. Light propagated through the acrylic PSA layer and was observed to exit the layer by holding a piece of paper along the edge opposite the edge where the LED was in contact with the layer. Light did not appear to exit the laminate in any other direction.

Example 2b

An acrylic extractor film having microstructured features was obtained. This film is described in detail in US 2005/0052750 A1 (King et al.). One major surface of the acrylic extractor film comprised saw-tooth or pyramidal prismatic features. The opposing major surface of the film comprised cylindrical lenses. The refractive index of the acrylic extractor film was from about 1.52 to about 1.56.

A laminate was prepared as described for Example 1 except that one of the silicone urea PSA layers was replaced with a multilayer polymeric mirror film (Vikuiti™ ESR from 3M Co.). The acrylic extractor film was pressed into the silicone urea PSA layer such that the pyramidal prismatic features were in contact with the acrylic PSA layer. The LED was activated. The acrylic extractor film was immediately lit with light from the acrylic PSA layer.

Attachment of additional multilayer polymeric mirror films to the cut edges of the laminate was accomplished using finger pressure.

Example B

Comparative Example

A transfer tape (3M™ Optically Clear Laminating Adhesive 8187 from 3M Company) comprising an optically clear acrylic PSA (175 um thickness) disposed between 2 PET liners (each 50 um thickness) was used. The refractive index of the optically clear acrylic PSA layer was 1.47. Laminates were prepared by laminating two glass slides to each other using two layers of the 8187 PSA (350 um total thickness). The glass slides were 75×38×1 mm and No. 2956 from Esco Products Inc.

A small extension of the PSA, creating a tacky tab, ~⅛"×¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was breaking and could not be removed from the glass using the system and method described in commonly assigned U.S. Provisional Ser. No. 61/036,683 (Johnson et al.) filed on Mar. 14, 2008. The whole PSA layer remained as residue on both pieces of glass.

Example 3

The silicone urea PSA layer was laminated to the 8187 PSA layer using a hand roller. The tape liner was removed and a second silicone urea PSA layer was laminated to the newly exposed side of the 8187 PSA layer. The PET release liners on the silicone urea PSA layers were removed. Laminates were prepared by laminating two glass slides described above to each other using the three layer PSA.

An LED light source was pressed into the edge of the 8187 PSA layer of a laminate such that the LED was approximately perpendicular to the width of the laminate and parallel to the length. The LED was activated. Light propagated through the 8187 PSA layer and was observed to exit the layer by holding a piece of paper along the edge opposite the edge where the LED was in contact with the layer. Light did not appear to exit the laminate in any other direction.

A small extension of the PSA, creating a tacky tab, ~⅛"×¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was removed from the glass using the system and method described in Johnson et al.

Example 4

A transfer tape (3M™ Optically Clear Laminating Adhesive 8142 from 3M Company) comprising an optically clear acrylic PSA (50 um thickness) disposed between 2 PET liners (each 50 um thickness) was used. The refractive index of the acrylic 8142 PSA layer was 1.47. Two layers of the 8187 PSA were laminated together (350 um total thickness).

The silicone urea PSA layer was laminated to the 8142 PSA layer using a hand roller. The tape liner was removed and a second silicone urea PSA layer was laminated to the newly exposed side of the 8142 PSA layer. The PET release liners on the silicone urea PSA layers were removed. Laminates were prepared by laminating two glass slides described above to each other using the three layer PSA.

An LED light source was pressed into the edge of the 8142 PSA layer of a laminate such that the LED was approximately perpendicular to the width of the laminate and parallel to the length. The LED was activated. Light propagated through the 8142 PSA layer and was observed to exit the layer by holding a piece of paper along the edge opposite the edge where the LED was in contact with the layer. Light did not appear to exit the laminate in any other direction.

A small extension of the PSA, creating a tacky tab, ~⅛"×¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was removed from the glass using the system and method described in Johnson et al.

Example 5

A transfer tape (3M™ Optically Clear Laminating Adhesive 8141 from 3M Company) comprising an optically clear acrylic PSA (25 um thickness) disposed between 2 PET liners (each 50 um thickness) was used. The refractive index of the acrylic 8142 PSA layer was 1.47.

The silicone urea PSA layer was laminated to the 8141 PSA layer using a hand roller. The tape liner was removed and a second silicone urea PSA layer was laminated to the newly exposed side of the 8141 PSA layer. The PET release liners on the silicone urea PSA layers were removed. Laminates were prepared by laminating two glass slides described above to each other using the three layer PSA.

An LED light source was pressed into the edge of the 8141 PSA layer of a laminate such that the LED was approximately perpendicular to the width of the laminate and parallel to the length. The LED was activated. Light propagated through the 8141 PSA layer and was observed to exit the layer by holding a piece of paper along the edge opposite the edge where the LED was in contact with the layer. Light did not appear to exit the laminate in any other direction.

A small extension of the PSA, creating a tacky tab, ~⅛"×¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was removed from the glass using the system and method described in Johnson et al.

Example C

Example 6

A 3-layer laminate was prepared from 3 pieces of tape (VHB™ Acrylic Tape 4910F from 3M Company) comprising a clear acrylic PSA having a nominal thickness 1 mm and a refractive index of 1.473 as measured using an Abbe refractometer. A hand roller was used to prepare the 3-layer laminate. This 3-layer laminate was then laminated to the face surface (viewer's side) of 3M™ Diamond Grade™ Reflective Sheeting from 3M™ Company (4"×8" area) so that the sheeting was front lit. A side-emitting LED was pressed into the core PSA from one end and light was easily passed through the entire 8 inches of the 3-layer laminate and was able to be visibly seen exiting. Light was also extracted perpendicular to the light source along the white hexagon seal pattern of the sheeting.

Example 7

A 3-layer laminate was prepared from 3 pieces of tape (VHB™ Acrylic Tape 4910F from 3M Company) comprising a clear acrylic PSA having a nominal thickness 1 mm and a refractive index of 1.473 as measured using an Abbe refractometer. A hand roller was used to prepare the 3-layer laminate. A 93/7 w/w isooctylacrylate/acrylamide solvent based adhesive was loaded with 2 and 10 pph hollow glass spheres having a mean diameter of about 18 micron (SPHERICEL Grade 60P18 from Potters Industries Inc.), and each of the loaded PSAs were coated to a dry thickness of 0.5 mil (13 micron). The PSA handspread loaded with 2 pph hollow glass spheres was cut into three inch wide strips. These strips were laminated to a polymeric mirror film as described in Example 2, so that they formed a square. The PSA handspread loaded with 10 pph hollow glass spheres was laminated to fill the square.

On top of the adhesive matrix with hollow glass spheres was laminated the 3 mm thick VHB sample. The silicone urea PSA layer described in Example 1 was hand laminated on top of the VHB adhesive. A translucent graphic film was placed on top of the silicone PSA layer. Side-emitting LED lights were injected into the light guide (VHB layer) from two opposing sides of the square, and light was extracted through the silicone urea PSA layer and into the translucent graphic film.

Example 8

An adhesive comprising 85/14/1 by weight of isooctyl acrylate/isobornyl acrylate/acrylic acid, 0.08 wt. % 1-6-hexanediol diacrylate and 0.20 wt. % IRGACURE 651 (Ciba Specialty) was coated onto a polymeric mirror film as described in Example 2, using a notched bar knife coater. The adhesive was coated with a wet thickness of 50 mils (1250 um) on one side and 40 mils (1000 um) on the other to give a slight wedge. The adhesive coating was covered with a silicone release liner (CP Films T10 2.0 mil polyester release liner) and cured using a low intensity UV lamp for 15 minutes. The adhesive had a refractive index of 1.474 as measured on an Abbe refractometer. A translucent graphic film was then laminated to the adhesive layer opposite the polymeric mirror film (8"×10" area). A side-emitting LED circuit was pressed into the cured PSA layer and light was easily passed through the entire 10 inches of PSA length and was able to be visibly seen exiting. Light was also extracted perpendicular to the light source and into the translucent graphic.

Example D

Example 9

A flexible acrylic lightguide (0.5 mm thick) designed to extract light in a cellular phone keypad was obtained. The lightguide material is described in US 2007/0191506 A1 (Rajan) and comprised a methacrylate functionalized acrylate oligomer and a polyalkyleneglycol dimethacrylate. A silicone urea PSA layer as described in Example 1 was hand laminated to both top and bottom surfaces of the flexible acrylic lightguide material. A simple side-emitting LED light was injected into the lightguide, and light was extracted along the extraction pattern through the silicone PSA cladding. Light was guided between the cladding and the lightguide, and did not leak through the cladding at any point other than the intended extraction points.

Example E

Example 10

An adhesive composition formulated with 90/10 isooctyl acrylate/acrylic acid, 0.3 wt % hexanediol diacrylate and 0.2 wt % IRGACURE 651 photoinitiator (Ciba Specialty) was coated onto a mirror film which had 2 ribbons of side-emitting light emitting diodes (LEDs) attached 9 inches apart (with double stick adhesive). The adhesive composition was coated using a notched bar knife coater and covered with a silicone release liner (CP Films T10 2.0 mil polyester release liner). The adhesive composition was cured using a low intensity UV lamp for 15 minutes. The adhesive composition was coated at a wet thickness of 70 mils to completely encapsulate the LED ribbons. The adhesive had a refractive index of 1.474 (as measured on an Abbe refractometer). The adhesive was removed from the ribbons at a connection point so that the LEDs could be powered. An extractor layer having an extractor pattern of dots printed on a clear 5 mil PET was laminated to the light guide (9"×9" area) with the embedded LED ribbons. A diffuse layer of white PET film was then placed on top of the extractor layer, and finally a vinyl graphic film was placed on top of this (image printed on vinyl film). The encapsulated side emitting LEDs were powered and light was easily passed through the entire 9 inches of PSA length and was able to be visibly seen exiting via the extraction pattern through the vinyl graphic film.

What is claimed is:

1. An optical device comprising a light source and an optical article, the optical article comprising a viscoelastic lightguide comprising a pressure sensitive adhesive core, wherein the lightguide is disposed on a substrate, wherein light emitted by the light source enters the pressure sensitive adhesive core and is transported within the pressure sensitive adhesive core by total internal reflection.

2. The optical device of claim 1, wherein an interface formed between the viscoelastic lightguide comprises a plurality of features oriented to extract light being transported within the viscoelastic lightguide.

3. The optical device of claim 1, wherein at least 80% of light being transported within the viscoelastic lightguide is extracted from the lightguide and into the substrate.

4. The optical device of claim 1, wherein at least some of the light being transported within the viscoelastic lightguide is emitted from the substrate.

5. The optical device of claim 1, wherein at least one surface of the substrate comprises a plurality of features oriented to emit light extracted from the viscoelastic lightguide.

6. The optical device of claim 1, wherein at least some of the light being transported within the viscoelastic lightguide is emitted uniformly from the substrate.

7. The optical device of claim 1, wherein at least some of the light being transported within the viscoelastic lightguide is emitted in one or more predetermined directions from the substrate.

8. The optical device of claim 1, wherein at least some of the light being transported within the viscoelastic lightguide is emitted randomly from the substrate.

9. The optical device of claim 1, wherein at least some of the light being transported within the viscoelastic lightguide is emitted in a predetermined shape from the substrate.

10. The optical device of claim 1, wherein at least some of the light being transported within the viscoelastic lightguide is emitted at different intensities from the substrate.

11. The optical device of claim 1, wherein greater than 50% of light is emitted from the substrate, relative to the amount of light that enters the viscoelastic lightguide.

12. The optical device of claim 1, wherein:
the viscoelastic lightguide comprises a (meth)acrylic pressure sensitive adhesive, the (meth)acrylic pressure sensitive adhesive comprising
a first monomer comprising a monoethylenically unsaturated alkyl (meth)acrylate monomer, and
a second monomer, wherein a homopolymer of the second monomer has a Tg of at least 10° C.

13. The optical device of claim 1, wherein the substrate comprises a silicone pressure sensitive adhesive.

14. The optical device of claim 1, wherein the substrate comprises a stretch releasable pressure sensitive adhesive.

15. The optical device of claim 1, wherein the substrate comprises an imaged polymeric film.

16. The optical device of claim 1, wherein the optical article has a light transmittance of from 90 to 100% and a haze value of from 0.01 to less than 5%.

17. The optical device of claim 1, wherein the substrate comprises a reflector.

18. The optical device of claim 1, wherein the substrate comprises a release liner.

19. The optical device of claim 1, wherein the first substrate comprises regions that extract light from the viscoelastic layer, and regions that do not.

20. The optical device of claim 1, wherein the optical article has a light transmittance of from 90 to 100% and a haze value of from 0.01 to less than 5%.

21. A sign or marking comprising the optical device of claim 1.

22. A display device comprising a display panel and the optical device of claim 1.

23. A keypad assembly comprising a one or more keys and the optical device of claim 1.

24. A tail light assembly suitable for use with a vehicle, the tail light assembly comprising a housing, a transparent cover and the optical device of claim 1.

25. An illumination device comprising a housing, a light emitting layer and the optical device of claim 1.

26. An optical device comprising a light source and an optical article, the optical article comprising a viscoelastic lightguide comprising a pressure sensitive adhesive core, wherein the lightguide is disposed between first and second substrates, wherein light emitted by the light source enters the pressure sensitive adhesive core and is transported within the pressure sensitive adhesive core by total internal reflection.

27. The optical device of claim 26, comprising a first interface formed between the viscoelastic lightguide and the first substrate and a second interface formed between the viscoelastic lightguide and the second substrate, wherein the first and second interfaces each comprise a plurality of features oriented to extract light being transported within the viscoelastic lightguide.

28. The optical device of claim 26, wherein at least 80% of light being transported within the viscoelastic lightguide is extracted from the lightguide and into the first and second substrates.

29. The optical device of claim 26, wherein at least some of the light being transported within the viscoelastic lightguide is emitted from the first and second substrates.

30. The optical device of claim 26, wherein greater than 50% of light is emitted from the first and second substrates, relative to the amount of light that enters the viscoelastic lightguide.

31. The optical device of claim 26, wherein the first substrate comprises an imaged polymeric film, and the second substrate comprises a reflector.

* * * * *